US012651249B1

(12) United States Patent
Arvanaghi et al.

(10) Patent No.: US 12,651,249 B1
(45) Date of Patent: *Jun. 9, 2026

(54) SYSTEM, METHOD AND PROGRAM PRODUCT FOR DEPOSITING AND WITHDRAWING STABLE VALUE DIGITAL ASSETS IN EXCHANGE FOR FIAT

(71) Applicant: Gemini IP, LLC, New York, NY (US)

(72) Inventors: Brandon Arvanaghi, New York, NY (US); Eric Winer, New York, NY (US); Daniel William Halley James, Brooklyn, NY (US); Stephen Judkins, Portland, OR (US); Alex Parkinson, Portland, OR (US); Cameron Howard Winklevoss, New York, NY (US); Tyler Howard Winklevoss, New York, NY (US)

(73) Assignee: Gemini IP, LLC, New York, NY (US)

( * ) Notice: Subject to any disclaimer, the term of this patent is extended or adjusted under 35 U.S.C. 154(b) by 349 days.

This patent is subject to a terminal disclaimer.

(21) Appl. No.: 18/224,821

(22) Filed: Jul. 21, 2023

Related U.S. Application Data

(63) Continuation of application No. 17/247,111, filed on Nov. 30, 2020, now Pat. No. 11,720,887, which is a continuation of application No. 16/036,469, filed on Jul. 16, 2018, now Pat. No. 10,929,842, which is a continuation-in-part of application No. 16/020,534, filed on Jun. 27, 2018, now Pat. No. 10,373,129, which is a continuation-in-part of application No. 15/960,040, filed on Apr. 23, 2018, now Pat. No. 10,438,290.

(60) Provisional application No. 62/689,563, filed on Jun. 25, 2018, provisional application No. 62/683,412, filed on Jun. 11, 2018, provisional application No. 62/660,655, filed on Apr. 20, 2018, provisional application No. 62/638,679, filed on Mar. 5, 2018.

(51) Int. Cl.
*G06Q 20/38* (2012.01)
*G06Q 40/04* (2012.01)

(52) U.S. Cl.
CPC ......... *G06Q 20/381* (2013.01); *G06Q 20/389* (2013.01); *G06Q 40/04* (2013.01)

(58) Field of Classification Search
CPC ........................................ G06Q 20/065–0658
See application file for complete search history.

(56) References Cited

U.S. PATENT DOCUMENTS

| | | | |
|---|---|---|---|
| 4,790,431 A | 12/1988 | Reel et al. | |
| 5,675,649 A | 10/1997 | Brennan et al. | |
| 5,799,287 A | 8/1998 | Dembo | |
| 5,950,176 A | 9/1999 | Keiser et al. | |
| 6,021,257 A | 2/2000 | Chikauchi | |
| 6,157,920 A | 12/2000 | Jakobsson et al. | |

(Continued)

OTHER PUBLICATIONS 2-of-3 Paper Wallets, Bitcoin Forum (published Jan. 29, 2013), https://bitcointalk.org/index.php?topic=139625.msg1487254 (last visited Dec. 4, 2013).

(Continued)

*Primary Examiner* — Jay Huang
(74) *Attorney, Agent, or Firm* — Lee & Hayes, P.C.

(57) ABSTRACT

The present invention generally relates to a method, system and program product for depositing and withdrawing a stable value digital asset tied to a blockchain in exchange for fiat.

20 Claims, 55 Drawing Sheets

(56)        References Cited

U.S. PATENT DOCUMENTS

| | | |
|---|---|---|
| 6,505,174 B1 | 1/2003 | Keiser et al. |
| 6,523,012 B1 | 2/2003 | Glassman et al. |
| 6,583,712 B1 | 6/2003 | Reed et al. |
| 7,167,565 B2 | 1/2007 | Rajasekaran |
| 7,330,538 B2 | 2/2008 | Dunsmuir |
| 7,487,123 B1 | 2/2009 | Keiser et al. |
| 7,677,974 B2 | 3/2010 | Van Luchene |
| 7,716,484 B1 | 5/2010 | Kaliski, Jr. |
| 7,870,058 B2 | 1/2011 | Maltzman |
| 7,873,573 B2 | 1/2011 | Realini |
| 7,999,748 B2 | 8/2011 | Ligtenberg et al. |
| 8,108,278 B2 | 1/2012 | Tzekin et al. |
| 8,108,283 B2 | 1/2012 | Dimitri et al. |
| 8,139,770 B2 | 3/2012 | Zheng et al. |
| 8,224,702 B2 | 7/2012 | Mengerink et al. |
| 8,229,855 B2 | 7/2012 | Huang et al. |
| 8,229,859 B2 | 7/2012 | Samid |
| 8,239,330 B2 | 8/2012 | Montero et al. |
| 8,249,965 B2 | 8/2012 | Tumminaro |
| 8,255,297 B2 | 8/2012 | Morgenstem et al. |
| 8,275,692 B2 | 9/2012 | Cartledge et al. |
| 8,306,910 B2 | 11/2012 | Wilkes |
| 8,352,326 B2 | 1/2013 | Betzler et al. |
| 8,452,703 B2 | 5/2013 | O'Leary et al. |
| 8,606,685 B2 | 12/2013 | Keiser et al. |
| 8,630,951 B2 | 1/2014 | Wilkes |
| 8,688,525 B2 | 4/2014 | Minde |
| 8,688,563 B2 | 4/2014 | Mehew et al. |
| 8,712,914 B2 | 4/2014 | Lyons et al. |
| 8,719,131 B1 | 5/2014 | Roth et al. |
| 9,794,074 B2 | 10/2017 | Toll et al. |
| 9,853,977 B1 | 12/2017 | Laucius et al. |
| 9,892,460 B1 | 2/2018 | Winklevoss et al. |
| 9,898,782 B1 | 2/2018 | Winklevoss et al. |
| 9,942,231 B1 | 4/2018 | Laucius et al. |
| 9,965,804 B1 | 5/2018 | Winklevoss et al. |
| 9,965,805 B1 | 5/2018 | Winklevoss et al. |
| 10,002,389 B1 | 6/2018 | Winklevoss et al. |
| 10,055,715 B1 * | 8/2018 | Grassadonia .......... G06Q 20/36 |
| 10,063,548 B1 | 8/2018 | Lauclus et al. |
| 10,068,228 B1 | 9/2018 | Winklevoss et al. |
| 10,084,762 B2 | 9/2018 | Versteeg et al. |
| 10,158,480 B1 | 12/2018 | Winklevoss et al. |
| 10,255,635 B1 | 4/2019 | Winklevoss et al. |
| 10,269,009 B1 | 4/2019 | Winklevoss et al. |
| 10,325,257 B1 | 6/2019 | Winklevoss et al. |
| 10,354,325 B1 | 7/2019 | Skala et al. |
| 10,438,290 B1 | 10/2019 | Winklevoss et al. |
| 10,484,376 B1 | 11/2019 | Laucius et al. |
| 10,540,640 B1 | 1/2020 | James et al. |
| 10,540,653 B1 | 1/2020 | James et al. |
| 10,540,654 B1 | 1/2020 | James et al. |
| 10,650,376 B1 | 5/2020 | Winklevoss et al. |
| 10,693,632 B1 | 6/2020 | Winklevoss et al. |
| 10,778,682 B1 | 9/2020 | Laucius et al. |
| 10,915,891 B1 | 2/2021 | Winklevoss et al. |
| 10,929,929 B1 | 2/2021 | Winklevoss et al. |
| 10,984,470 B1 | 4/2021 | Winklevoss et al. |
| 10,984,472 B1 | 4/2021 | Winklevoss et al. |
| 11,017,381 B1 | 5/2021 | Winklevoss et al. |
| 11,017,391 B1 | 5/2021 | Winklevoss et al. |
| 2002/0143614 A1 | 10/2002 | MacLean et al. |
| 2002/0171546 A1 | 11/2002 | Evans et al. |
| 2003/0009413 A1 | 1/2003 | Furbush et al. |
| 2003/0014749 A1 | 1/2003 | Simons et al. |
| 2003/0225672 A1 | 12/2003 | Hughes, Jr. et al. |
| 2004/0049464 A1 | 3/2004 | Ohmori et al. |
| 2004/0143710 A1 | 7/2004 | Walmsley |
| 2004/0193657 A1 | 9/2004 | Saito et al. |
| 2004/0243488 A1 | 12/2004 | Yamamoto et al. |
| 2005/0044022 A1 | 2/2005 | Spirgel et al. |
| 2005/0240510 A1 | 10/2005 | Schweickert et al. |
| 2007/0117615 A1 | 5/2007 | Van Luchene |
| 2007/0146797 A1 | 6/2007 | Sakai et al. |
| 2007/0219869 A1 | 9/2007 | Haines et al. |
| 2007/0271455 A1 | 11/2007 | Nakano et al. |
| 2008/0109280 A1 | 5/2008 | Csoka |
| 2008/0120221 A1 | 5/2008 | Toneguzzo |
| 2008/0140578 A1 | 6/2008 | Felt et al. |
| 2008/0167965 A1 | 7/2008 | Von Nothaus et al. |
| 2008/0215474 A1 | 9/2008 | Graham |
| 2008/0243703 A1 | 10/2008 | Al-Herz et al. |
| 2008/0249957 A1 | 10/2008 | Masuyama et al. |
| 2008/0281444 A1 | 11/2008 | Krieger et al. |
| 2009/0089168 A1 | 4/2009 | Schneck |
| 2009/0094134 A1 | 4/2009 | Toomer et al. |
| 2009/0098939 A1 | 4/2009 | Hamilton, II et al. |
| 2009/0119200 A1 | 5/2009 | Riviere |
| 2009/0132830 A1 | 5/2009 | Haga et al. |
| 2009/0265268 A1 | 10/2009 | Huang et al. |
| 2010/0094771 A1 | 4/2010 | VanderPal |
| 2010/0174646 A1 | 7/2010 | Cole et al. |
| 2010/0228674 A1 | 9/2010 | Ogg et al. |
| 2010/0250360 A1 | 9/2010 | Ball et al. |
| 2010/0306084 A1 | 12/2010 | Ciptawilangga |
| 2011/0110516 A1 | 5/2011 | Satoh |
| 2011/0112662 A1 | 5/2011 | Thompson et al. |
| 2011/0231913 A1 | 9/2011 | Feng et al. |
| 2011/0270748 A1 | 11/2011 | Graham, III et al. |
| 2011/0302412 A1 | 12/2011 | Deng et al. |
| 2012/0078693 A1 | 3/2012 | Wilkes |
| 2012/0101886 A1 | 4/2012 | Subramanian et al. |
| 2012/0123924 A1 | 5/2012 | Rose et al. |
| 2012/0185395 A1 | 7/2012 | Wilkes |
| 2012/0239543 A1 | 9/2012 | Ryan |
| 2012/0278200 A1 | 11/2012 | van Coppenolle et al. |
| 2013/0036373 A1 | 2/2013 | Alderfer et al. |
| 2013/0041773 A1 | 2/2013 | Muse |
| 2013/0054471 A1 | 2/2013 | Samid |
| 2013/0061049 A1 | 3/2013 | Irvine |
| 2013/0159699 A1 | 6/2013 | Torkkel |
| 2013/0166455 A1 | 6/2013 | Feigelson |
| 2013/0191277 A1 | 7/2013 | O'Leary et al. |
| 2013/0232023 A2 | 9/2013 | Muse |
| 2013/0238478 A1 | 9/2013 | Bruno |
| 2013/0246233 A1 | 9/2013 | Hakim |
| 2013/0254052 A1 | 9/2013 | Royyuru et al. |
| 2013/0311266 A1 | 11/2013 | Vichich et al. |
| 2013/0311348 A1 | 11/2013 | Samid |
| 2013/0317972 A1 | 11/2013 | Morgenstern et al. |
| 2013/0317984 A1 | 11/2013 | O'Leary et al. |
| 2013/0325701 A1 | 12/2013 | Schwartz |
| 2014/0025473 A1 | 1/2014 | Cohen |
| 2014/0032267 A1 | 1/2014 | Smith et al. |
| 2014/0040157 A1 | 2/2014 | Cohen et al. |
| 2014/0081710 A1 | 3/2014 | Rabie |
| 2014/0122903 A1 | 5/2014 | Endo et al. |
| 2014/0141869 A1 | 5/2014 | Shore |
| 2014/0156497 A1 | 6/2014 | Mehew et al. |
| 2014/0164251 A1 | 6/2014 | Loh |
| 2014/0233740 A1 | 8/2014 | Niamut et al. |
| 2014/0310527 A1 | 10/2014 | Veugen et al. |
| 2014/0344015 A1 | 11/2014 | Puertolas-Montanes et al. |
| 2015/0033301 A1 | 1/2015 | Pianese et al. |
| 2015/0120567 A1 | 4/2015 | Van Rooyen et al. |
| 2015/0120569 A1 | 4/2015 | Belshe et al. |
| 2015/0170112 A1 | 6/2015 | DeCastro |
| 2015/0193744 A1 | 7/2015 | Adleman |
| 2015/0227897 A1 | 8/2015 | Loera |
| 2015/0244690 A1 | 8/2015 | Mossbarger |
| 2015/0262137 A1 | 9/2015 | Armstrong |
| 2015/0262138 A1 | 9/2015 | Hudon |
| 2015/0262139 A1 | 9/2015 | Shtylman |
| 2015/0262140 A1 | 9/2015 | Armstrong |
| 2015/0262141 A1 | 9/2015 | Rebernik et al. |
| 2015/0262168 A1 | 9/2015 | Armstrong |
| 2015/0262171 A1 | 9/2015 | Langschaedel et al. |
| 2015/0262172 A1 | 9/2015 | Rebernik |
| 2015/0262173 A1 | 9/2015 | Durbin et al. |
| 2015/0262176 A1 | 9/2015 | Langschaedel et al. |
| 2015/0310424 A1 | 10/2015 | Myers |
| 2015/0324787 A1 | 11/2015 | Schaffner |
| 2015/0332283 A1 | 11/2015 | Witchey |
| 2015/0341422 A1 | 11/2015 | Farnlof et al. |

(56)                    References Cited

U.S. PATENT DOCUMENTS

| | | | |
|---|---|---|---|
| 2015/0348169 A1 | 12/2015 | Harris et al. | |
| 2015/0356523 A1 | 12/2015 | Madden | |
| 2015/0356555 A1 | 12/2015 | Pennanen | |
| 2015/0363777 A1 | 12/2015 | Ronca et al. | |
| 2016/0027229 A1 | 1/2016 | Spanos et al. | |
| 2016/0028552 A1 | 1/2016 | Spanos et al. | |
| 2016/0078219 A1 | 3/2016 | Hernan | |
| 2016/0080156 A1 | 3/2016 | Kaliski, Jr. | |
| 2016/0086187 A1 | 3/2016 | Joao | |
| 2016/0092988 A1 | 3/2016 | Letourneau | |
| 2016/0112200 A1 | 4/2016 | Kheterpal et al. | |
| 2016/0125040 A1 | 5/2016 | Kheterpal et al. | |
| 2016/0162873 A1 | 6/2016 | Zhou et al. | |
| 2016/0203448 A1 | 7/2016 | Metnick et al. | |
| 2017/0005804 A1 | 1/2017 | Zinder | |
| 2017/0017955 A1 | 1/2017 | Stern et al. | |
| 2017/0091750 A1 | 3/2017 | Maim | |
| 2017/0124535 A1 | 5/2017 | Juels et al. | |
| 2017/0132630 A1 | 5/2017 | Castinado et al. | |
| 2017/0236196 A1* | 8/2017 | Isaacson | G06Q 30/0641 |
| | | | 705/14.51 |
| 2017/0293898 A1* | 10/2017 | Rampton | G06Q 20/382 |
| 2017/0345011 A1* | 11/2017 | Salami | G06Q 20/42 |
| 2018/0091316 A1* | 3/2018 | Stradling | H04L 9/3297 |
| 2018/0101906 A1* | 4/2018 | Mcdonald | G06Q 20/204 |
| 2018/0225660 A1 | 8/2018 | Chapman et al. | |
| 2019/0066065 A1 | 2/2019 | Wright et al. | |
| 2019/0220831 A1 | 7/2019 | Rangarajan et al. | |
| 2019/0220836 A1 | 7/2019 | Caldwell | |
| 2019/0333143 A1* | 10/2019 | Williams | G06Q 20/065 |
| 2020/0005284 A1 | 1/2020 | Vijayan | |
| 2020/0143367 A1 | 5/2020 | LeBeau et al. | |
| 2020/0167769 A1 | 5/2020 | Green | |
| 2020/0219094 A1 | 7/2020 | Dikhit et al. | |
| 2020/0273031 A1 | 8/2020 | Narayan et al. | |
| 2020/0327609 A1 | 10/2020 | Dubrofsky | |
| 2020/0364703 A1 | 11/2020 | Joveski et al. | |
| 2020/0380476 A1 | 12/2020 | Trudeau et al. | |
| 2021/0097508 A1 | 4/2021 | Papanikolas | |
| 2021/0133700 A1 | 5/2021 | Williams et al. | |
| 2021/0357489 A1 | 11/2021 | Tali et al. | |
| 2021/0357893 A1 | 11/2021 | Kang et al. | |

OTHER PUBLICATIONS

A block chain based decentralized exchange, harsh Patel.

A Physical Price Tag For A Digital Currency. Introducing Bittag., BitTag, http://bittag.net/ (last visited Feb. 5, 2014).

A powerful trading platform for Bitcoin traders, BTXTrader.com (Aug. 13, 2013) Internet Archive, https://web.archive.org/web/20130813052513/http:www.btxtrader.com/.

About Bitcoin, Bitcoin.org (May 2, 2013) Internet Archive, http://web.archive.org/web/20130502214154/http://bitcoin.org/en/about.

Sanjay Panikkar et al., ADEPT: An IoT Practitioner Perspective, IBM (2015).

All About Bitcoin, Goldman Sachs, Global Macro Research, Top of Mind, Issue 21 (Mar. 11, 2014).

"AlphaPoint Announces Blockchain Solution Custom-Built for Financial Institututions," AlphaPoint, https://globenewswire.com/news-release/2015/10/U.S. Appl. No. 26/779,929/0/en/AlphaPoint-Announces-blockchain-solution-custom-built-for-financial-institutions.html, Oct. 26, 2015, 3 pages.

"Digital Currency Exhange Goes Live to Publin in Melbourne, Australia," AlphaPoint, https://globenewswire.com/news-release/2015/12/10/794524/0/en/Digital-Currency-Exchange-Goes-Live-to-Public-in-Melbourne-Australia.html, Dec. 10, 2015, 3 pages.

An Open Source P2P Digital Currency, Bitcoin.org, http://bitcoin.org/en/ (last visited Jul. 22, 2013).

Ashlee Vance & Brad Stone, The Bitcoin-Mining Arms Race Heats Up, BloombergBusinessweek, http://www.businessweek.com/articles/2014-01-09/bitcoin-minig-chips-gear-computing-groups-competition-heats-up (last visited Jan. 9, 2014).

Jon Southurst, ATM Industry Association Publishes Report on Bitcoin ATMs, CoinDesk (Published Mar. 20, 2014), http://www.coindesk.com/atm-industry-association-publishes-report-bitcoin-atms/ (last visited Mar. 21, 2014).

ATMIA ATM Industry Association Position Paper, www.atmia.com , Internet.

BANKEX Proof-of-Asset Protocol—The Smart White Paper, version 0.3.1 beta (Oct. 19, 2017) 36 pgs.

Dunford, Barter netwrok aims to help Mile End's cash-strapped live well, The Gazette [Montreal, Que] (Jan. 23, 1996).

Nick Szabo, Bit gold, unenumerated.blogspot.com (Mar. 29, 2006) Internet Archive, https://web.archive.org/web/20060329122942/http://unenumerated.blogspot.com/2005/12/bit-gold.html.

David Andolfatto, Bitcoin and Beyond: The Possibilities and Pitfalls of Virtual Currencies, Federal Reserve Bank of St. Louis, Dialouge with the Fed, Beyond Today's Financial headlines (Mar. 31, 2014).

Joe Adler, Bitcoin Backers Seek FDIC-Style Insurance, American Banker (Jan. 22, 2014), http://www.americanbanker.com/issues/179_15/bitcoin-backers-seek-fdic-style-insurance-1065089-1.html?zkPrintable=true.

Stephen Foley & Alice Ross, Bitcoin bubble grows and grows, Financial Times, http://www.ft.com/intl/cms/s/0/b4be7d8e-9c73-11e2-9a4b-00144feabdc0/html (last visited Oct. 30, 2013).

Bitcoin Fund Exclusively Available on EXANTE's Platform, EXANTE, https://exante.eu/press/news/266/ (last visited Oct. 10, 2013).

Bitcoin Moves Closer to Regulation, Stratfor Flobal Intelligence (Jan. 29, 2015), https://www.stratfor.com/sample/analysis/bitcoin-moves-closer-regulation#axzz/ (last visited Jan. 30, 2015).

Bitcoin Now on Bloomberg, Bloomberg Now (Apr. 30, 2014) Internet Archive, https://web.archive.org/web/20140430184511/http://www.bloomberg.com/now/2014-04-30/bitcoin-now-bloomberg/.

Bitcoin Theft Insurance, Ecoin Club (published Dec. 3, 2013), http://ecoinclub.com/bitcoin-insurance/ (Last visited Dec. 5, 2013).

Bitcoin's First Kiosk, Robocoin (Jul. 2, 2013) Internet Archive, https://web.archive.org/web/20130702171110/https://robocoinkiosk.com/.

Bitcoin's First Real ATM, Robocoin Blog, http://blog.robocoinkiosk.com/ (last visited Nov. 11, 2013).

Bitcoin, Wikipedia (Jun. 24, 2013), Internet Archieve http://web.archive.org/web/20130624030646/http://en.wikipedia.org/wiki/Bitcoin.

Bitcoin: a first assessment, FX and Rates | Global, Bank of America Merrill Lynch (Dec. 5, 2013).

Nakamoto, S., "Bitcoin: A Peer-to-Peer Electronic Cash System," www.bitcoin.org, 9 pages.

Francois R. Velde, Bitcoin: A primer, The Federal Reserve Bank of Chicago, Chicago Fed Letter (Dec. 2013).

John Heggestuen, BITCOIN: How It Works, and How It Could Fundamentally Change How Companies and Individuals Handle Payments, BI Intelligence (Jan. 30, 2014).

Bitcoin: Intrinsic Value as Conduit for Disruptive Payment Network Technology, Wedbush, Computer Services: Financial Technology (Dec. 1, 2014).

Bitcoin: Questions, Answers, and Analysis of Legal Issues, Congressional Research Service (Dec. 20, 2013).

Anton Badev and Matthew Chen, Bitcoin: Technical Background and Data Analysis, Finance and Economics Discussion Series, Divisions of Research & Statistics and Monetary Affairs, Federal Reserve Board, Washington, D.C. (Oct. 7, 2014).

Julieta Duek and Demian Brener, Bitcoin: Understanding and Assesing potential Opportunities, Quasar Ventures (Jan. 2014).

Bitcoin: Watch the Innovation, Not the Price, Wedbush, Computer Services: Financial Technology (Feb. 14, 2014).

BitcoinAverage.com—independent bitcoin price, Bitcoin Forum, https://bitcointalk.org/index.php?topic=270190.0 (last visited Feb. 24, 2014).

BitcoinAverage.com, Reddit, http://www.reddit.com/r/rBitcoin/comments/1jl9c2/ (last visited Feb. 24, 2014).

Bitcoinaverage code respository, GitHub, https://github.com/bitcoinaverage/bitcoinaverage/commits/master?page=134 (last visited Feb. 24, 2014).

(56) References Cited

OTHER PUBLICATIONS

Bitcoins and Banks: Problematic currency, interesting paymetn system, UBS, Global research (Mar. 28, 2014).

Bitcoins the hard way: Using the raw Bitcoin protocol, Ken Shirriff's blog, (Feb. 3, 2014) Internet Archive, https://web.archive.org/web/20140203192446/http://www.righto.com/2014/02/bitcoins-hard-way-using-raw-bitcoin.html.

Bitflash Weekly Review (Apr. 14, 2014), Pantera, https://panteracapital.com/bitflash/ (last visited Apr. 15, 2014).

"Blockchain Technologies Corp Makes History, 2016 Iowa Caucus Results Forever Documented on Blockchain", https://globenewswire.com/news-release/2016/02/06/808320/1059855/en/Blockchain-technologies-corp-makes-history-2016-iowa-caucus-results-forever-documented-on-blockchain.html, Feb. 5, 2016, 2 pages.

BLOCKTRAIL | Bitcoin Block, Explorer, Blocktrail (Aug. 18, 2014), https://www.blocktrail.com/.

BTC, Google Finance, https://www.google.com/finance?q=CURRENCY%3ABTC&ei=T-euU7jVFZOUwQPNKIHYCQ (last visited Jul. 11, 2014).

Buying and Selling Linden Dollars, Second Life, http://community.secondlife.com/t5/English-Knowledge-Base/Buying-and-selling-Linden-dollars/ta-p/700107 (last visited Dec. 9, 2013).

Charts, Bitcoin Charts (May 10, 2013) Internet Archive, https://web.archive.org/web/20130510172057/http://bitcoincharts.com/charts.

Choose Your Wallet, Bitcoin.org (May 30, 2013) Internet ARchieve, http://web.archive.org/web/20130530072551/http://bitcoin.org/en/choose-your-wallet.

Circle (May 19, 2014) Internet Archive, https://web.archive.org/web/20140519175717/https://www.circle.com/.

Jonathan Shieber, Circle Emerges From Stealth to Bring Bitcoin to The Masses, TechCrunch (May 18, 2014) Internet Archive, https://web.archive.org/web/20140518130248/http://techcrunch.com/2014/05/15/circle-emerges-from-stealth-to-bring-bitcoin-to-the-masses/.

Coinbase, Bitcoin Wallet, https://coinbase.com/ (last visited Aug. 15, 2013).

Coinbase, Bitcoin Wallet, Bitcoin made simple, https://coinbase.com/ (last visited Aug. 15, 2013).

Jon Matonis, CoinDesk Launches Proprietary Bitcoin Price Index, CoinDesk (published Sep. 11, 2013), http://www.coindesk.com/coindesk-launches-proprietary-bitcoin-price-index/ (last visited Oct. 30, 2013).

CoinDesk, Bitcoin Price Index, http://www.coindesk.com/price/ (last visited Oct. 28, 2013).

CoinDesk, This week we released the first version of our mobile app on iPhone, Twitter (published May 2, 2014), https://twitter.com/coindesk/status/462255287177453568?refsrc=email (last visited May 5, 2014).

Daniel Palmer, Coinfloor Plans Europe's First Bitcoin ETF, Adds USD Support, CoinDesk (Oct. 21, 2014), http://www.coindesk.com/coinfloor-launch-bitcoin-trading-fund-adds-new-currencies/ (last visited Oct. 22, 2014).

Coinsetter Launches Out of Beta, Platform Now a Full U.S. Bitcoin Exchange, Coinsetter blog (Jul. 24, 2014), http://www.coinsetter.com/blog/2014/07/24/coinsetter-launches-beta-platform-now-full-US-bitcoin-exchange/ (last visited Jul. 24, 2014).

Daniel Roberts, On Winklevoss Bitcoin index, it's open season for developers, Fortune, (Jul. 22, 2014).

Digitizing Trust: Leveraging the Bitcoin Protocol Beyond the "Coin", Wedbush, Computer Services: Financial Technology (Jan. 2, 2014).

Ina Steiner, eBay Mulls New Feature to Eliminate Deadbeat Bidders, EcommerceBytes Blog (published May 12, 2012) http://www.ecommercebytes.com/C/blog.pl?/pl/2012/5/1336831866.html (last visited May 30, 2014).

Electrum, Bitcoin wiki, https://en.bitcoin.it/wiki/Electrum (last visited Jul. 22, 2013).

Elliptic Vault: Secure, Worry-free Storage For Your Bitcoins, Elliptic.co (Jan. 12, 2014) Internet Archive, https://web.archive.org/web/20140112043128/https://www.elliptic.co/vault.

Daniel Cawrey, Eschewing Price, Pantera Launches BitIndex to Track Bitcoin, CoinDesk (Jul. 10, 2014), http://www.coindesk.com/eschewing-price-pantera-launches-bitindex-track-bitcoin/ (last visited Jul. 11, 2014).

David Harper, Exploring the Exponentially Weighted Moving Average, Investopedia (Mar. 18, 2007) Internet Archive, https://web.archive.org/web/20070318160651/http://www.investopedia.com/articles/07/EWMA.asp.

FAQ: What's The Difference Between PPCoin and Bitcoin?, GitHub, https://github.com/ppcoin,ppcoin/wiki/FAQ (last visited Jul. 22, 2013).

First Bitcoin Capital Corp.(otc markets:BITCF) Launches Digital Currency Exchange, CoinQX.com in Beta, The Wall Street Journal MarketWatch, http://www.marketwatch.com/stroy/first-bitcoin-capital-corpoto-markets-bitof-launches-digital-currency-exchange-coinqxcom-in-beta-2014-05-21 (last visited May 21, 2014).

How Bitcoin is Driving Digital Innovation in Entertainment, Mediaand Communications (EMC), PwC Consumer Intelligence Series, Digital Disruptor, (Jan. 27, 2014).

How Bitcoin Works Under The Hood, Imponderable Things (Scott Driscoll's Blog) (published Jul. 14, 2013), http://www.imponderablethings.com/2013/07/how-bitcoin-works-under-hood.html (last visited Oct. 10, 2013).

How DigiCash Blew Everything, NEXT (published Jan. 1999), http://cryptome.org/jya/digicrash.htm (last visited Jan. 9, 2014).

How Does Bitcoin Work? , Bitcoin.org, (May 1, 2013) Internet Archive, http://web.archive.org/web/20130501092121/http://bitcoin.org/en/how-it-works.

How is Mt. Gox weighted average calculated?, Bitcoin Forum (Mar. 18, 2013), https://bitcointalk.org/index.php?topic=154548.0 (last visted Jul. 25, 2013).

Independent Bitcoin Price, BitcoinAverage, https://bitcoinaverage.com/explain.htm (last visited Mar. 4, 2014).

International Search Report and Written Opinion issued in Application No. PCT/US16/040711 dated Oct. 4, 2016 (14 pages).

Introducing BDIC: Bitcoin's decentralized, privately-funded version of the FDIC, Reddit (Published Dec. 4, 2013), http://www.reddit.com/r/Bitcoin/comments/1s365o/introducing_bdic_bitcoins_decentralized/ (last visited Dec. 5, 2013).

Jerry Brito, et al., Bitcoin, A Primer for Policymakers (2013).

The audacity of bitcoin, Risks and opportunites for corporates and investors, Global rates & FX Research, J.P. Morgan (Feb. 11, 2014), http://www.jpmorganmarkets.com/GlobalFXStrategy.

Brian Cohen, JPMorgan Chase Building Bitcoin-Killer, Lets Talk Bitcoin (published Dec. 9, 2013) http://letstalkbitcoin.com/jpmorgan-chase-building-bitcoin-killer/ (last visited Dec. 10, 2013).

Ken Hawkins, Exchange-Traded Funds (EFTs), Investopedia (May 12, 2013) Internet Archive, https://web.archive.org/web/20130512125447/http://www.investopedia.com/university/exhnage-traded-fund/.

Lisa Fleisher, London's New Bitcoin Exchange Hopes to Avoid Mt. Gox Fate, The Wall Street Journal (published Apr. 30, 2014), http://blogs. wsj.com/digits/2014/04/30/londs-new-bitcoin-exchange-hopes-to-avoid-mt-gox-fate/ (last visited May 1, 2014).

[ANN] M-of-N "Fragmented Backups" now in Aromory (command-line only), Bitcoin Forum (Mar. 6, 2013), https://bitcointalk.org/index.php?topic=149820.0 (last visited Dec. 4, 2013).

Major Bitcoin Investment Firm Launches Bitindex, The Crypto Crimson, (published Jul. 10, 2014), http://cryptocrimson.com/2014/07/major-bitcoin-investment-firm-launches-bitindex/ (last visited Jul. 11, 2014).

Marketplace—Gemini, web.archive.org (Last modified Jan. 8, 2018) http://web.archive.org/web/20180125115941/https://gemini.com/marketplace/ , Internet.

Marketplace—Gemini, web.archive.org (Last modified Nov. 25, 2017) http:web.archive.org/web/20171211092415/https://gemini.com/marketplace/ , Internet.

Marketplace, gemini.com (Last modified Sep. 20, 2018) https://gemini.com/marketplace/ , Internet.

Markets API, Bitcoin Charts (Jun. 3, 2013) INternet Archive, https://web.archive.org/web/20130603091557/http://bitcoincharts.com/about/markets-api.

Max Raskin, Cameron and Tyler Winklevoss on Bitcoin and Their Public Persona, BloombergBusinessweek, http://www.businessweek.

(56) References Cited

OTHER PUBLICATIONS com/articles/2013-08-08/cameron-and-tyler-winklevoss-on-bitcoin-and-their-public-persona (last visited Aug. 8, 2013).

Mearian, "What's a smart contract ( and how does it work)?", Jul. 2019, 12 Pages.

James Ball, Meet the seven people who hold the keys to worldwide internet security, The Guardian, http://www.theguardian.com/technology/2014/feb/28/seven-people-keys-worldwide-internet-security-web (last visited Mar. 7, 2014).

"Nasdaq Launches Enterprise-Wide Blockchain Technology Initiative", Nasdaq, https://globenewswire.com/news-release/2015/05/11/734456/10133665/en/nasdaq-launches-enterprise-wide-blockchain-technology-initiative.html, May 11, 2015, 3 pages.

Nasdaq Linq Enables First-Ever Private Securites Issuance Documented with Blockchain Technology, Nasdaq, https://globenewswire.com/news-release/2015/12/20/798660/0/en/Nasdaq-Linq-enables-first-ever-private-securities-issuance-documented-with-blockchain-technology.html, Dec. 30, 2015, 3 pages.

Notice of References Cited, U.S. Appl. No. 12/192,809 (Oct. 10, 2012).

NYC Bitcoin Exchange Coinsetter Launches Out of Beta With Institutional and Consumer Trading, MarketWatch (published Jul. 24, 2014), http://www.marketwatch.com/stroy/nyc-bitcoin-exchange-coinsetter-launches-out-of-beta-with-institutional-and-consumer-trading-2014-07-24 (last visited Jul. 24, 2014).

Office Action for U.S. Appl. No. 16/670,624, mailed on Jul. 22, 2022, James, "System, Method and Program Product for Generating and Utilizing Stable Value Digital Assets", 9 Pages.

OA for U.S. Appl. No. 16/687,230 mailed on Aug. 27, 2021, Duncan Foster, "System, Method and Program Product for Generating and Utilizing Stable Value Digital Assets", 6 pages.

Online auctions: An in-depth look, National Consumers League, http://www.nclnet.org/personal-finance/121-online-auctions/279online-auctions-an-in-depth-look (last visted May 30, 2014).

Office Action for U.S. Appl. No. 17/247,111, mailed on Sep. 29, 2022, Arvanaghi, "System, Method and Program Product for Depositing and Withdrawing Stable Value Digital Assets in Exchange for Fiat", 10 pages.

PPCoin Proof of Stake Minting Setup Guide, Bitcoin Forum (Apr. 25, 2013) https://bitcointalk.org/index.php?topic=1877714.0 (last visited Jul. 22, 2013).

PPCoin, Wikipedia, http://en.wikpedia.org/wiki/PPCoin (last visited Jul. 22, 2013).

Sunny King & Scott Nadal, PPCoin: Peer-to-Peer Crypto-Currency with Proof-of-Stake, (Aug. 19, 2012).

Private Bitcoin Insurance, Inscrypto, http://go.inscrypto.com (last visited Jan. 24, 2014).

Proof of stake instead of proof of work, Bitcoin Forum, https://bitcointalk.org/index.php?topic=27787 (last visited Nov. 6, 2015).

Proof-of-stake, Wikipedia, http://en.wikipedia.org/wiki/Proof-of-stake (last visited Jul. 22, 2013).

Proof-of-work System, Wikipedia, http://en.wikipedia.org/wiki/Proof-of-work (last visited Jul. 22, 2013).

Protocol of Bitcoin, Wikipedia, http://en.wikipedia.org/wiki/Bitcoin_mining (last visited Jul. 22, 2013).

Rachel Abrams, Winklevoss Twins to List Bitcoin Fund on Nasdaq, The New York Times DealB%k, http://dealbook.nytimes.com/2014/05/08/winklevoss-twins-to-list-bitcoin-fund-on-nasdaq/ (last visited May 8, 2014).

Evan L. Greebel et al., Recent Key Bitcoin and Virtual Currency Regulatroy and Law Enforecment Developments, Virtual Currency Advisory, Katten Muchin Rosenman LLP (Nov. 13, 2014).

Request for Administrative Ruling on the Application of FinCEN's Regulations to a Virtual Currency Payment System, United States Department of the Treasury, FinCEN, (Oct. 27, 2014). FIN-2014-R011.

Ronald A. Glantz, Pantera Primer, (Mar. 11, 2014).

"RR Donnelley to Pursue New Blockchain-Eneabled Capabilities for Publishing Industry," https://globenewswire.com/news-release/

2016/03/14/819355/0/en/pr-donnelley-to-pursue-new-blockchain-enabled-capabilities-for-publishing-industry.html, Mar. 14, 2016, 3 pages.

Secuirty for Your Peace of Mind, Coinbase, https://coinbase.com/security (last visited Oct. 28, 2013).

Securing Your Wallet, Bitcoin.org (Jul. 21, 2013) Internet Archive, http:/web.archive.org/web/20130721194621/http://bitcoin.org/en/secure-your-wallet.

Shamir's Secret Sharing, Wikipedia, http://en.wikipedia.org/wiki/Shamir's_Secret_Sharing (last visited Jul. 22, 2013).

Rob Wile, Shares of No-Name Tech Company Go Crazy After It Announces It's Getting Into The Bitcoin Game, business Insider, http://www.businessinsider.com/wcps-bitcoin-2013-12?hr_email_referer=1&utm_source=Triggermail&utm_medium=email&utm_content=emailshare (last visited Dec. 30, 2013).

Some Things You Need To Know, Bitcoin.org (May 2, 2013) Internet Archive, http://web.archive.org/web/20130502051011/http://bitcoin.org/en/you-need-to-know.

State of Bitcoin 2014, CoinDesk (Feb. 26, 2014).

Jeremy Allaire, What We Have Been Up to at Circle, The Circle Blog (May 19, 2014) Internet Archive, https://web.archive.org/web/20140519162958/https://www.circle.com/2014/05/15/circle-update/.

The Ripple Network Review—What is Ripple?, Donald McIntyre—Etherplan (Aug. 1, 2013) https://etherplan.com/2013/08/01/the-ripple-network-what-is-ripple/4103/ , Internet.

TigerDirect.com Now Accepts Bitcoin Payments!, TigerDirect, http://www.tigerdirect.com/bitcoin/ (last visited Feb. 6, 2014).

Timing and Sizing the Era of Bitcoin, Wedbush, Computer Services: Financial Technology (May 27, 2014).

Trading Namecoins for Bitcoins, Bitcoin Forum, https://bitcointalk.org/index.php?topic=6289.0 (last visited Nov. 6, 2015).

U.S. Appl. No. 60/884,172, filed Jan. 9, 2007.

USD Average Price History, BitcoinAverage, https://bitcoinaverage.com/chart.hmt@USD-averages-all (last visited Feb. 24, 2014).

Using Offline Wallets in Armory, Armory (May 20, 2013) Internet Archive, http://web.archive.org/20130520100213/https://bitcoinarmory.com/using-offline-wallets-in-armory/.

Victoria Turk, Bitcoin 'Banks' Are Trying to Rebrand Cryptocurrencies for the Mainstream, Motherboard, http://motherboard.vice.com/en_ca/read/bitcoin-banks-try-to-rebrand-cryptocurrencies-for-the-mainstream (last visited May 5, 2014).

We make it easy to build secure, high level services on top of the Bitcoin protocol, Trusted Coin (Dec. 26, 2013) Internet Archive, https://web.archive.org/web/20131226232433/https://api.trustedcoin.com/f.

"What is Blockchain Technology?" Quora. N.p. 15, Jan. 2009. Jun. 9, 2017. <https://www.quora.com/What-is-blockchain-technology-1>.

Why Bitcoin is Changing The World, Bitcoin.org (Jun. 20, 2013) Internet Archive, http://web.archive.org/web/20130620062218/http://bitcoin.org/en/innovation.

WINKBTCO Index, Bloomberg Finance L.P. (Jun. 16, 2014).

Winklevoss Bitcoin Trust Amendment No. 3 to Form S-1 Registration Statement, SEC (May 8, 2014), available at http://www.sec.gov/Archives/edgar/data/1579346/000119312514190365/d721187ds1a.htm.

Winklevosses' Gemini to Offer Cryptocurrency Block Trading, Olga Kharis and Matthew Leising, Bloomberg.com (Apr. 9, 2018) https://www.bloomberg.com/news/articles/2018-04-09/winklevoss-s-gemini-to-offter-cryptocurrency-block-trading , Internet.

World Bank taps Australia's CBA for blockchain bond, Reuters (Aug. 9, 2018) https://www.reuters.com/article/us-worldbank-cba-blockchain/world-bank-taps-australias-cba-for-blockchain-bond-idUSKBN1KV02D , Internet.

World Gold Council, How SPDR Gold Shares (2840 HK) are Created and Redeemed (Mar. 2013).

John Biggs, Xapo Raises $20 Million to Bury Your Bitcoin Underground, TechCrunch (Mar. 14, 2014) Internet Archive, https://web.archive.org/web/20140314042301/http://techcrunch.com/2014/03/13/xapo-raises-20-million-to-bury-your-bitcoin-underground/.

Yacine Ghalim and Max Nieferhofer, bitcoin: Primer, State of Play, Discussion. Courmayeur, Sunstone Capital (Jan. 24, 2014).

(56)  References Cited

OTHER PUBLICATIONS

Office Action for U.S. Appl. No. 17/721,042, dated Apr. 18, 2025, 29 Pages.
Feruz K. El may et al., "Using NFTs and Blockchain for Traceability and Auctioning of Shipping Containers and Cargo in MaritimeIndustry", Oct. 27, 2022 (Year: 2022) 16 pages.
Bob Sullivan, 'Deadbeat bidders' dog eBay sellers, NBCNews.com (published Sep. 5, 2002), http://www.nbcnews.com/id/3078738/ns/technology_and_sciencetech_and_gadgets/t/deadbeat-bidders-dog-ebay-sellers/#.U4inz_IdXuS (last visted May 30, 2014).

* cited by examiner

Transaction Ledger 115

| Transaction ID | Date | Fee | Origin Identifiers | Amount from Origin | Destination Identifiers | Destination Amount |
|---|---|---|---|---|---|---|
| f06dbf23bc659c77c155f337 3aa5e41cdc1c75da6136685 95c017b13d7b7c16552 | 2014-06-24 20:41:32 | 0 | 19Zmw5kMbKTjA7qRLkd1JEkwLqgPaaMRRLDkh 19Zmw5kMbKTjA7qRLkd1JEkwLqgPaaMRRLDkh | 500 500 | 122BNky4vmuUH3r69mdEm3mN4nb73c1UgNKt | 1000 |
| 9cd9cef3b969935c8c3a1b7c 1f6a0dle17a3d0f94c575b7 92638beff85c0663fe58 | 2014-06-24 20:41:32 | 0.0001 | 1EvwbspD9jVbH2ZSq6TFbPxRkM48ej5YqP | 45.9983 | 1PXdpLs2K3ETn9vcL4SRp3UiHxtHiltAJtzXb 1KS6XTQXH2sUJ51GG965Rkncn8Ym5ejiRKKGC | 42.1724747 3.8257253 |
| 5f5fa5557633e51c8ab20e b461552a974423c7b3a38b7 414e7c572d41efd9c830 | 2014-06-24 20:41:32 | 0 | 15u7FXfrfaW7EYWwivZay69dsaahXb85Rtw | 303.52706127 | 17ZQyJ7KgfNihGYwVYLcBgdDi6ByyRUcqZ6G 12eqJ25cQpRoYqpa6BxGrWq8pBd5Upwr2qCak | 154.77363532 149.15342595 |
| 53593f6b198kb3fcbc8d15e e38bb735c8929dd360ea05 e27a19514bcAbe82dde9f | 2014-06-24 20:41:32 | 0.00005 | 1JW8RphYffsnTyV4W52GHpm9Q2hA2wVPvap | 18.04755292 | 1BvSz1SSkSWp3pgVDtvVtTWQaFFauXoUk 1GnhQNCXqguuxqgeGAetVsjjmqxPtk8P7Zy4EV | 17.2974792 0.75 |
| 4616da18de889443f33da984 12a6fc8f70c5c084363d7d7f b28b9ea9f986f31b55ef | 2014-06-24 20:41:32 | 0.0001 | 1GD64WARGDLYG71WTTgCpRMpcePr18nmGij | 5 | 1Hrj1qLl4cer7yUjNP8pPc5mhQoifGsqW3NfFA 1MRNnusa3D4soxzig55fvwmK1thDnR9w3ZJ 1GD64WARGDLYG71WTTgCpRMpcePr18nmGij | 3.457003882 0.013883369 1.52897749 |

FIG. 2

Figure 2A:
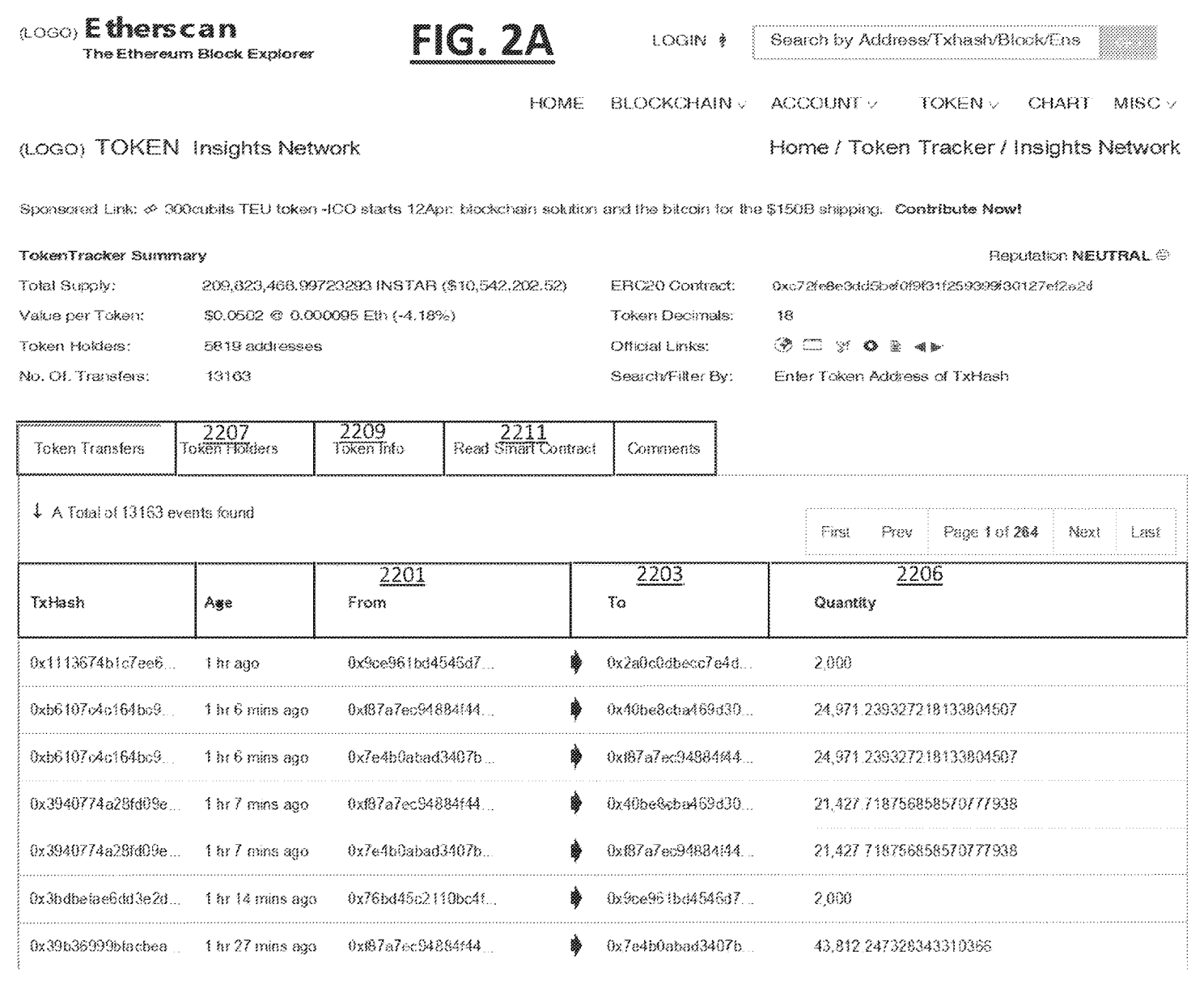

FIG. 2A (LOGO) Etherscan
The Ethereum Block Explorer

LOGIN ⇅    Search by Address/Txhash/Block/Ens

HOME   BLOCKCHAIN ⌄   ACCOUNT ⌄   TOKEN ⌄   CHART ⌄   MISC ⌄

(LOGO) TOKEN Insights Network

Home / Token Tracker / Insights Network

Sponsored Link: ⇔ 300cubits TEU token -ICO starts 12Apr: blockchain solution and the bitcoin for the $150B shipping. Contribute Now!

TokenTracker Summary        Reputation NEUTRAL ⊜

| | |
|---|---|
| Total Supply: | 209,323,468.99752923 INSTAR ($10,542,202.52) |
| Value per Token: | $0.0502 @ 0.000095 Eth (-4.18%) |
| Token Holders: | 5819 addresses |
| No. Of Transfers: | 13163 |

| | |
|---|---|
| ERC20 Contract: | 0x72e6e3dd5bcf099b11e5999993fi27e12a24 |
| Token Decimals: | 18 |
| Official Links: | ⊕ ⊡ ⊠ ❤ ⊜ 🖶 ◀ ⬇ |
| Search/Filter By: | Enter Token Address of TxHash |

| Token Transfers | 2207 Token Holders | 2209 Token Info | 2211 Read Smart Contract | Comments |
|---|---|---|---|---|

↓ A Total of 13163 events found

First   Prev   Page 1 of 264   Next   Last

| TxHash | Age | 2201 From | | 2203 To | 2206 Quantity |
|---|---|---|---|---|---|
| 0x1113574b1c7ee6... | 1 hr ago | 0x6ce861bd4545d7... | ⬌ | 0xa0c0dbecc7e4d... | 2,000 |
| 0xb6107c4c164bc9... | 1 hr 6 mins ago | 0x87a7ec94884f44... | ⬌ | 0x40he8cba469d30... | 24,971.23932721813384507 |
| 0xb6107c4c164bc9... | 1 hr 6 mins ago | 0x7e4b0abad3407b... | ⬌ | 0x87a7ec94884f44... | 24,971.23932721813384507 |
| 0x3940774a28fd89e... | 1 hr 7 mins ago | 0x87a7ec94884f44... | ⬌ | 0x40he8cba469d30... | 21,427.71875685870177938 |
| 0x3940774a28fd89e... | 1 hr 7 mins ago | 0x7e4b0abad3407b... | ⬌ | 0x87a7ec94884f44... | 21,427.71875685870177938 |
| 0x3bdhefae6fd3e2d... | 1 hr 14 mins ago | 0x76b445c2110bc4f... | ⬌ | 0x6ce96b1bd4545d7... | 2,000 |
| 0x39b36699bacbea... | 1 hr 27 mins ago | 0x87a7ec94884f44... | ➡ | 0x7e4b0abad3407b... | 43,812.24732843310366 |

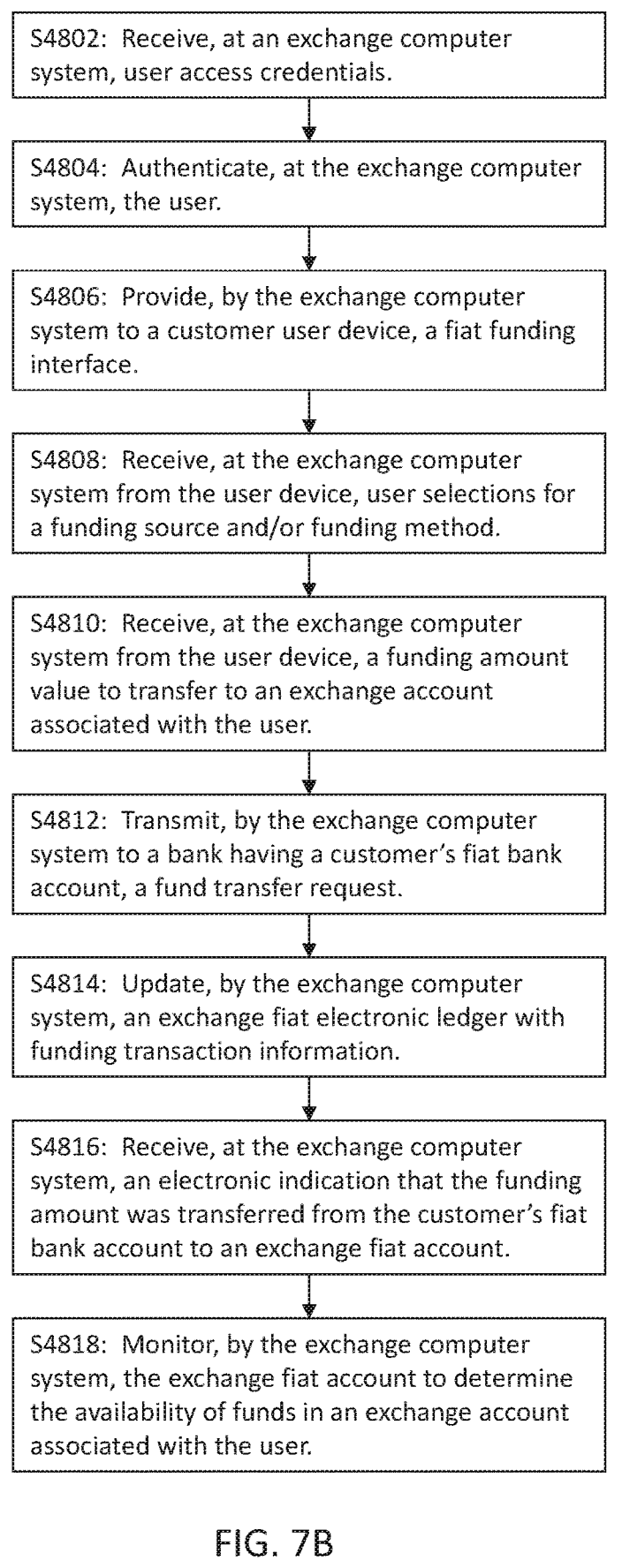

S4802: Receive, at an exchange computer system, user access credentials.

↓

S4804: Authenticate, at the exchange computer system, the user.

↓

S4806: Provide, by the exchange computer system to a customer user device, a fiat funding interface.

↓

S4808: Receive, at the exchange computer system from the user device, user selections for a funding source and/or funding method.

↓

S4810: Receive, at the exchange computer system from the user device, a funding amount value to transfer to an exchange account associated with the user.

↓

S4812: Transmit, by the exchange computer system to a bank having a customer's fiat bank account, a fund transfer request.

↓

S4814: Update, by the exchange computer system, an exchange fiat electronic ledger with funding transaction information.

↓

S4816: Receive, at the exchange computer system, an electronic indication that the funding amount was transferred from the customer's fiat bank account to an exchange fiat account.

↓

S4818: Monitor, by the exchange computer system, the exchange fiat account to determine the availability of funds in an exchange account associated with the user.

FIG. 7B

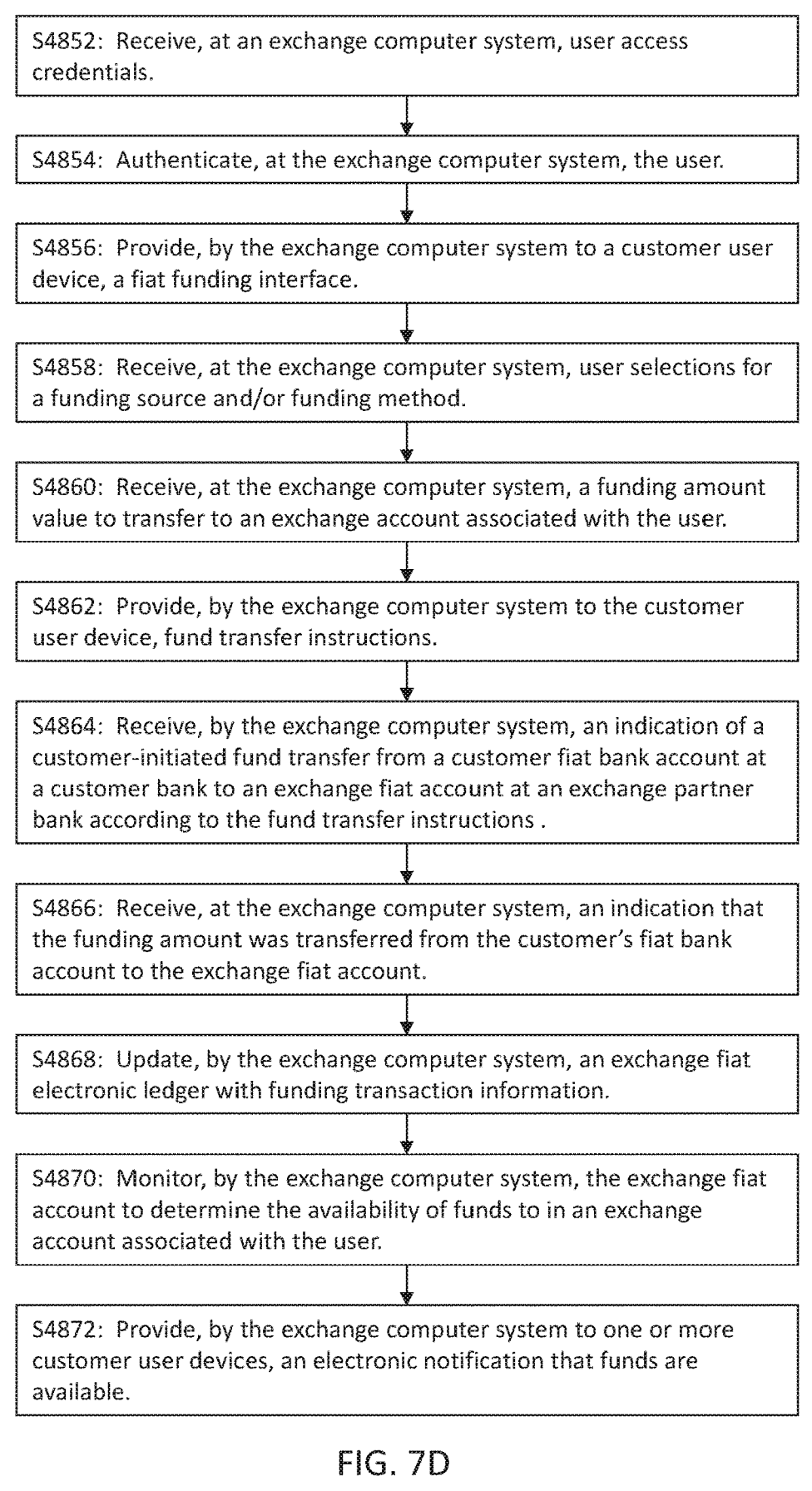

S4852: Receive, at an exchange computer system, user access credentials.

↓

S4854: Authenticate, at the exchange computer system, the user.

↓

S4856: Provide, by the exchange computer system to a customer user device, a fiat funding interface.

↓

S4858: Receive, at the exchange computer system, user selections for a funding source and/or funding method.

↓

S4860: Receive, at the exchange computer system, a funding amount value to transfer to an exchange account associated with the user.

↓

S4862: Provide, by the exchange computer system to the customer user device, fund transfer instructions.

↓

S4864: Receive, by the exchange computer system, an indication of a customer-initiated fund transfer from a customer fiat bank account at a customer bank to an exchange fiat account at an exchange partner bank according to the fund transfer instructions .

↓

S4866: Receive, at the exchange computer system, an indication that the funding amount was transferred from the customer's fiat bank account to the exchange fiat account.

↓

S4868: Update, by the exchange computer system, an exchange fiat electronic ledger with funding transaction information.

↓

S4870: Monitor, by the exchange computer system, the exchange fiat account to determine the availability of funds to in an exchange account associated with the user.

↓

S4872: Provide, by the exchange computer system to one or more customer user devices, an electronic notification that funds are available.

FIG. 7D

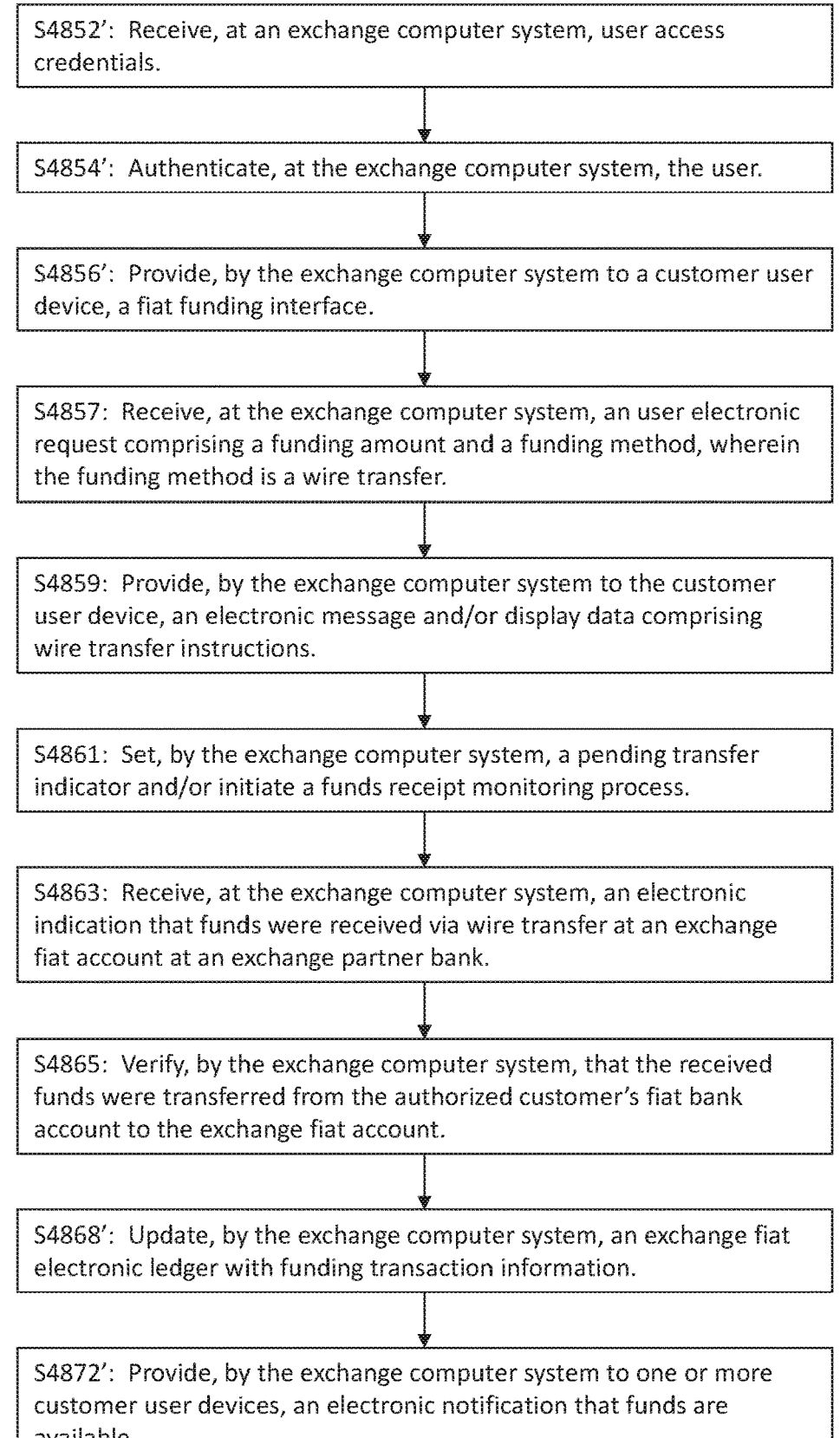

S4852': Receive, at an exchange computer system, user access credentials.

S4854': Authenticate, at the exchange computer system, the user.

S4856': Provide, by the exchange computer system to a customer user device, a fiat funding interface.

S4857: Receive, at the exchange computer system, an user electronic request comprising a funding amount and a funding method, wherein the funding method is a wire transfer.

S4859: Provide, by the exchange computer system to the customer user device, an electronic message and/or display data comprising wire transfer instructions.

S4861: Set, by the exchange computer system, a pending transfer indicator and/or initiate a funds receipt monitoring process.

S4863: Receive, at the exchange computer system, an electronic indication that funds were received via wire transfer at an exchange fiat account at an exchange partner bank.

S4865: Verify, by the exchange computer system, that the received funds were transferred from the authorized customer's fiat bank account to the exchange fiat account.

S4868': Update, by the exchange computer system, an exchange fiat electronic ledger with funding transaction information.

S4872': Provide, by the exchange computer system to one or more customer user devices, an electronic notification that funds are available.

FIG. 7E

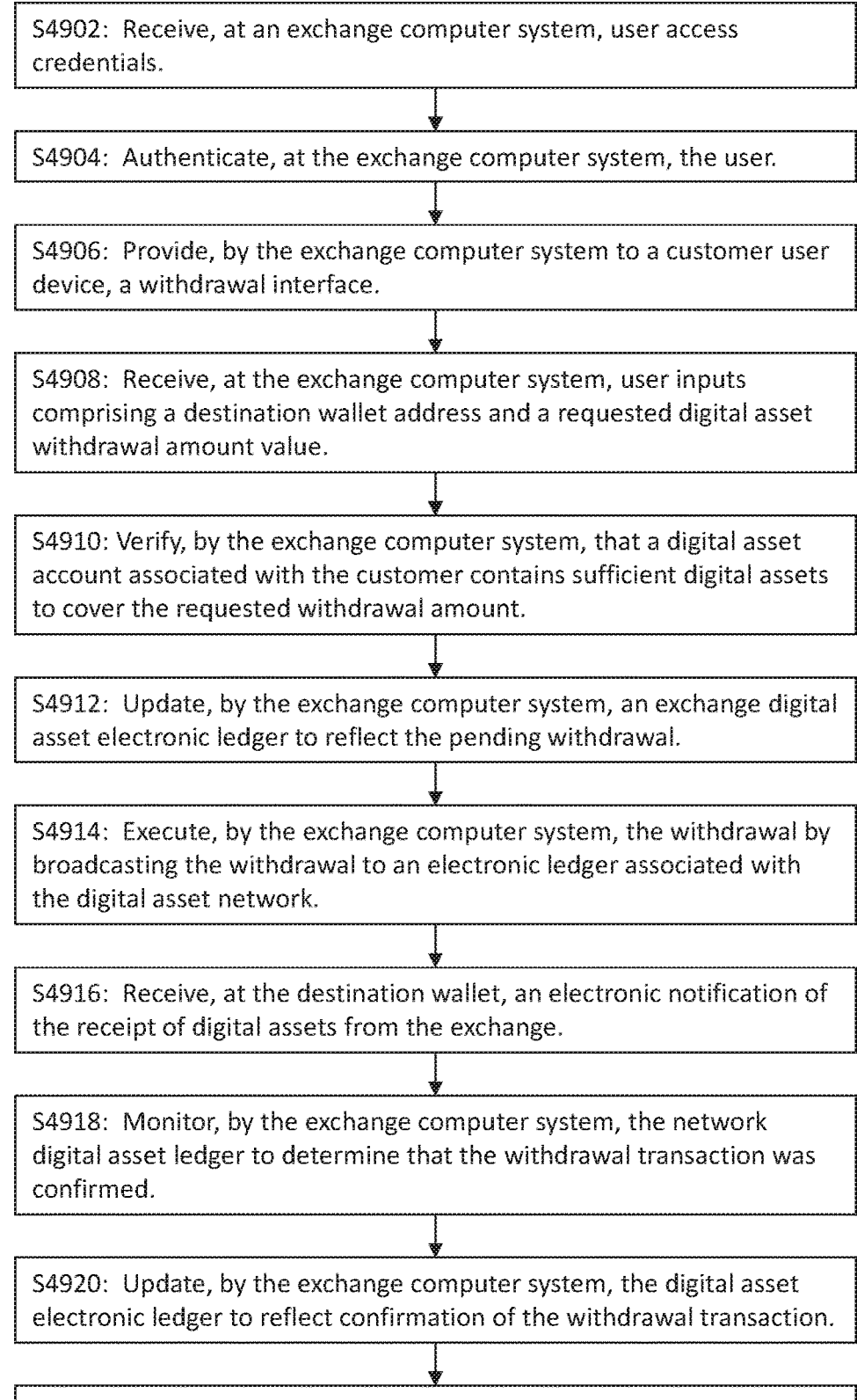

S4902: Receive, at an exchange computer system, user access credentials.

S4904: Authenticate, at the exchange computer system, the user.

S4906: Provide, by the exchange computer system to a customer user device, a withdrawal interface.

S4908: Receive, at the exchange computer system, user inputs comprising a destination wallet address and a requested digital asset withdrawal amount value.

S4910: Verify, by the exchange computer system, that a digital asset account associated with the customer contains sufficient digital assets to cover the requested withdrawal amount.

S4912: Update, by the exchange computer system, an exchange digital asset electronic ledger to reflect the pending withdrawal.

S4914: Execute, by the exchange computer system, the withdrawal by broadcasting the withdrawal to an electronic ledger associated with the digital asset network.

S4916: Receive, at the destination wallet, an electronic notification of the receipt of digital assets from the exchange.

S4918: Monitor, by the exchange computer system, the network digital asset ledger to determine that the withdrawal transaction was confirmed.

S4920: Update, by the exchange computer system, the digital asset electronic ledger to reflect confirmation of the withdrawal transaction.

S4922: Provide, by the exchange computer system to one or more customer user devices, an electronic notification of the withdrawal.

FIG. 8B

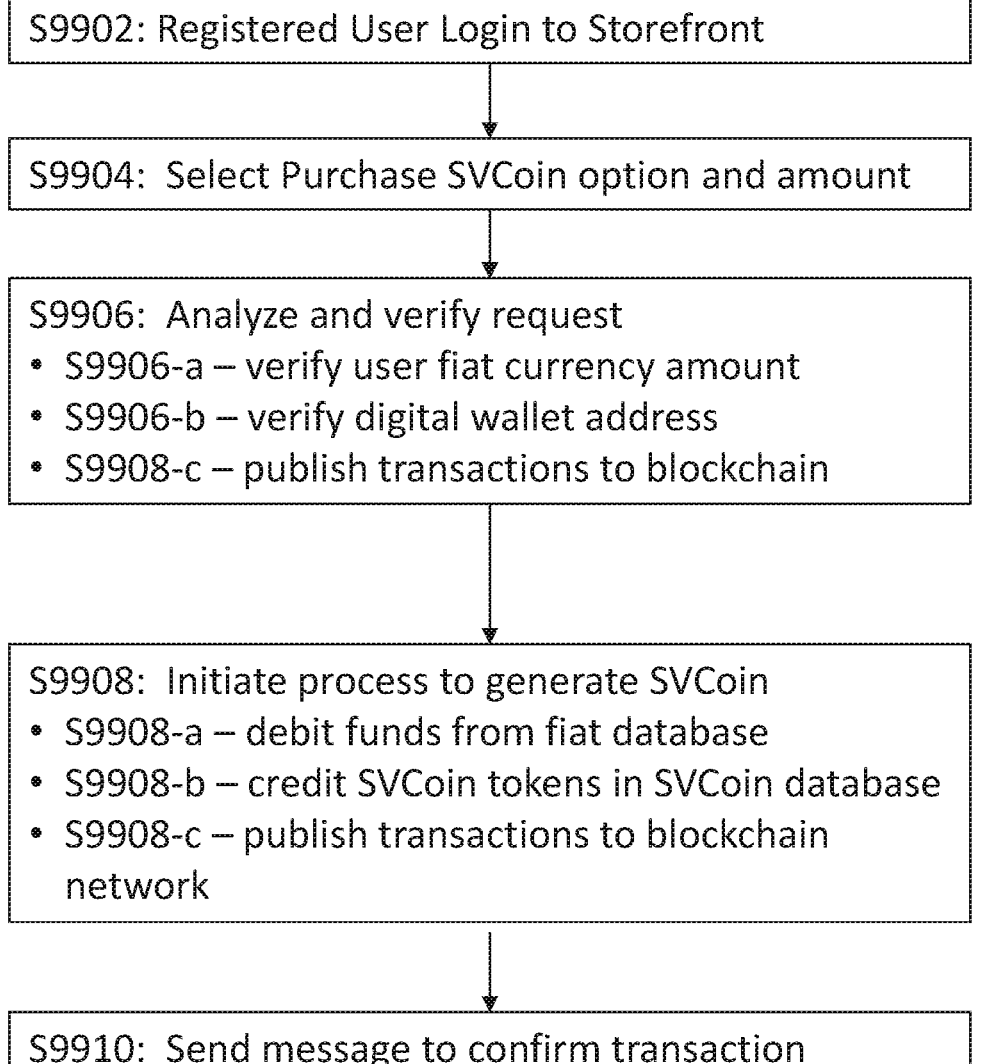

S9902: Registered User Login to Storefront

S9904: Select Purchase SVCoin option and amount

S9906: Analyze and verify request
- S9906-a – verify user fiat currency amount
- S9906-b – verify digital wallet address
- S9908-c – publish transactions to blockchain S9908: Initiate process to generate SVCoin
- S9908-a – debit funds from fiat database
- S9908-b – credit SVCoin tokens in SVCoin database
- S9908-c – publish transactions to blockchain network S9910: Send message to confirm transaction

FIG. 9A

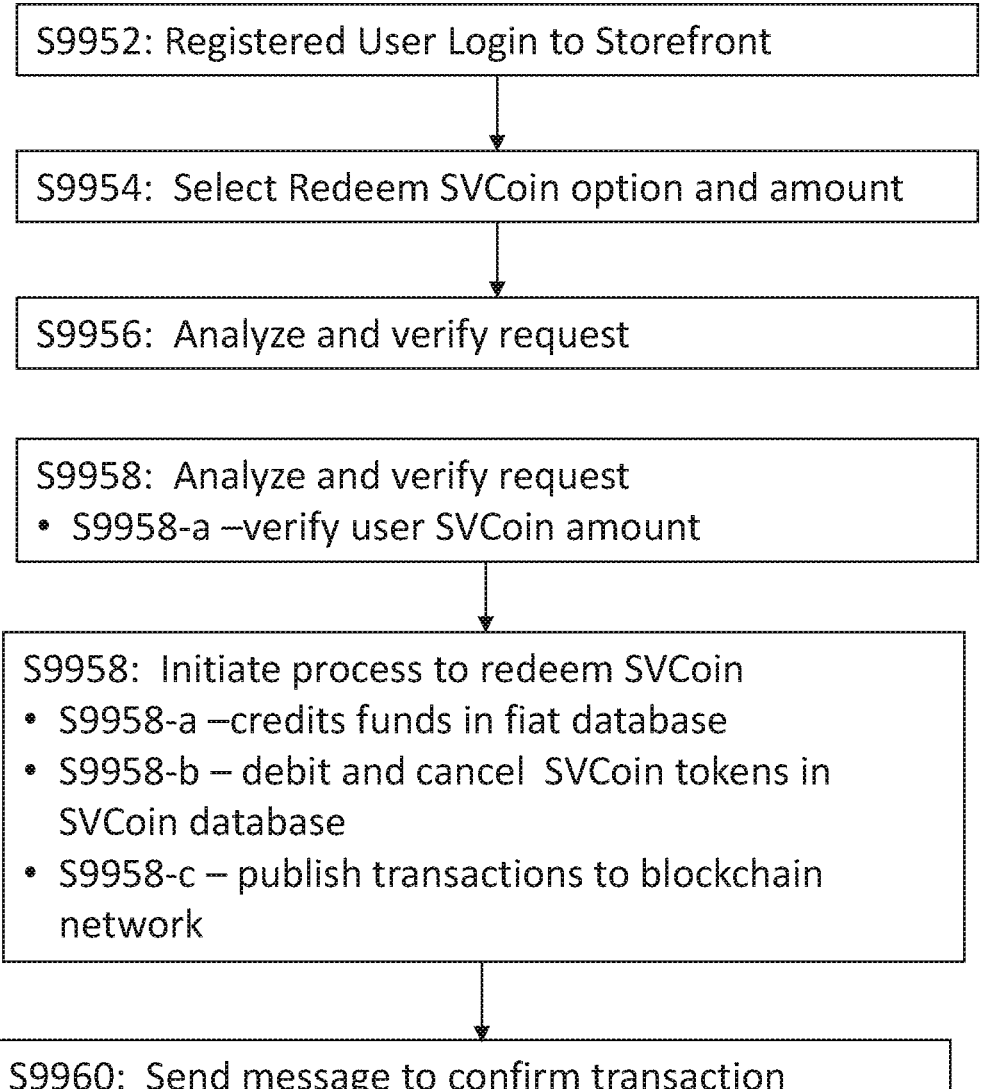

S9952: Registered User Login to Storefront

S9954: Select Redeem SVCoin option and amount

S9956: Analyze and verify request

S9958: Analyze and verify request
• S9958-a –verify user SVCoin amount

S9958: Initiate process to redeem SVCoin
• S9958-a –credits funds in fiat database
• S9958-b – debit and cancel SVCoin tokens in SVCoin database
• S9958-c – publish transactions to blockchain network S9960: Send message to confirm transaction

FIG. 9B

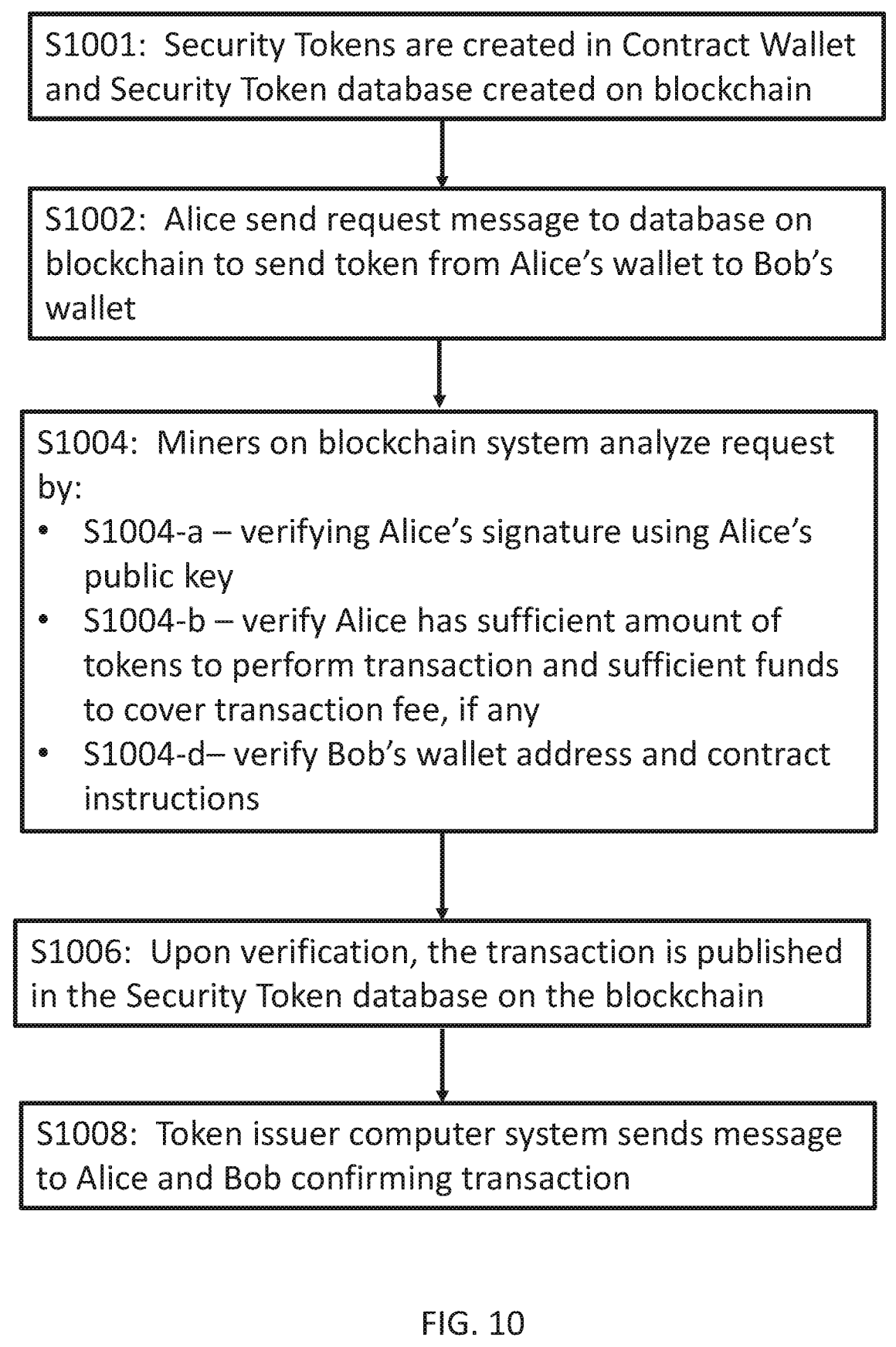

S1001: Security Tokens are created in Contract Wallet and Security Token database created on blockchain S1002: Alice send request message to database on blockchain to send token from Alice's wallet to Bob's wallet S1004: Miners on blockchain system analyze request by:
- S1004-a – verifying Alice's signature using Alice's public key
- S1004-b – verify Alice has sufficient amount of tokens to perform transaction and sufficient funds to cover transaction fee, if any
- S1004-d– verify Bob's wallet address and contract instructions S1006: Upon verification, the transaction is published in the Security Token database on the blockchain S1008: Token issuer computer system sends message to Alice and Bob confirming transaction

FIG. 10

DASHBOARD FIAT INTERFACE

GEMINI

Deposit USD

USD (BANK TRANSFER)    USD (WIRE TRANSFER)    BTC    ETH

1100
FUNDING SOURCE

Any Bank Checking

1102
DEPOSIT AMOUNT 0.00                                            USD

Your deposit will be credited to your Gemini account and will be available for trading immediately. It should fully clear into your Gemini account within 4-5 business days.

REVIEW DEPOSIT

Manage Bank Accounts

ASSET BALANCES

USD: $2,193.87
BTC: 1.74718669 BTC
ETH: 0.3 ETH

BANK TRANSFER DEPOSIT LIMITS

Daily Remaining: $2,500.00
30-Day Remaining: $15,000.00
Need to deposit more than your Bank Transfer (ACH) limits? Wire USD into your account instead.

FIG. 11A-1

DASHBOARD FIAT INTERFACE

GEMINI

TRANSFER FUNDS

Deposit USD

USD (BANK TRANSFER)   USD (WIRE TRANSFER)   BTC   ETH

1100
FUNDING SOURCE

Ally Bank Checking

1102
DEPOSIT AMOUNT 0.00   USD

Wire deposits will require you to contact your approved bank on file, and have funds sent to Gemini.
Please fill out the form above to get the necessary instructions on the wire transfer.

⚠ Wire deposits that originate from the selected bank account above, Gemini will reduce funds originating from an unapproved bank account.

GET INSTRUCTIONS

Manage Bank Accounts

ASSET BALANCES

USD: $3,193.87
BTC: 1.74718888 BTC
ETH: 0.3 ETH

WIRE TRANSFER DEPOSIT LIMITS

Your account does not have any limits for wire deposits.

FIG. 11A-2

DASHBOARD FIAT INTERFACE

GEMINI

Withdraw USD

USD (BANK TRANSFER)    USD (WIRE TRANSFER)    BTC    ETH

WITHDRAWAL DESTINATION    1106

Any Bank Checking

WITHDRAWAL AMOUNT    1104

0.00    MAX    USD

REVIEW WITHDRAWAL

Manage Bank Accounts

ASSET BALANCES

USD: $2,180.97
BTC: 1.747130063 BTC
ETH: 0.5 ETH

BANK TRANSFER WITHDRAWAL LIMITS

Daily Remaining: $100,000.00

FIG. 11A-3

DASHBOARD DIGITAL ASSET INTERFACE

GEMINI

TRANSFER FUNDS

Deposit ETH

USD (BANK TRANSFER)    USD (WIRE TRANSFER)    BTC    ETH

MOST RECENT DEPOSIT ADDRESS    1112

0x45CEF4A5F3C2A3BD0CaFC5553B9965244A2DCB

Label: No label currently set. Edit
Created: May 17 2044 at 10:40:01 AM

ASSET BALANCES

USD: $3,193.97
BTC: 1.74728869 BTC
ETH: 0.5 ETH

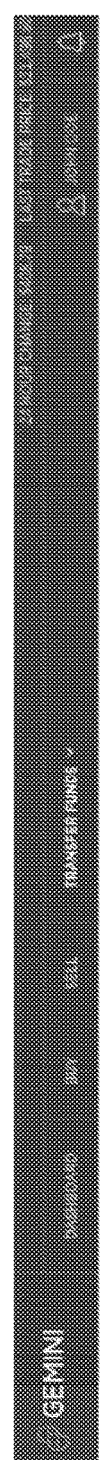

DASHBOARD SECURITY TOKEN INTERFACE

GEMINI

Security Token

SECURITY TOKEN

Security Token Total 1130     SV Coin Total     1132

ASSET BALANCES

USD $1,293.87
BTC 1.74713889 BTC
ETH 0.8 ETH

DESTINATION     1134
WALLET 1

SV COIN AMOUNT          1136
WALLET 1

BANK TRANSFER DEPOSIT LIMITS @

DESTINATION
WALLET 2

SV COIN AMOUNT
WALLET 2

Daily limit remaining $2,589.99
30-Day limit remaining $18,984.99
Need to deposit more than your Bank Transfer (ACH) limits? Wire USD into your Gemini instead.

SUBMIT

FIG. 11D

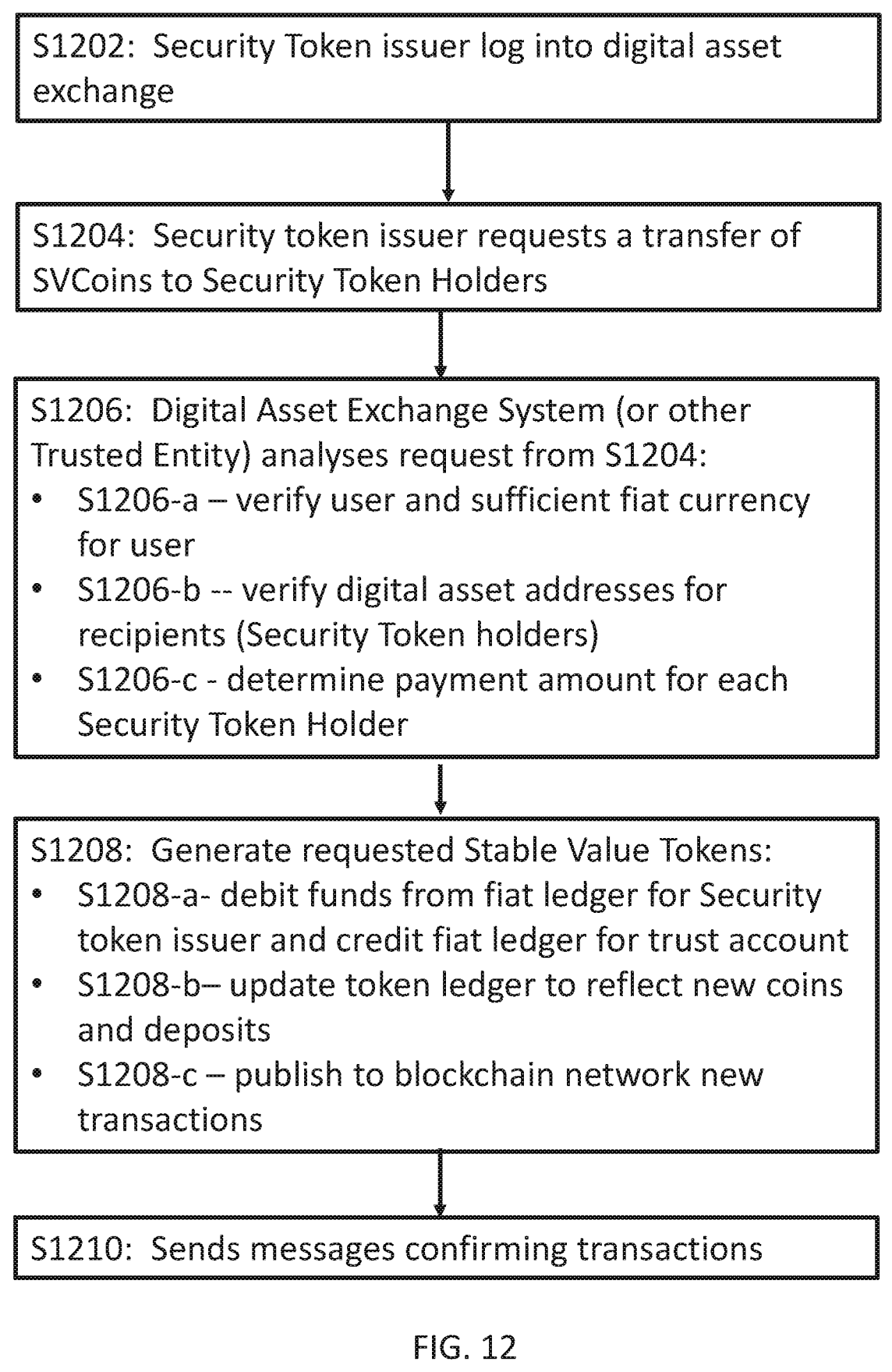

S1202: Security Token issuer log into digital asset exchange

S1204: Security token issuer requests a transfer of SVCoins to Security Token Holders S1206: Digital Asset Exchange System (or other Trusted Entity) analyses request from S1204:
- S1206-a – verify user and sufficient fiat currency for user
- S1206-b -- verify digital asset addresses for recipients (Security Token holders)
- S1206-c - determine payment amount for each Security Token Holder S1208: Generate requested Stable Value Tokens:
- S1208-a- debit funds from fiat ledger for Security token issuer and credit fiat ledger for trust account
- S1208-b– update token ledger to reflect new coins and deposits
- S1208-c – publish to blockchain network new transactions S1210: Sends messages confirming transactions

FIG. 12

| 1310<br><br>ERC20<br>Proxy | S1312<br>impl  →<br><br>←  S1314<br>proxy | 1320<br><br>ERC20<br>Impl | S1322<br>store  →<br><br>←  S1324<br>impl | 1330<br><br>ERC20<br>Store |

1320

ERC20
Impl (1)

S1342
proxy

S1344
store

| 1310<br><br>ERC20<br>Proxy | S1312<br>A impl  →<br><br>←  S1314<br>proxy | 1320A<br><br>ERC20<br>Impl (2) | S1322<br>store  →<br><br>←  S1324<br>impl | 1330<br><br>ERC20<br>Store |

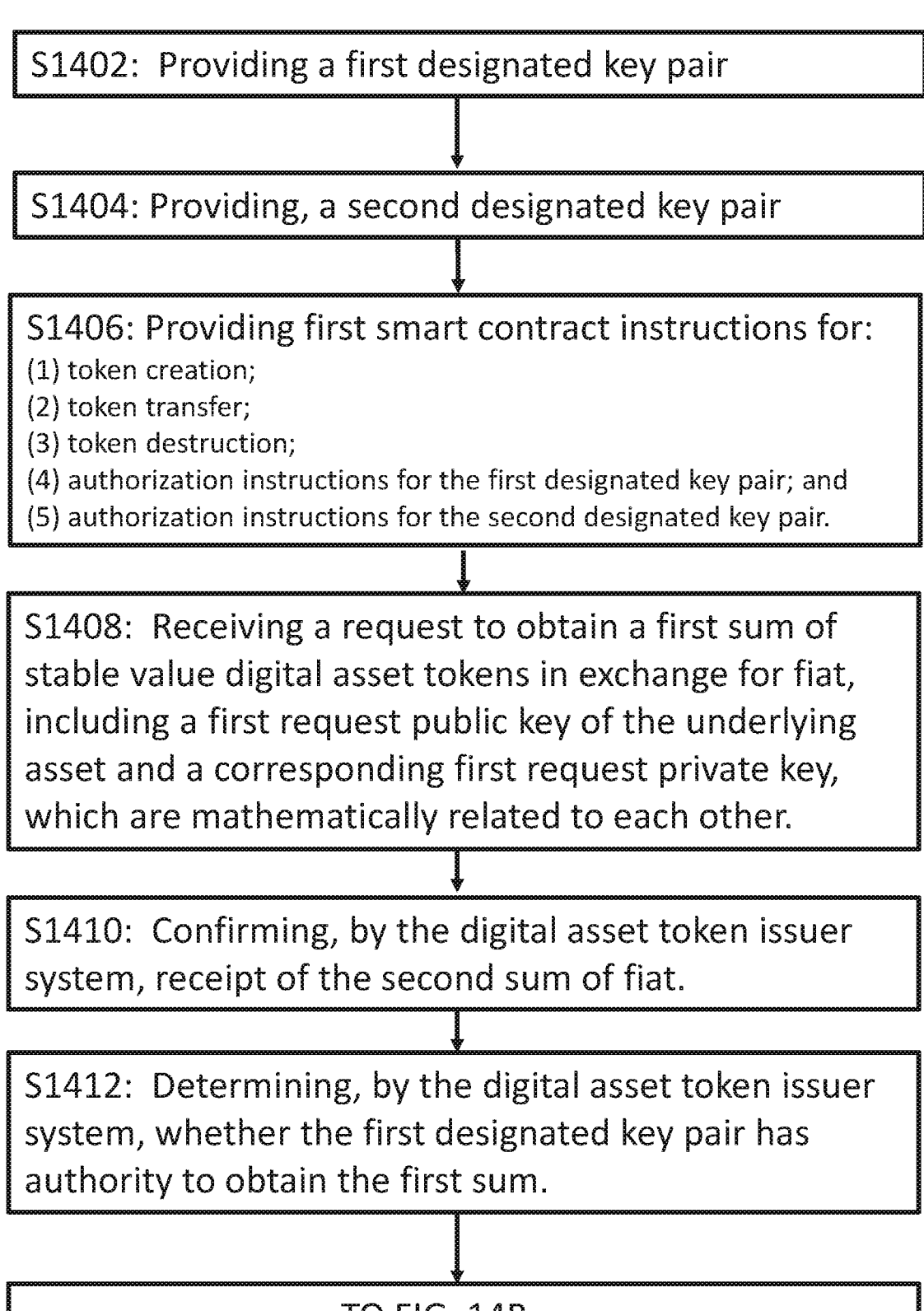

S1402: Providing a first designated key pair

S1404: Providing, a second designated key pair

S1406: Providing first smart contract instructions for:
(1) token creation;
(2) token transfer;
(3) token destruction;
(4) authorization instructions for the first designated key pair; and
(5) authorization instructions for the second designated key pair.

S1408: Receiving a request to obtain a first sum of stable value digital asset tokens in exchange for fiat, including a first request public key of the underlying asset and a corresponding first request private key, which are mathematically related to each other.

S1410: Confirming, by the digital asset token issuer system, receipt of the second sum of fiat.

S1412: Determining, by the digital asset token issuer system, whether the first designated key pair has authority to obtain the first sum.

Figure 14B:
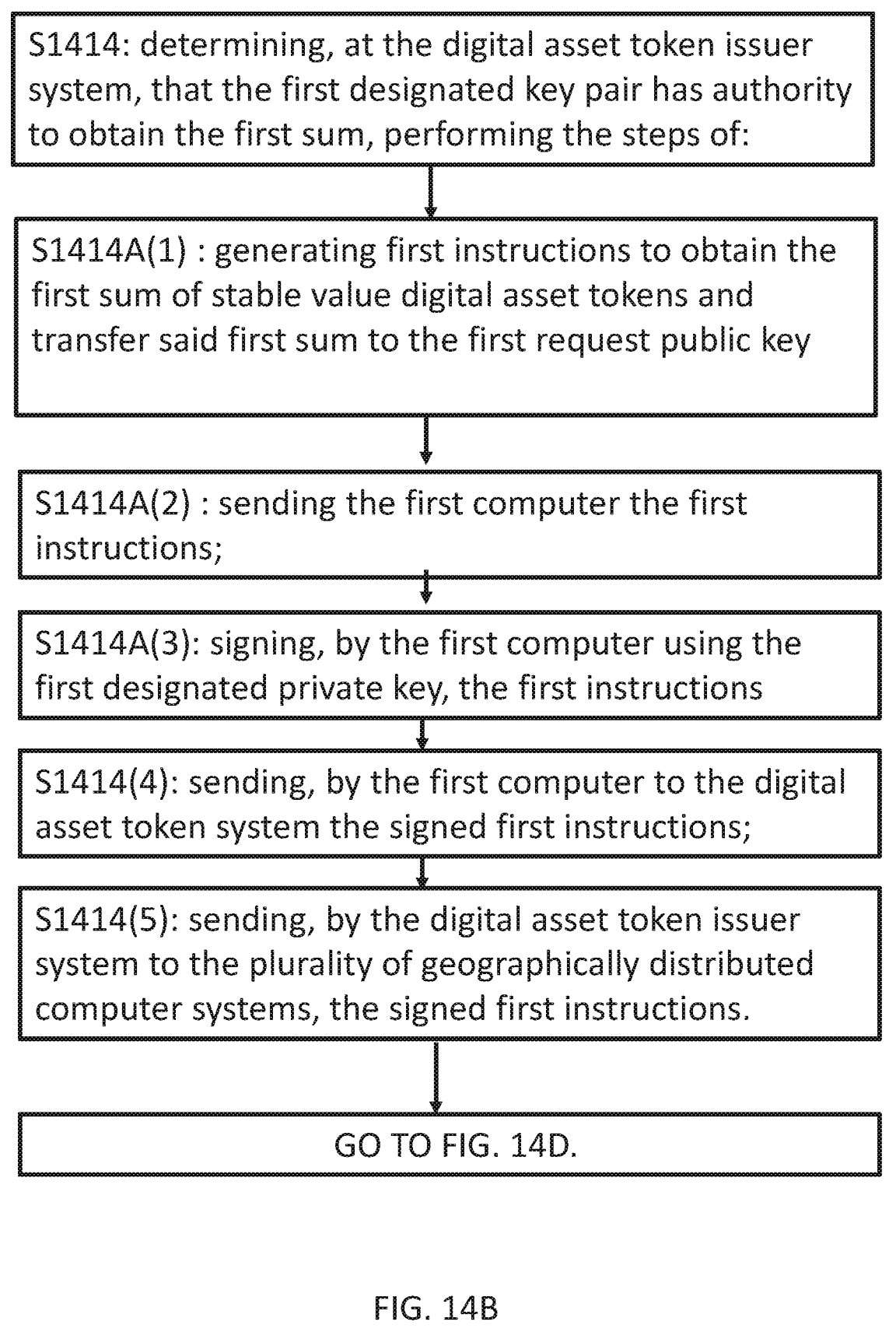

S1414: determining, at the digital asset token issuer system, that the first designated key pair has authority to obtain the first sum, performing the steps of:

S1414A(1) : generating first instructions to obtain the first sum of stable value digital asset tokens and transfer said first sum to the first request public key S1414A(2) : sending the first computer the first instructions;

S1414A(3): signing, by the first computer using the first designated private key, the first instructions S1414(4): sending, by the first computer to the digital asset token system the signed first instructions;

S1414(5): sending, by the digital asset token issuer system to the plurality of geographically distributed computer systems, the signed first instructions.

Figure 14C:
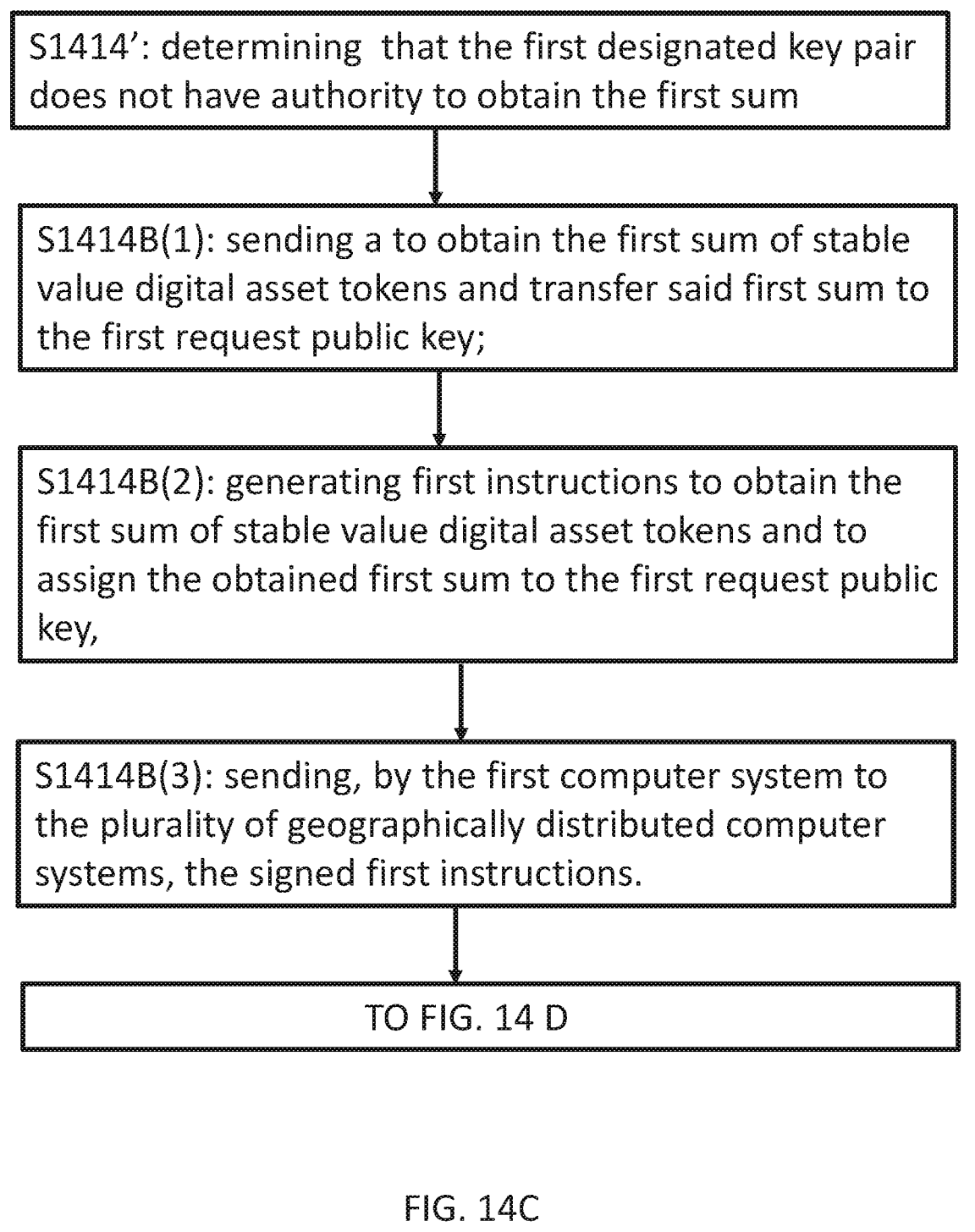

S1414': determining that the first designated key pair does not have authority to obtain the first sum S1414B(1): sending a to obtain the first sum of stable value digital asset tokens and transfer said first sum to the first request public key;

S1414B(2): generating first instructions to obtain the first sum of stable value digital asset tokens and to assign the obtained first sum to the first request public key, S1414B(3): sending, by the first computer system to the plurality of geographically distributed computer systems, the signed first instructions.

Figure 14D:
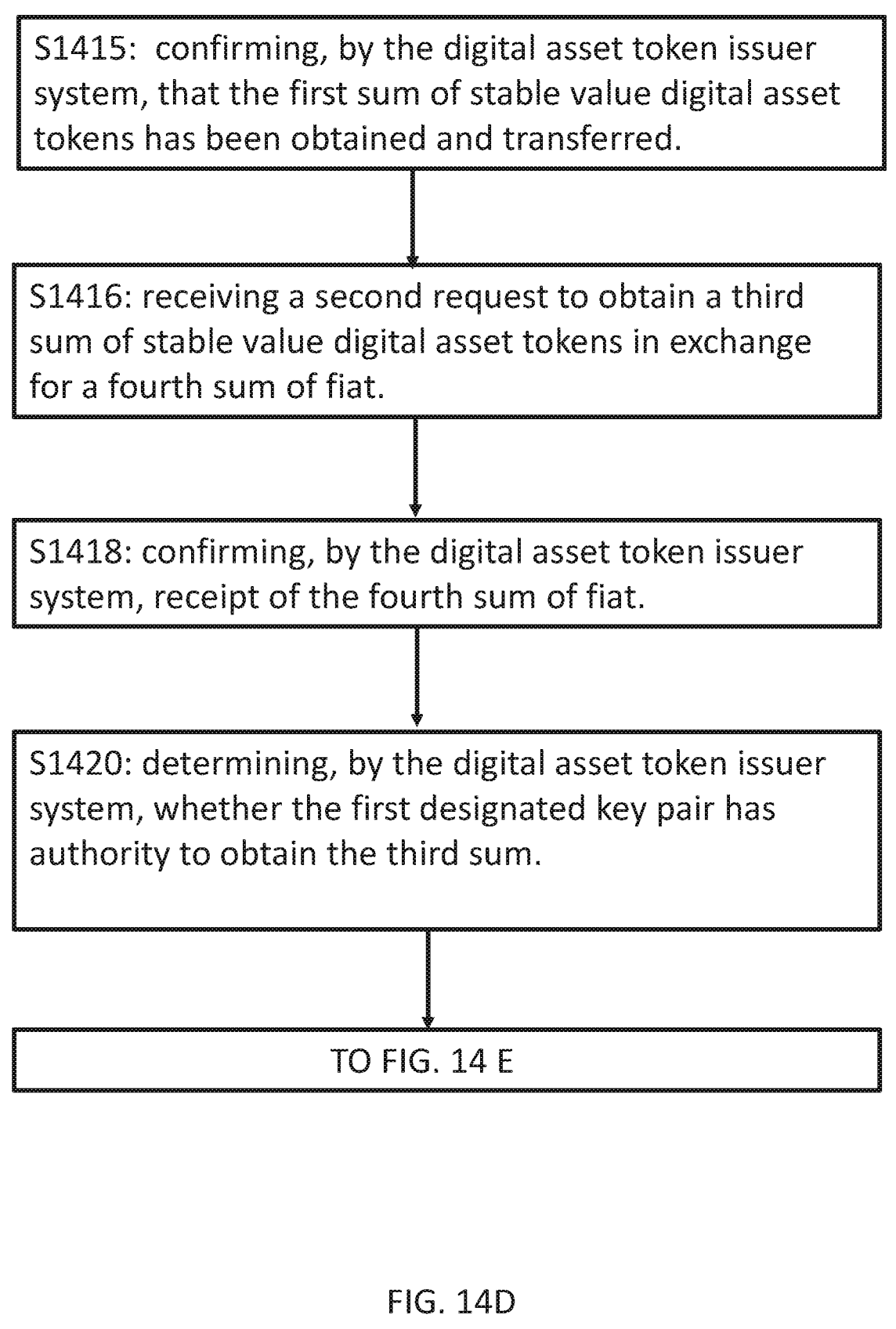

S1415: confirming, by the digital asset token issuer system, that the first sum of stable value digital asset tokens has been obtained and transferred.

S1416: receiving a second request to obtain a third sum of stable value digital asset tokens in exchange for a fourth sum of fiat.

S1418: confirming, by the digital asset token issuer system, receipt of the fourth sum of fiat.

S1420: determining, by the digital asset token issuer system, whether the first designated key pair has authority to obtain the third sum.

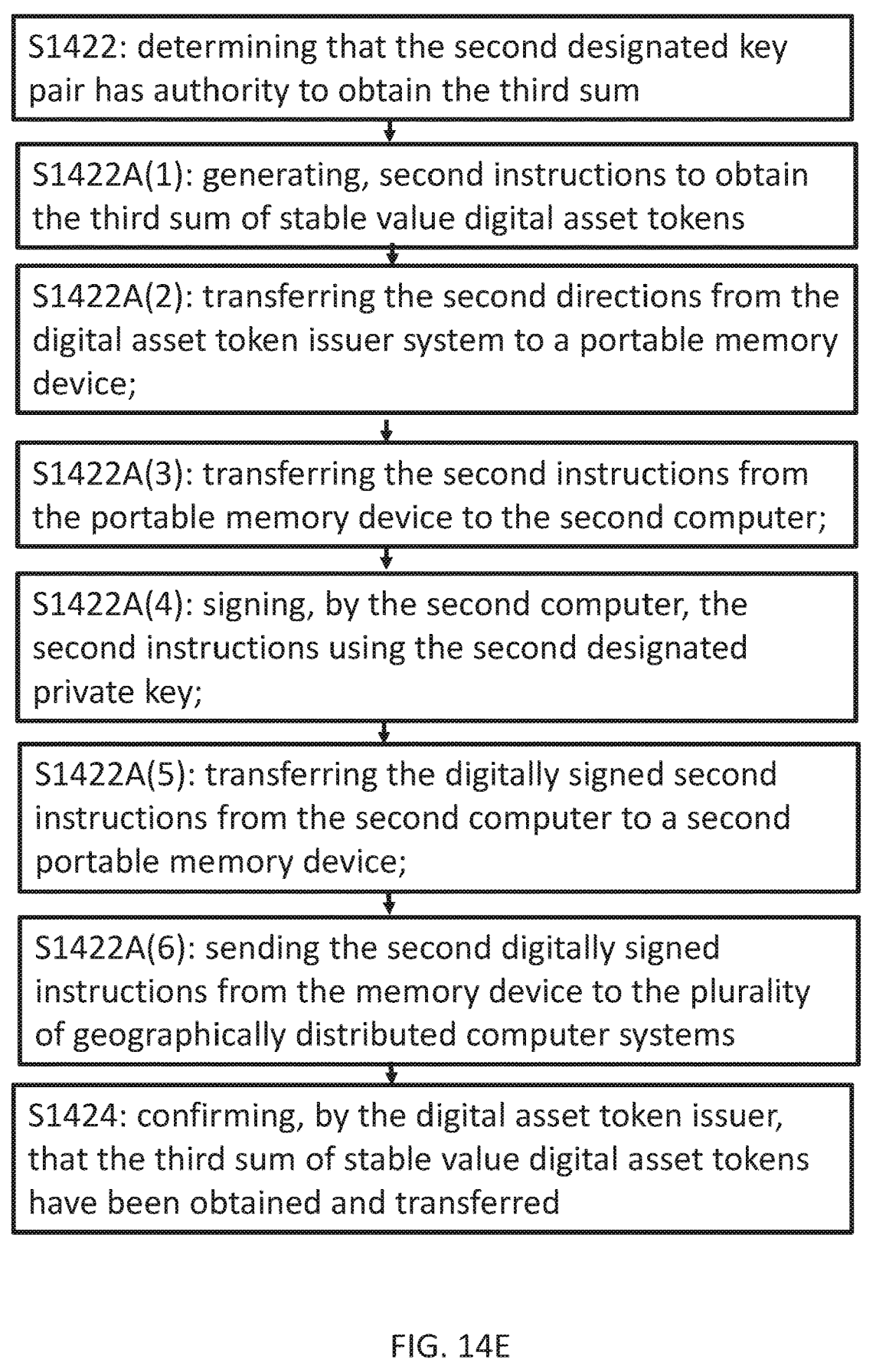

S1422: determining that the second designated key pair has authority to obtain the third sum S1422A(1): generating, second instructions to obtain the third sum of stable value digital asset tokens S1422A(2): transferring the second directions from the digital asset token issuer system to a portable memory device;

S1422A(3): transferring the second instructions from the portable memory device to the second computer;

S1422A(4): signing, by the second computer, the second instructions using the second designated private key;

S1422A(5): transferring the digitally signed second instructions from the second computer to a second portable memory device;

S1422A(6): sending the second digitally signed instructions from the memory device to the plurality of geographically distributed computer systems S1424: confirming, by the digital asset token issuer, that the third sum of stable value digital asset tokens have been obtained and transferred

FIG. 14E

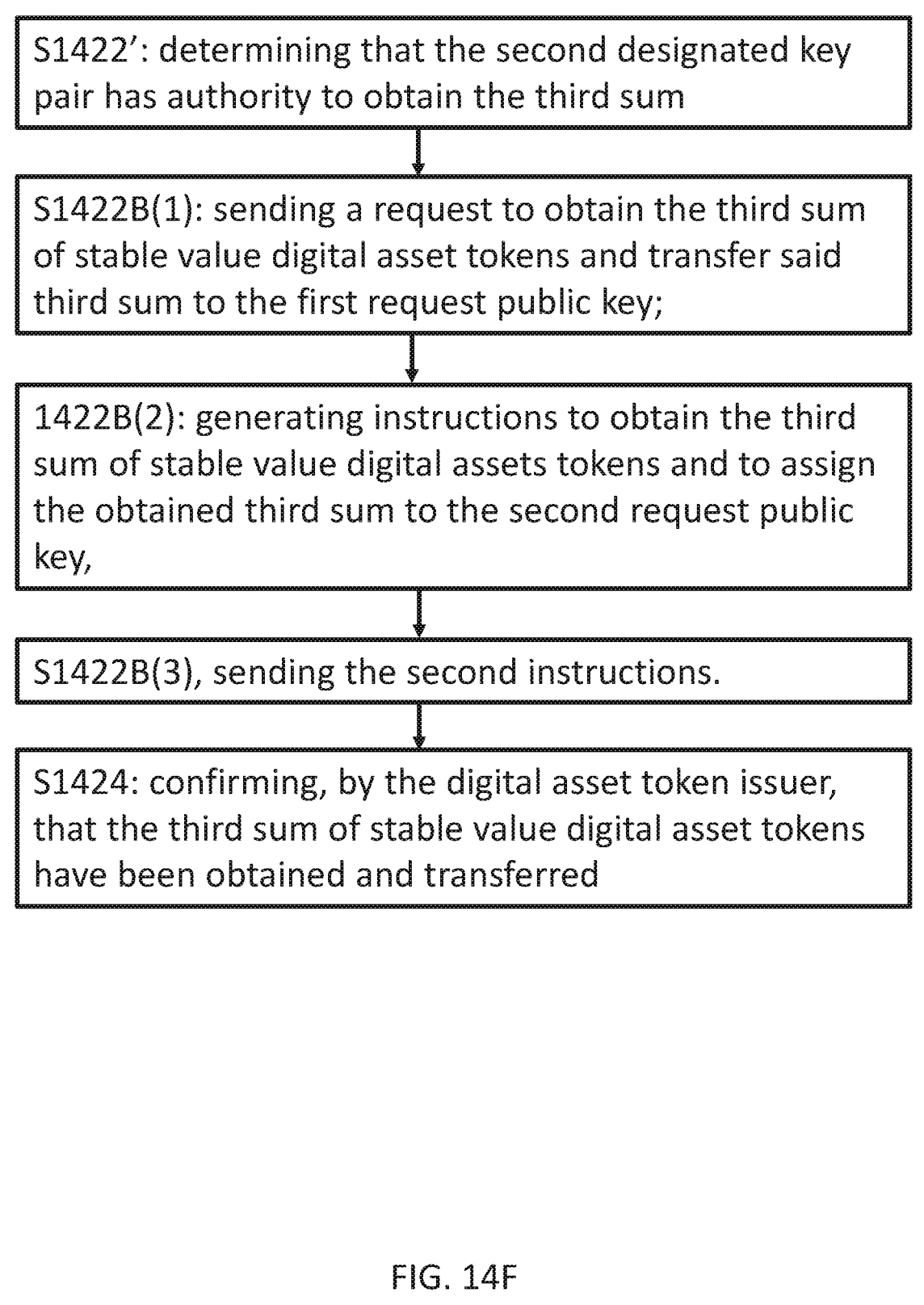

S1422': determining that the second designated key pair has authority to obtain the third sum S1422B(1): sending a request to obtain the third sum of stable value digital asset tokens and transfer said third sum to the first request public key;

1422B(2): generating instructions to obtain the third sum of stable value digital assets tokens and to assign the obtained third sum to the second request public key, S1422B(3), sending the second instructions.

S1424: confirming, by the digital asset token issuer, that the third sum of stable value digital asset tokens have been obtained and transferred

FIG. 14F

Figure 14G:
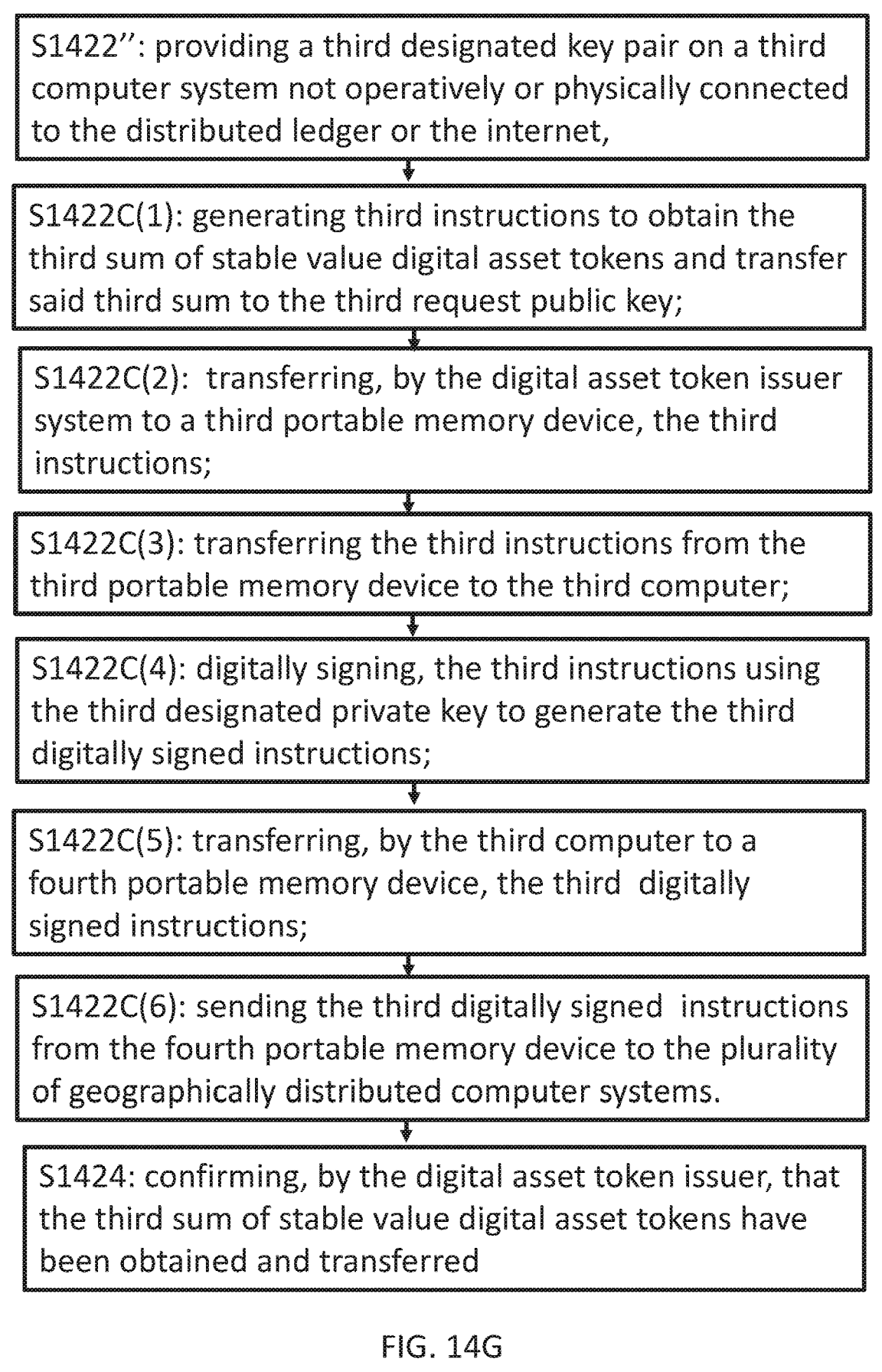

S1422″: providing a third designated key pair on a third computer system not operatively or physically connected to the distributed ledger or the internet,

↓

S1422C(1): generating third instructions to obtain the third sum of stable value digital asset tokens and transfer said third sum to the third request public key;

↓

S1422C(2): transferring, by the digital asset token issuer system to a third portable memory device, the third instructions;

↓

S1422C(3): transferring the third instructions from the third portable memory device to the third computer;

↓

S1422C(4): digitally signing, the third instructions using the third designated private key to generate the third digitally signed instructions;

↓

S1422C(5): transferring, by the third computer to a fourth portable memory device, the third digitally signed instructions;

↓

S1422C(6): sending the third digitally signed instructions from the fourth portable memory device to the plurality of geographically distributed computer systems.

↓

S1424: confirming, by the digital asset token issuer, that the third sum of stable value digital asset tokens have been obtained and transferred

S1602: Authenticating an access request by a first user device to a digital asset exchange computer system S1604: Obtaining a withdraw request from the first user device S1606: Processing the withdraw request S1602A: Receiving, from the first user device, an authentication request including first user credential information associated with the first user

↓

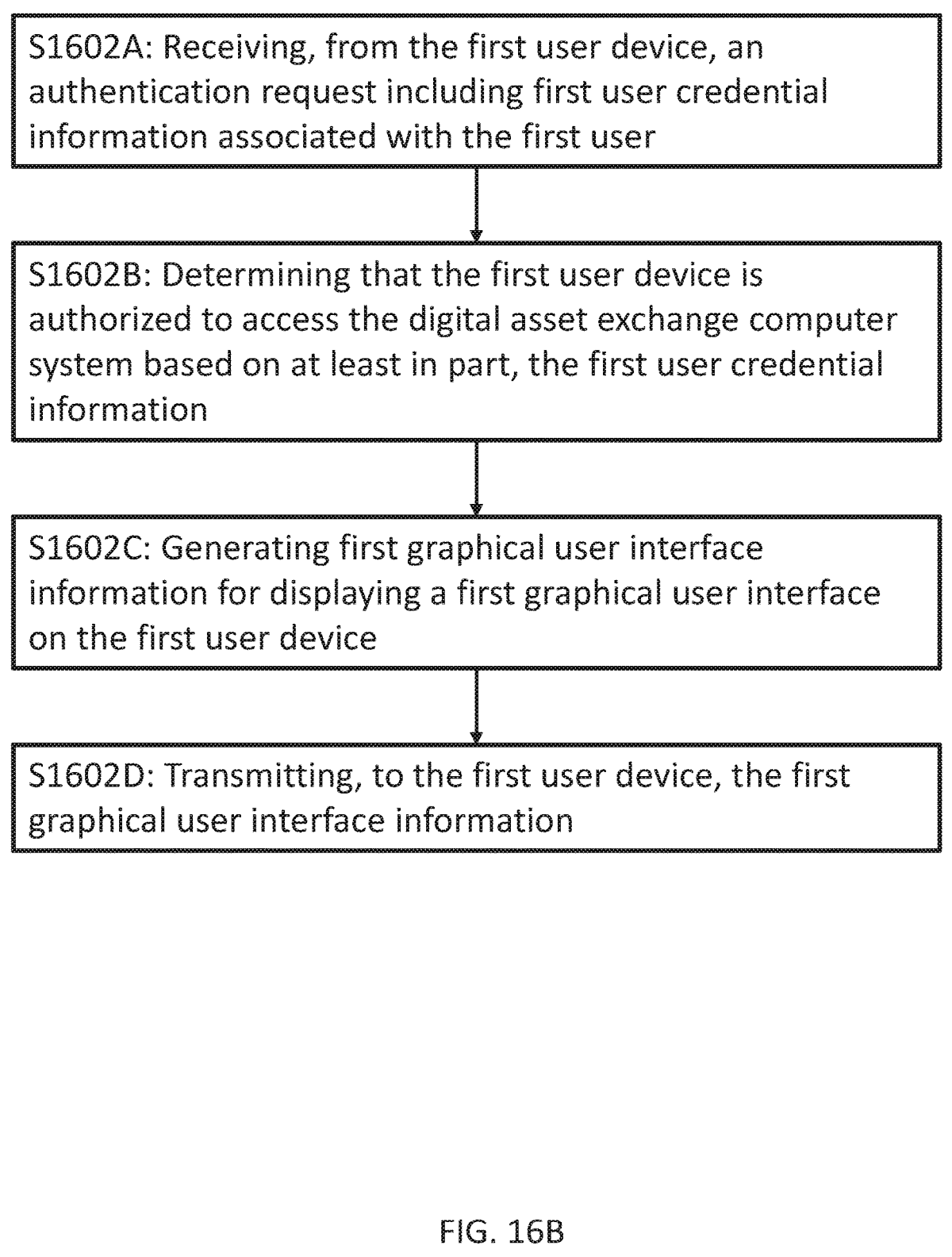

S1602B: Determining that the first user device is authorized to access the digital asset exchange computer system based on at least in part, the first user credential information

↓

S1602C: Generating first graphical user interface information for displaying a first graphical user interface on the first user device

↓

S1602D: Transmitting, to the first user device, the first graphical user interface information

FIG. 16B

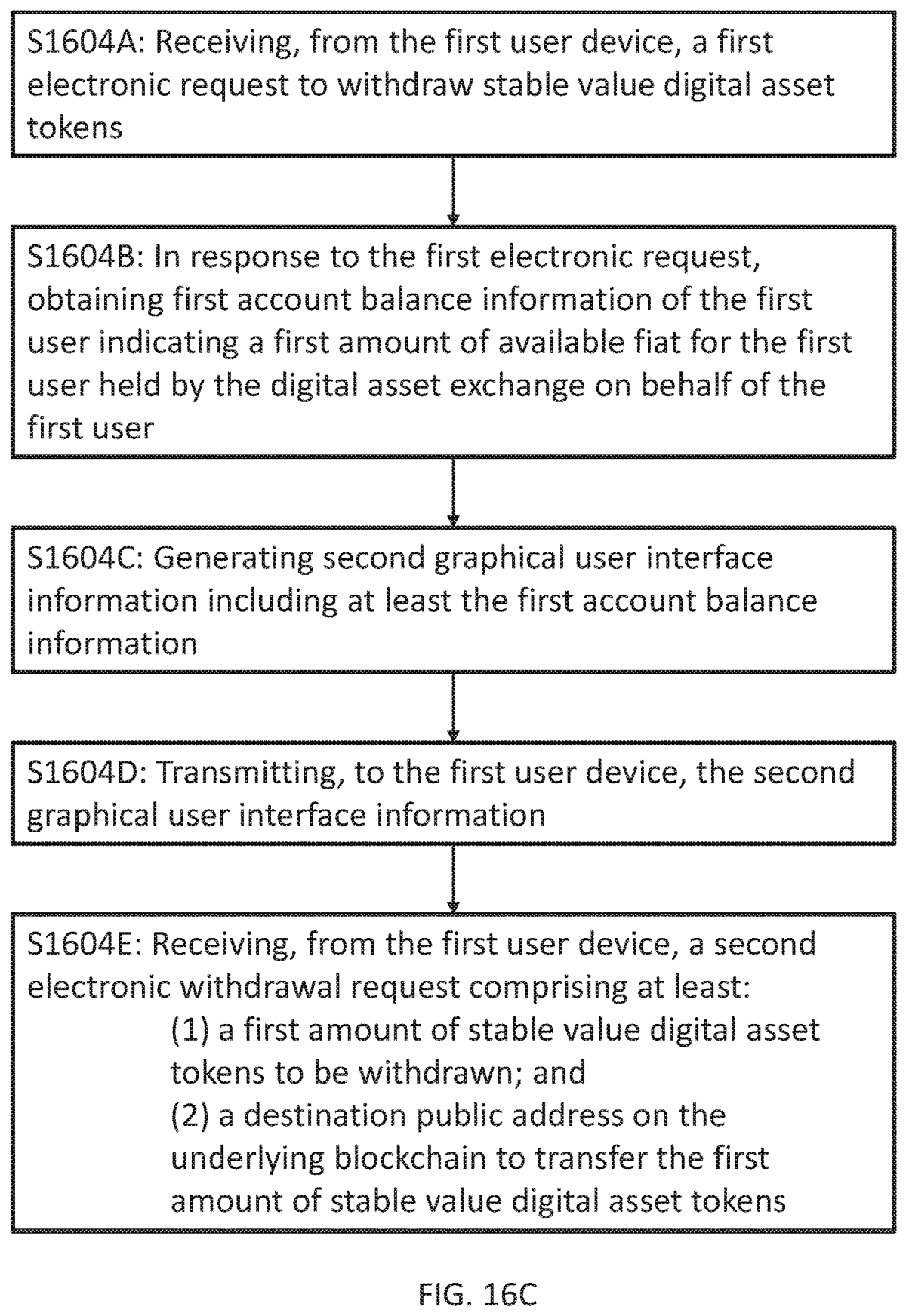

S1604A: Receiving, from the first user device, a first electronic request to withdraw stable value digital asset tokens S1604B: In response to the first electronic request, obtaining first account balance information of the first user indicating a first amount of available fiat for the first user held by the digital asset exchange on behalf of the first user S1604C: Generating second graphical user interface information including at least the first account balance information S1604D: Transmitting, to the first user device, the second graphical user interface information S1604E: Receiving, from the first user device, a second electronic withdrawal request comprising at least:
    (1) a first amount of stable value digital asset tokens to be withdrawn; and
    (2) a destination public address on the underlying blockchain to transfer the first amount of stable value digital asset tokens

FIG. 16C

Figure 16D:
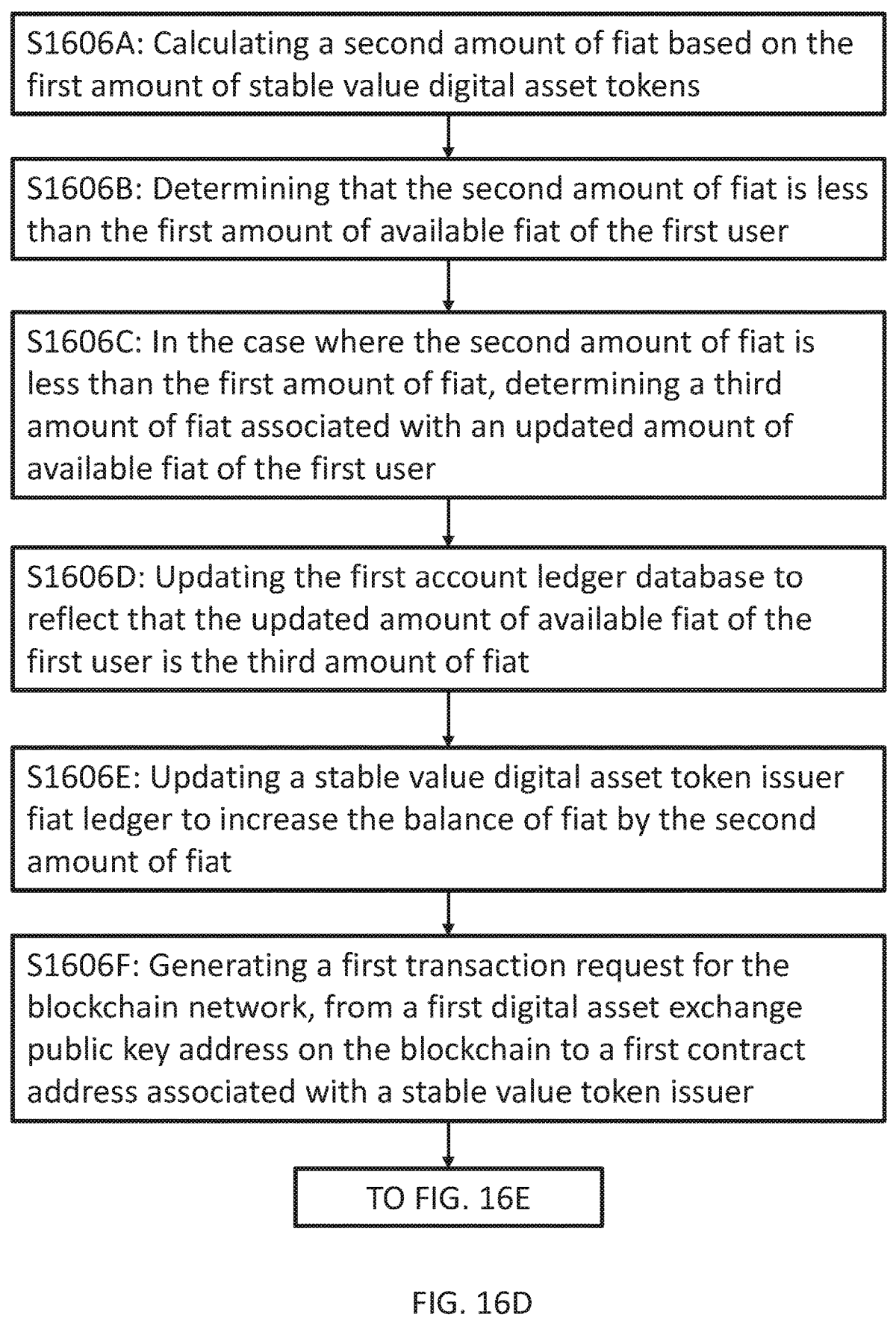

S1606A: Calculating a second amount of fiat based on the first amount of stable value digital asset tokens

↓

S1606B: Determining that the second amount of fiat is less than the first amount of available fiat of the first user

↓

S1606C: In the case where the second amount of fiat is less than the first amount of fiat, determining a third amount of fiat associated with an updated amount of available fiat of the first user

↓

S1606D: Updating the first account ledger database to reflect that the updated amount of available fiat of the first user is the third amount of fiat

↓

S1606E: Updating a stable value digital asset token issuer fiat ledger to increase the balance of fiat by the second amount of fiat

↓

S1606F: Generating a first transaction request for the blockchain network, from a first digital asset exchange public key address on the blockchain to a first contract address associated with a stable value token issuer

FROM FIG. 16D

S1606G: Transmitting, to the blockchain network via the internet, the first transaction request S1606H: Confirming that the balance of stable value digital asset tokens in the first designated public address of the first user includes the first amount of stable value digital asset tokens S1702: Authenticating an access request by a first user device associated with a first user to the digital asset exchange computer system S1704: Obtaining a deposit request S1706: Processing a second electronic deposit request S1702A: Receiving, from the first user device, an authentication request including first user credential information associated with the first user S1702B: Determining that the first user device is authorized to access the digital asset exchange computer system based on at least in part, the first user credential information S1702C: Generating first graphical user interface information for displaying a first graphical user interface on the first user device S1702D: Transmitting, to the first user device, the first graphical user interface information

FIG. 17B

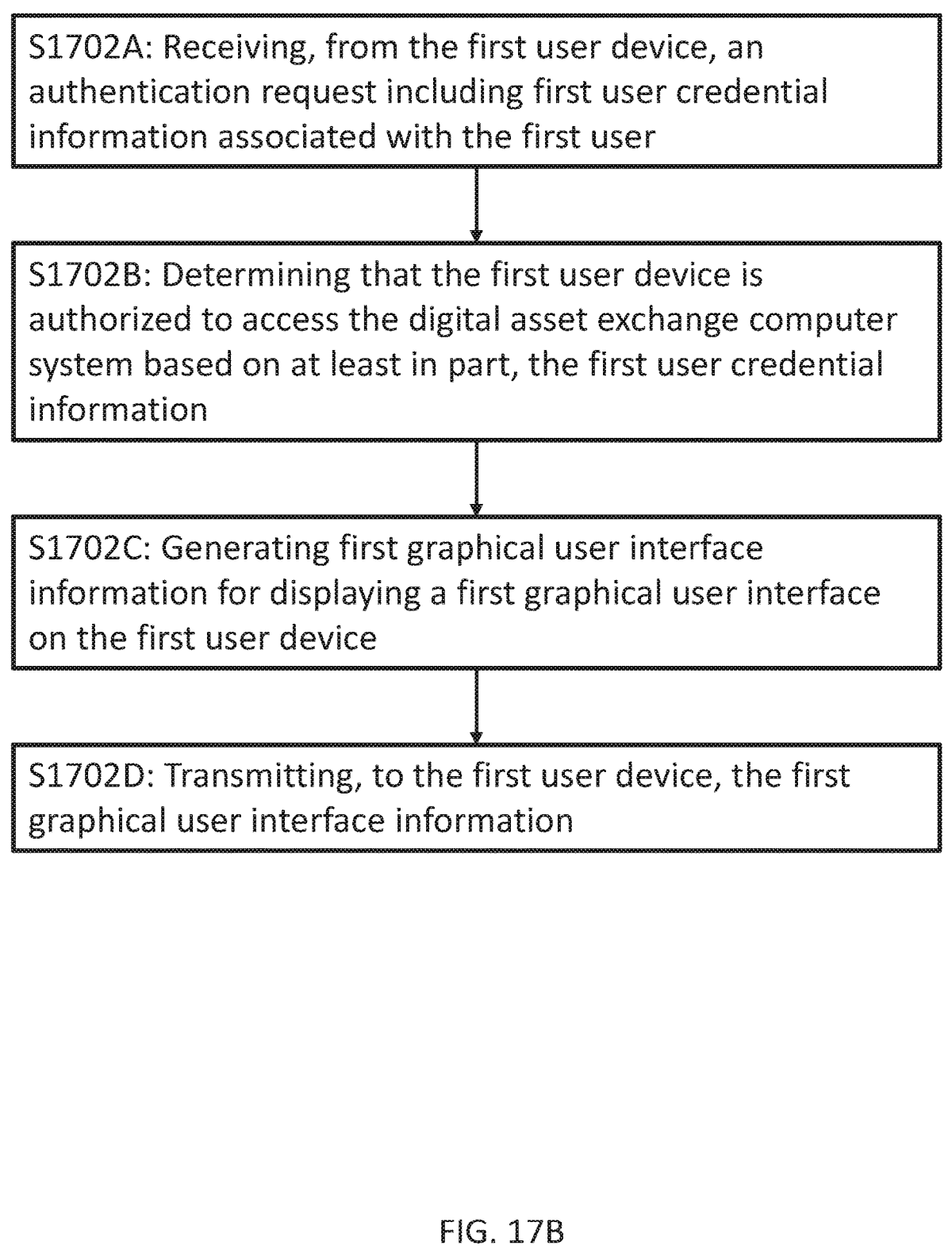

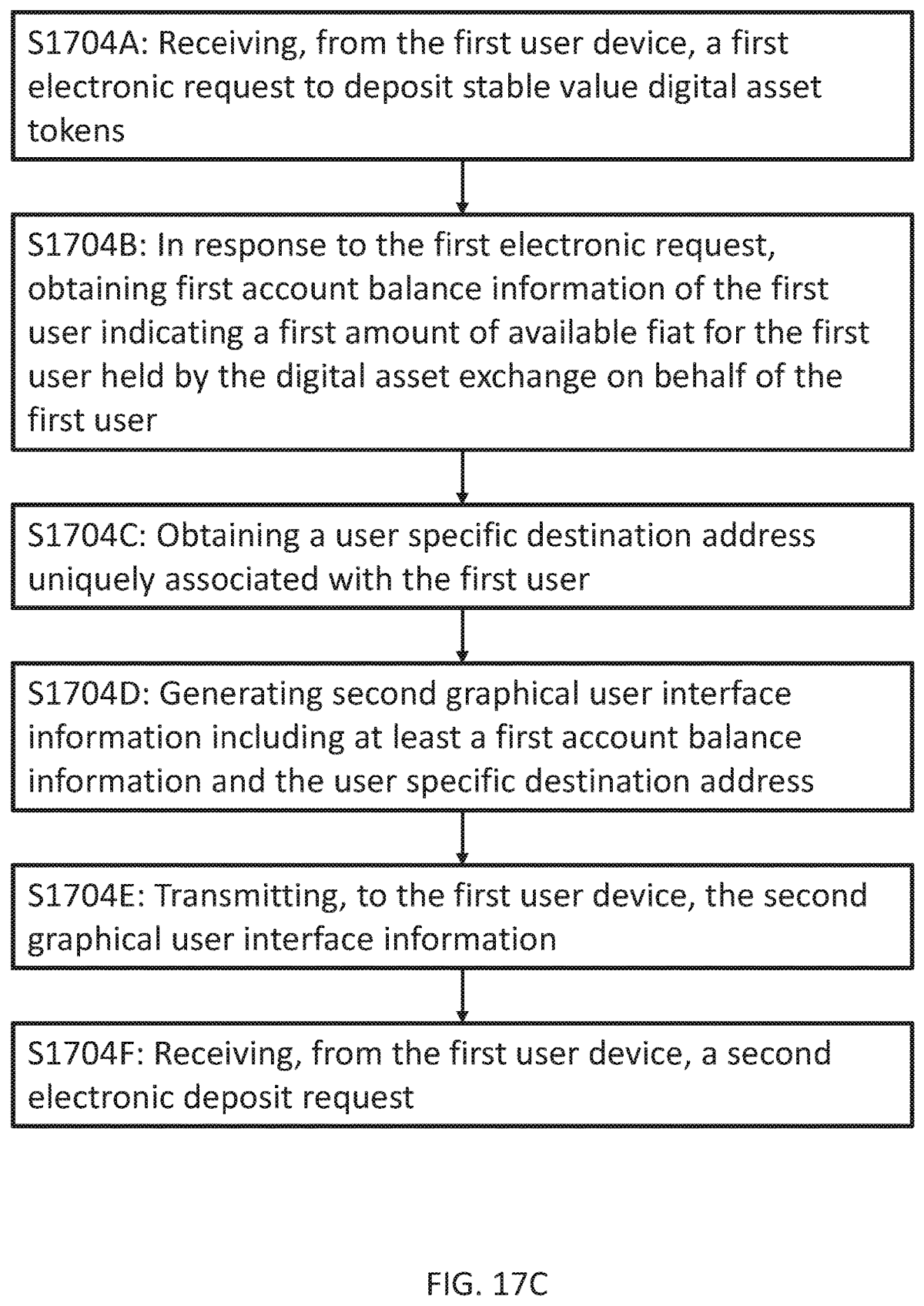

S1704A: Receiving, from the first user device, a first electronic request to deposit stable value digital asset tokens

↓

S1704B: In response to the first electronic request, obtaining first account balance information of the first user indicating a first amount of available fiat for the first user held by the digital asset exchange on behalf of the first user

↓

S1704C: Obtaining a user specific destination address uniquely associated with the first user

↓

S1704D: Generating second graphical user interface information including at least a first account balance information and the user specific destination address

↓

S1704E: Transmitting, to the first user device, the second graphical user interface information

↓

S1704F: Receiving, from the first user device, a second electronic deposit request

FIG. 17C

Figure 17D:
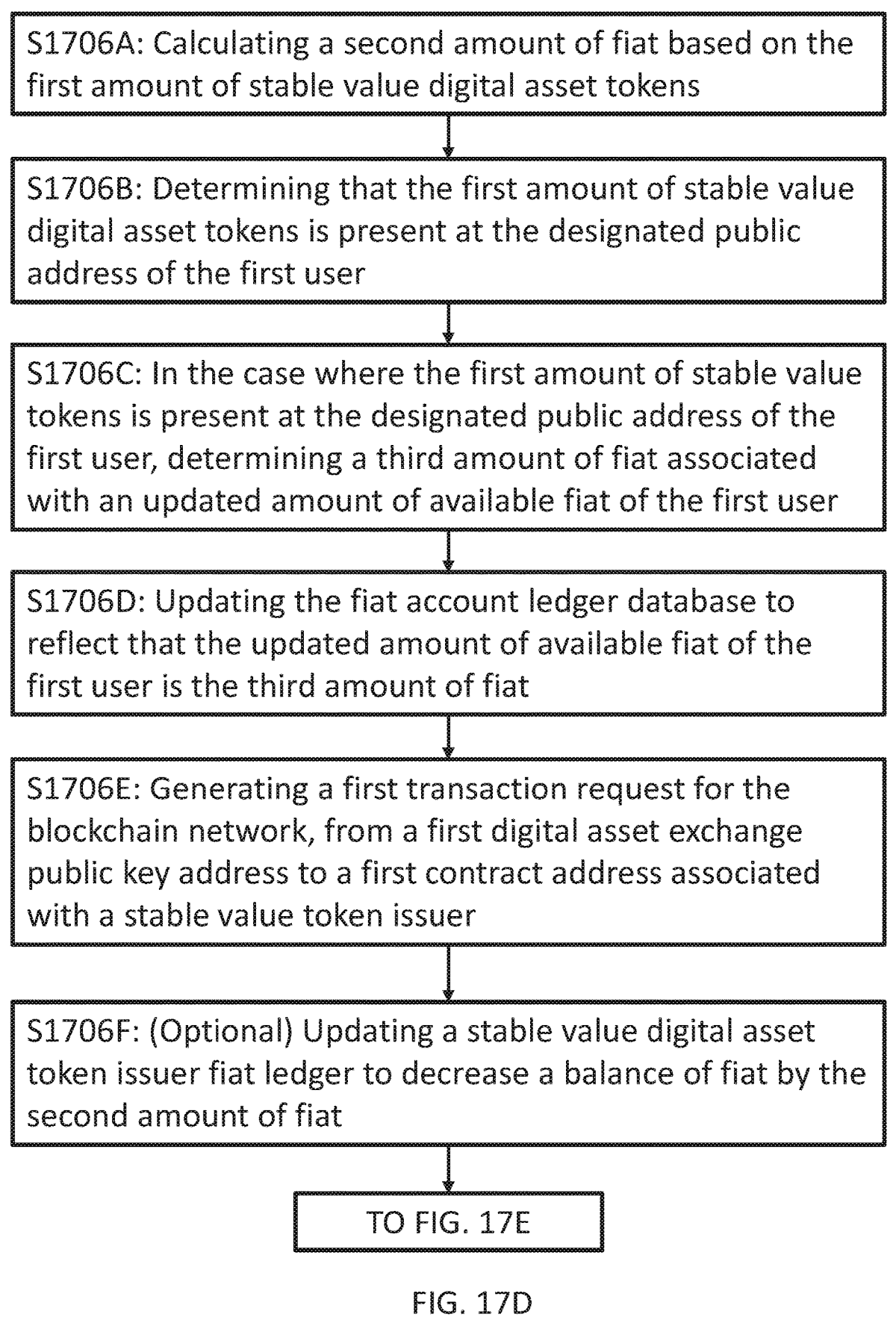

S1706A: Calculating a second amount of fiat based on the first amount of stable value digital asset tokens S1706B: Determining that the first amount of stable value digital asset tokens is present at the designated public address of the first user S1706C: In the case where the first amount of stable value tokens is present at the designated public address of the first user, determining a third amount of fiat associated with an updated amount of available fiat of the first user S1706D: Updating the fiat account ledger database to reflect that the updated amount of available fiat of the first user is the third amount of fiat S1706E: Generating a first transaction request for the blockchain network, from a first digital asset exchange public key address to a first contract address associated with a stable value token issuer S1706F: (Optional) Updating a stable value digital asset token issuer fiat ledger to decrease a balance of fiat by the second amount of fiat

SYSTEM, METHOD AND PROGRAM PRODUCT FOR DEPOSITING AND WITHDRAWING STABLE VALUE DIGITAL ASSETS IN EXCHANGE FOR FIAT

REFERENCE TO RELATED APPLICATIONS

This application is a continuation of U.S. patent application Ser. No. 17/247,111, filed Nov. 30, 2020 and entitled "SYSTEM, METHOD AND PROGRAM PRODUCT FOR DEPOSITING AND WITHDRAWING STABLE VALUE DIGITAL ASSETS IN EXCHANGE FOR FIAT," which is a continuation of U.S. patent application Ser. No. 16/036,469, filed Jul. 16, 2018 and entitled "SYSTEM, METHOD AND PROGRAM PRODUCT FOR DEPOSITING AND WITHDRAWING STABLE VALUE DIGITAL ASSETS IN EXCHANGE FOR FIAT," which is a continuation-in-part of U.S. patent application Ser. No. 16/020,534, filed Jun. 27, 2018 and entitled "SYSTEM, METHOD AND PROGRAM PRODUCT FOR GENERATING AND UTILIZING STABLE VALUE DIGITAL ASSETS," and which issued as U.S. Pat. No. 10,373,129 on Oct. 8, 2019, which is a continuation-in-part of U.S. patent application Ser. No. 15/960,040, filed on Apr. 23, 2018 and entitled "SYSTEM, METHOD AND PROGRAM PRODUCT FOR GENERATING AND UTILIZING STABLE VALUE DIGITAL ASSETS," and which issued as U.S. Pat. No. 10,438,290 on Aug. 6, 2019, which claims priority to and the benefit of each of U.S. Provisional Patent Application No. 62/660,655, filed on Apr. 20, 2018 and entitled "SYSTEM, METHOD AND PROGRAM PRODUCT FOR GENERATING AND UTILIZING STABLE VALUE DIGITAL ASSETS," U.S. Provisional Patent Application No. 62/647,353, filed on Mar. 23, 2018 and entitled "SYSTEM, METHOD AND PROGRAM PRODUCT FOR GENERATING AND UTILIZING STABLE VALUE DIGITAL ASSETS," and U.S. Provisional Patent Application No. 62/638,679, filed on Mar. 5, 2018 and entitled "SYSTEM, METHOD AND PROGRAM PRODUCT FOR GENERATING AND UTILIZING STABLE VALUE DIGITAL ASSETS," the entire content of each of which is hereby incorporated by reference herein.

This application also claims the benefit of and priority to U.S. Provisional Patent Application Ser. No. 62/689,563, filed on Jun. 25, 2018 and entitled "SYSTEM, METHOD AND PROGRAM PRODUCT FOR GENERATING AND UTILIZING STABLE VALUE DIGITAL ASSETS" and U.S. Provisional Patent Application No. 62/683,412, filed Jun. 11, 2018 and entitled "SYSTEM, METHOD AND PROGRAM PRODUCT FOR GENERATING AND UTILIZING STABLE VALUE DIGITAL ASSETS", the entire content of each of which is hereby incorporated by reference herein.

FIELD

The present invention generally relates to a system, method and program product for the depositing and withdrawing stable value digital asset tokens tied to an underlying blockchain in exchange for fiat.

BACKGROUND

In recent times, using blockchain technology and/or tokens to track inventory, including potentially, equities or shares in a fund has been a subject of a lot of discussion.

Moreover, the use of smart contracts to generate tokens on a blockchain have also become the subject of a lot of discussion.

However, current blockchain technology, as implemented, does not have adequate technological solutions to provide for the deposit and withdrawal of stable value digital asset tokens directly in exchange for fiat.

Accordingly, it would be beneficial to provide for a method, system and program product that provide for the deposit and withdrawal of stable value digital asset tokens directly in exchange for fiat using current blockchain technology and thus avoid the problems discussed above.

SUMMARY

An object of the present invention is to address technological challenges that currently exist in depositing and withdrawing stable value digital asset tokens tied to a underlying blockchain technology associated with another digital asset in exchange for fiat.

This and other objects shall be addressed by embodiments of the present invention as set forth herein.

The present invention generally relates to a system, method and program product for the depositing and withdrawing stable value digital asset tokens tied to an underlying blockchain in exchange for fiat.

In embodiments, the present invention generally relates to the use of stable value digital assets as a crypto currency that can be linked to other digital assets using blockchain technology. In embodiments, the present invention relates to specific applications of stable value digital asset tokens tied to a blockchain.

A stable value digital asset token (e.g., SVCoin) is provided which may be pegged to a fiat currency such as USD, Euro, Yen, to name a few. For example, 1 SVCoin will have a net asset value ("NAV") of $1 USD. In embodiments, 100 SVCoins may have a NAV of $1 USD, so that 1 SVCoin has a NAV of 1 penny. Unlike Bitcoin and many other crypto protocols, the SVCoin will not have a natural cap (e.g., 22 million bitcoins) and, because it is pegged to a fiat currency, it will not fluctuate in value against such fiat currency as is typical of many crypto currencies.

In embodiments, the SVCoin can be issued by a trusted entity, like a digital asset exchange, bank, or other trusted entity using a token on an established blockchain, like ether or bitcoin, and smart contract technology. Thus, for example, a buyer can provide the trusted entity (e.g., digital asset exchange, bank, etc.) with a fixed sum of fiat (e.g., 50 USD) and in return be issued a corresponding fixed sum of SVCoin (e.g., 50 SVCoin). In embodiments, the digital asset exchange can be a regulated trust, such as Gemini Trust Company LLC ("Gemini"). In embodiments, other types of trusted entities (e.g., banks, trusts, etc.) may also be used to issue, administer, redeem, and/or otherwise manage the SVCoin. In embodiments, the trusted entity (digital asset exchange, bank, etc.) can charge a processing fee for issuing the SVCoin either in fiat or in a digital asset, such as the SVCoin. In embodiments, fiat deposited to the trusted entity (e.g., digital asset exchange) is maintained by the trusted entity on par with the amounts deposited. Thus, in embodiments, SVCoin is collateralized by fiat. SVCoin holders can also exchange SVCoin for fiat on the same notional basis with the trusted entity.

A method of withdrawing stable value digital asset tokens based on an underlying digital asset from a digital asset exchange computer system in exchange for fiat, in accordance with an embodiment of the present application includes: (a) authenticating, by the digital asset exchange computer system associated with a digital asset exchange, an access request by a first user device associated with a first user, to the digital asset exchange computer system comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; (4) transmitting, from the digital asset exchange computer system to the first user device, the first graphical user interface information; (b) obtaining, by the digital asset computer system from the first user device, a withdraw request comprising the steps of: (1) receiving, by the digital asset exchange computer system from the first user device, a first electronic request to withdraw stable value digital asset tokens, wherein the stable value digital asset token is tied to an underlying digital asset which is maintained on a distributed public transaction ledger in the form of a blockchain that is maintained by a blockchain network including a plurality of geographically distributed computer systems in a peer-to-peer network; (2) in response to the first electronic request, obtaining, by the digital asset exchange computer system from a fiat account ledger database stored on computer readable member accessible by the digital asset exchange computer system, first account balance information of the first user indicating a first amount of available fiat for the first user held by the digital asset exchange on behalf of the first user; (3) generating, by the digital asset exchange computer system, second graphical user interface information including at least the first account balance information; (4) transmitting, by the digital asset exchange computer system to the first user device, the second graphical user interface information; (5) receiving, by the digital asset exchange computer system from the first user device, a second electronic withdrawal request comprising at least: (A) a first amount of stable value digital asset tokens to be withdrawn; and (B) a destination public address on the underlying blockchain to transfer the first amount of stable value digital asset tokens; (c) processing, by the digital asset exchange computer system, the withdraw request by the steps of: (1) calculating, by the digital asset exchange computer system, a second amount of fiat based on the first amount of stable value digital asset tokens, where the second amount of fiat is determined using a fixed predetermined ratio of stable value digital asset tokens to fiat; (2) determining, by the digital asset exchange computer system, that the second amount of fiat is less than the first amount of available fiat of the first user; (3) in the case where the second amount of fiat is less than the first amount of available fiat of the first user, determining a third amount of fiat associated with an updated amount of available fiat of the first user, wherein the third amount of fiat equals the first amount of available fiat of the first user less the second amount of fiat; (4) updating, by the digital asset exchange computer system, the fiat account ledger database to reflect that the updated amount of available fiat of the first user is the third amount of fiat; (5) updating, by the digital asset exchange computer system, a stable value digital asset token issuer fiat ledger, to increase a balance of fiat by the second amount of fiat; (6) generating, by the digital asset exchange computer system, a first transaction request for the blockchain, from a first digital asset exchange public key address on the blockchain, which is mathematically related to a first digital asset exchange private key, which is stored in the computer readable member accessible by the digital asset exchange computer system, to a first contract address associated with a stable value token issuer, a first message including: i. a request to obtain in the first designated public address of the first user the first amount of stable value digital asset tokens; and wherein the first transaction request is signed with a digital signature generated using the digital asset exchange private key; (7) transmitting, by the digital asset exchange computer system to the blockchain network via the Internet, the first transaction request; (8) confirming, by the digital asset exchange computer system by reference to the blockchain, that the balance of stable value digital asset tokens in the first designated public address of the first user includes the first amount of stable value digital asset tokens.

In embodiments, the determining step (a) (c) further determines that the first user is a registered user of the digital asset exchange.

In embodiments, the digital asset exchange is licensed by a government regulatory authority.

In embodiments, the underlying digital asset is ether and the blockchain is the Ethereum Blockchain.

In embodiments, the underlying digital asset is neo and the blockchain is the Neo Blockchain.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the updating step (c)(5) further comprises transferring the second amount of fiat from a digital asset exchange fiat account to a stable value digital asset token issuer fiat account.

In embodiments, the updating step (c)(5) further comprises periodically transferring fiat between the digital asset exchange fiat account and the stable value digital asset token issuer fiat account.

In embodiments, the instructions to obtain in the first designated public address of the first user the first amount of stable value digital asset tokens include instructions to generate the first amount of stable value digital asset tokens at the first designated public address of the first user.

In embodiments, the instructions to obtain in the first designated public address of the first user the first amount of stable value digital asset tokens include instructions to transfer the first amount of stable value digital asset tokens from a stable value digital asset token issuer public address to the first designated public address of the first user.

A method of depositing stable value digital asset tokens based on an underlying digital asset into a digital asset exchange computer system in exchange for fiat in accordance with another embodiment of the present application includes: (a) authenticating, by the digital asset exchange computer system associated with a digital asset exchange, an access request by a first user device associated with a first user, to the digital asset exchange computer system comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; (4) transmitting, from the digital asset exchange computer system to the first user device, the first graphical user interface information; (b) obtaining, by the digital asset computer system from the first user device, a deposit request comprising the steps of: (1) receiving, by the digital asset exchange computer system from the first user device, a first electronic request to deposit stable value digital asset tokens, wherein the stable value digital asset token is tied to an underlying digital asset which is maintained on a distributed public transaction ledger in the form of a blockchain that is maintained by a blockchain network including a plurality of geographically distributed computer systems in a peer-to-peer network; (2) in response to the first electronic request, obtaining, by the digital asset exchange computer system from a fiat account ledger database stored on computer readable member accessible by the digital asset exchange computer system, first account balance information of the first user indicating a first amount of available fiat for the first user held by the digital asset exchange on behalf of the first user; (3) obtaining, by the digital asset exchange computer system, a user specific destination address, uniquely associated with the first user; (4) generating, by the digital asset exchange computer system, second graphical user interface information including at least the first account balance information and the user specific destination address; (5) transmitting, by the digital asset exchange computer system to the first user device, the second graphical user interface information; (6) receiving, by the digital asset exchange computer system from the first user device, a second electronic deposit request comprising at least: (A) a first amount of stable value digital asset tokens to be deposited; and (B) a designated public address of the first user on the underlying blockchain from which the first amount of stable value digital asset tokens will be transferred; (C) a digital signature based on a designated private key of the first user, wherein the designated private key is mathematically related to the designated public address; (c) processing, by the digital asset exchange computer system, the second electronic deposit request by the steps of: (1) calculating, by the digital asset exchange computer system, a second amount of fiat based on the first amount of stable value digital asset tokens, where the second amount of fiat is determined using a fixed predetermined ratio of stable value digital asset tokens to fiat; (2) determining, by the digital asset exchange computer system, that the first amount of stable value digital asset tokens is present at the designated public address of the first user; (3) in the case where the first amount of stable value digital asset tokens is present at the designated public address of the first user, determining a third amount of fiat associated with an updated amount of available fiat of the first user, wherein the third amount of fiat equals the first amount of available fiat of the first user plus the second amount of fiat; (4) updating, by the digital asset exchange computer system, the fiat account ledger database to reflect that the updated amount of available fiat of the first user is the third amount of fiat; (5) generating, by the digital asset exchange computer system, a first transaction request for the blockchain, from a first digital asset exchange public key address on the blockchain, which is mathematically related to a first digital asset exchange private key, which is stored in the computer readable member accessible by the digital asset exchange computer system, to a first contract address associated with a stable value token issuer, a first message including: i. a request to obtain from the first designated public address of the first user the first amount of stable value digital asset tokens from the designated public address of the first user and provide them to the user specific destination address; and ii. a request to destroy the first amount of stable value digital asset tokens; wherein the first transaction request is signed with a digital signature generated based on the digital asset exchange private key of the user digital asset exchange; (6) updating, by the digital asset exchange computer system, a stable value digital asset token issuer fiat ledger, to decrease a balance of fiat by the second amount of fiat; (7) transmitting, by the digital asset exchange computer system to the blockchain network via the Internet, the first transaction request; (8) confirming, by the digital asset exchange computer system by reference to the blockchain, that the first amount of stable value digital asset tokens are not present at the designated public address of the first user.

In embodiments, the determining step (a)(2) further determines that the first user is a registered user of the digital asset exchange.

In embodiments, the digital asset exchange is licensed by a government regulatory authority.

In embodiments, the underlying digital asset is ether and the blockchain is the Ethereum Blockchain.

In embodiments, the underlying digital asset is neo and the blockchain is the Neo Blockchain.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the updating step (c)(6) further comprises transferring the second amount of fiat from a digital asset exchange fiat account to a stable value digital asset token issuer fiat account.

In embodiments, the updating step (c)(6) further comprises periodically transferring fiat between the digital asset exchange fiat account and the stable value digital asset token issuer fiat account.

A method of depositing stable value digital asset tokens based on an underlying digital asset into a digital asset exchange computer system in exchange for fiat in accordance with an embodiment of the present application includes: (a) authenticating, by the digital asset exchange computer system associated with a digital asset exchange, an access request by a first user device associated with a first user, to the digital asset exchange computer system comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; (4) transmitting, from the digital asset exchange computer system to the first user device, the first graphical user interface information; (b) obtaining, by the digital asset computer system from the first user device, a deposit request comprising the steps of: (1) receiving, by the digital asset exchange computer system from the first user device, a first electronic request to deposit stable value digital asset tokens, wherein the stable value digital asset token is tied to an underlying digital asset which is maintained on a distributed public transaction ledger in the form of a blockchain that is maintained by a blockchain network including a plurality of geographically distributed computer systems in a peer-to-peer network; (2) in response to the first electronic request, obtaining, by the digital asset exchange computer system from a fiat account ledger database stored on computer readable member accessible by the digital asset exchange computer system, first account balance information of the first user indicating a first amount of available fiat for the first user held by the digital asset exchange on behalf of the first user; (3) obtaining, by the digital asset exchange computer system, a user specific destination address, uniquely associated with the first user; (4) generating, by the digital asset exchange computer system, second graphical user interface information including at least the first account balance information and the user specific destination address; (5) transmitting, by the digital asset exchange computer system to the first user device, the second graphical user interface information; (6) receiving, by the digital asset exchange computer system from the first user device, a second electronic deposit request comprising at least: (A) a first amount of stable value digital asset tokens to be deposited; and (B) a designated public address of the first user on the underlying blockchain from which the first amount of stable value digital asset tokens will be transferred; (C) a digital signature based on a designated private key of the first user, wherein the designated private key is mathematically related to the designated public address; (c) processing, by the digital asset exchange computer system, the second electronic deposit request by the steps of: (1) calculating, by the digital asset exchange computer system, a second amount of fiat based on the first amount of stable value digital asset tokens, where the second amount of fiat is determined using a fixed predetermined ratio of stable value digital asset tokens to fiat; (2) determining, by the digital asset exchange computer system, that the first amount of stable value digital asset tokens is present at the designated public address of the first user; (3) in the case where the first amount of stable value digital asset tokens is present at the designated public address of the first user, determining a third amount of fiat associated with an updated amount of available fiat of the first user, wherein the third amount of fiat equals the first amount of available fiat of the first user plus the second amount of fiat; (4) updating, by the digital asset exchange computer system, the fiat account ledger database to reflect that the updated amount of available fiat of the first user is the third amount of fiat; (5) generating, by the digital asset exchange computer system, a first transaction request for the blockchain, from a first digital asset exchange public key address on the blockchain, which is mathematically related to a first digital asset exchange private key, which is stored in the computer readable member accessible by the digital asset exchange computer system, to a first contract address associated with a stable value token issuer, a first message including: i. a request to obtain from the first designated public address of the first user the first amount of stable value digital asset tokens from the designated public address of the first user and provide them to the user specific destination address; ii. a request to store the first amount of stable value digital asset tokens at the user specific destination address; and wherein the first transaction request is signed with a digital signature generated based on the digital asset exchange private key of the user digital asset exchange; (6) transmitting, by the digital asset exchange computer system to the blockchain network via the Internet, the first transaction request; (7) confirming, by the digital asset exchange computer system by reference to the blockchain, that the first amount of stable value digital asset tokens are not present at the designated public address of the first user.

In embodiments, the determining step (a)(2) further determines that the first user is a registered user of the digital asset exchange.

In embodiments, the digital asset exchange is licensed by a government regulatory authority.

In embodiments, the underlying digital asset is ether and the blockchain is the Ethereum Blockchain.

In embodiments, the underlying digital asset is neo and the blockchain is the Neo Blockchain.

In embodiments, the fixed predetermined ratio is one stable value digital asset token is equal to one U.S. dollar.

In embodiments, the fixed predetermined ratio is one hundred stable value digital asset tokens is equal to one U.S. dollar.

BRIEF DESCRIPTION OF THE DRAWINGS

Exemplary embodiments of the present invention will be described with references to the accompanying figures, wherein:

FIG. 2 is an exemplary screen shot of an excerpt of an exemplary bitcoin transaction log showing digital addresses in accordance with exemplary embodiments of the present invention;

FIG. 2A is an exemplary screen shot of a Security Token ledger in accordance with exemplary embodiments of the present invention;

FIGS. 7A-B are an exemplary schematic diagram and a corresponding flow chart of a process for digital asset exchange customer account fiat funding via an exchange-initiated request in accordance with exemplary embodiments of the present invention;

FIGS. 7C-E are an exemplary schematic diagram and a corresponding flow chart of a process for digital asset exchange customer account fiat funding via a customer-initiated request in accordance with exemplary embodiments of the present invention;

FIGS. 8A-B are an exemplary schematic diagram and a corresponding flow chart of a process for digital asset exchange account digital asset withdrawal in accordance with exemplary embodiments of the present invention;

FIG. 9A is an exemplary flow chart of the process for purchasing SVCoin for fiat on a digital asset exchange in accordance with exemplary embodiments of the present invention;

FIG. 9B is an exemplary flow chart of the process for redeeming SVCoin for fiat on a digital asset exchange in accordance with exemplary embodiments of the present invention;

FIG. 10 is an exemplary flow chart of the process of sending tokens from Alice to Bob on the Ethereum blockchain in accordance with exemplary embodiments of the present invention;

FIGS. 11A-1-4 illustrate an exemplary embodiment of a dashboard fiat interface which allows registered users to deposit and/or withdraw fiat with the digital asset exchange in accordance with exemplary embodiments of the present invention;

FIGS. 11B-1-4 illustrate an exemplary dashboard digital asset interface which allows registered users to deposit and/or withdrawal digital assets with the digital asset exchange system in accordance with exemplary embodiments of the present invention;

FIGS. 11C-1-2 illustrate an exemplary dashboard SVCoin interface which allows registered users to purchase and/or redeem SVCoins for fiat or digital with the digital asset exchange system in accordance with exemplary embodiments of the present invention;

FIG. 11D illustrates an exemplary dashboard Security Token interface which allow Security Token issuers to provide instructions to transfer SVCoins to Security Token holders in accordance with exemplary embodiments of the present invention;

FIG. 12 illustrates an exemplary flow reflecting an exemplary embodiment where a Security Token issuer initiates a transfer of SVCoins to Security Token holders in accordance with exemplary embodiments of the present invention;

FIGS. 14A-G illustrate an exemplary process flow chart of a process reflecting an exemplary embodiment of a method of issuing a stable value digital asset token in accordance with an embodiments of the present invention.

FIGS. 15A-15C illustrate an exemplary dashboard of a user interface which allows registered users of a digital asset exchange to deposit and/or withdraw SVCoins (referred to as Gemini Dollars) with the digital asset exchange system in accordance with exemplary embodiments of the present invention;

FIG. 16B is an exemplary flowchart of a process for authenticating an access request by a user device in accordance with exemplary embodiments in the present invention;

FIG. 16C is an exemplary flowchart of a process for obtaining a withdraw request in accordance with exemplary embodiments in the present invention;

FIGS. 16D-16E are exemplary flowcharts of a process for processing a withdraw request in accordance with exemplary embodiments in the present invention

FIG. 17B is an exemplary flowchart of a process for authenticating an access request by a user device in accordance with exemplary embodiments in the present invention;

FIG. 17C is an exemplary flowchart of a process for obtaining a deposit request in accordance with exemplary embodiments in the present invention; and FIGS. 17D-17E are exemplary flowcharts of a process for processing a deposit request in accordance with exemplary embodiments in the present invention.

DETAILED DESCRIPTION

Figure 1:
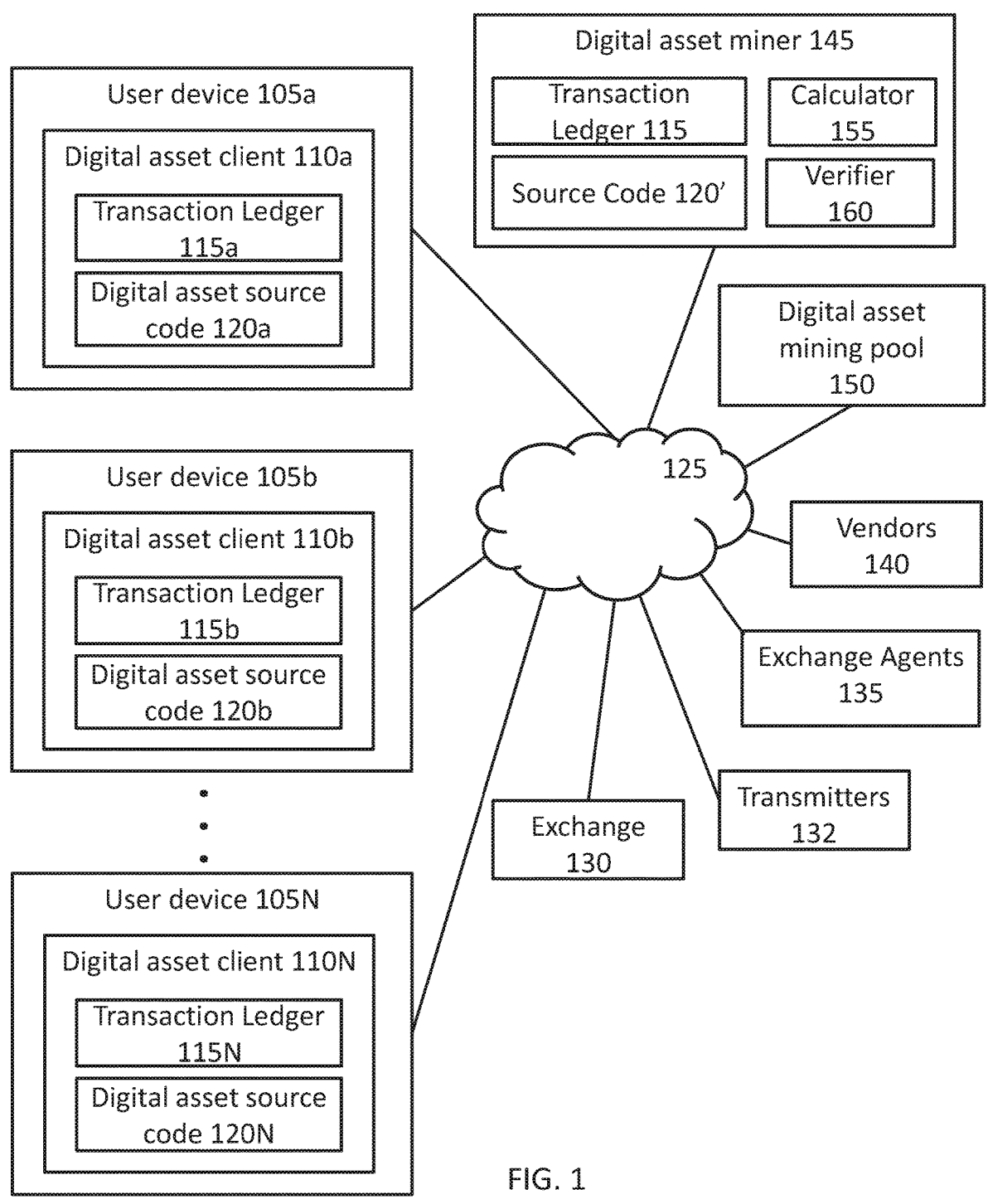
FIG. 1 is a schematic diagram of a digital asset network in accordance with exemplary embodiments of the present invention.

The present invention generally relates to a system, method and program product for the generating and distribution of a stable value digital asset token tied to an underlying blockchain.

Digital Math-Based Assets and Bitcoin

A digital math-based asset is a kind of digital asset based upon a computer generated mathematical and/or cryptographic protocol that may, among other things, be exchanged for value and/or be used to buy and sell goods or services. A digital math-based asset may be a non-tangible asset that is not based upon a governmental rule, law, regulation, and/or backing. The Bitcoin system represents one form of digital math-based asset. The Ethereum system represents another form of digital math-based asset, which allows for smart contracts, as discussed below.

An ether may be a unit of the Ethereum digital math-based asset. Other examples of digital math-based assets include Bitcoin, Ripple, Cardano, Litecoin, NEO, Stellar, Dfinity, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Skycoin, ZenCash, NAV Coin, Achain, HTMLCOIN, Ubiq, Bridge-Coin, Peercoin, PACcoin, XTRABYTES, Einsteinium, Asch, Gas, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groestlcoin, Lykke, Steem Dollars, I/O Coin, Shift, HempCoin, Mooncoin, Dimecoin, Namecoin, Feathercoin, Diamond, Spectrecoin, Filecoin and Tezos, to name a few. In embodiments, digital math-based assets, such as bitcoin, may be accepted in trade by merchants, other businesses, and/or individuals in many parts of the world.

In embodiments, a digital math-based asset may be based on an open source mathematical and/or cryptographic protocol, which may exist on a digital asset network, such as a Bitcoin network or an Ethereum network. The network may be centralized (e.g., run by one or more central servers) or decentralized (e.g., run through a peer-to-peer network). Digital math-based assets may be maintained, tracked, and/or administered by the network.

A digital math-based asset system may use a decentralized electronic ledger system, which may be maintained by a plurality of physically remote computer systems. Such a ledger may be a public transaction ledger, which may track asset ownership and/or transactions in a digital math-based asset system. The ledger may be a decentralized public transaction ledger, which can be distributed to users in the network (e.g., via a peer-to-peer sharing). Ledger updates may be broadcast to the users across the network. Each user may maintain an electronic copy of all or part of the ledger, as described herein. In embodiments, a digital asset system may employ a ledger that tracks transactions (e.g., transfers of assets from one address to another) without necessarily identifying the assets themselves.

In embodiments, a digital asset ledger, such as the Bitcoin blockchain or the Ethereum blockchain, can be used to achieve consensus and to solve double-spending problems where users attempt to spend the same digital assets in more than one transaction. In embodiments, before a transaction may be cleared, the transaction participants may need to wait for some period of time, e.g., a six confirmation wait (typically one hour in the context of the Bitcoin network, 15 minutes in the context of the Litecoin network, to name a few) before feeling confident that the transaction is valid (e.g., not a double count). Each update to the decentralized electronic ledger (e.g., each addition of a block to the Bitcoin blockchain or the Ethereum blockchain) following execution of a transaction may provide a transaction confirmation. After a plurality of updates to the ledger (e.g., 6 updates) the transaction may be confirmed with certainty or high certainty.

In embodiments, a blockchain can be a public transaction ledger of the digital math-based asset that is maintained by a distributed network, such as the Bitcoin network or the Ethereum network. For example, one or more computer systems (e.g., miners) or pools of computer systems (e.g., mining pools) can solve algorithmic equations allowing them to add records of recent transactions (e.g., blocks), to a chain of transactions. In embodiments, miners or pools of miners may perform such services in exchange for some consideration such as an upfront fee (e.g., a set amount of digital math-based assets) and/or a payment of transaction fees (e.g., a fixed amount or set percentage of the transaction) from users whose transactions are recorded in the block being added. In embodiments, digital assets in the form of a digital asset token, such as Gas, may be used to pay such fees.

The digital asset network (e.g., Bitcoin network or Ethereum Network) may timestamp transactions by including them in blocks that form an ongoing chain called a blockchain. In embodiments, the addition of a block may occur periodically, e.g., approximately every 15 seconds, every minute, every 2.5 minutes or every 10 minutes, to name a few. Such blocks cannot be changed without redoing the work that was required to create each block since the modified block. The longest blockchain may serve not only as proof of the sequence of events but also records that this sequence of events was verified by a majority of the digital asset network's computing power. The blockchain recognized by the nodes corresponding to the majority of computing power, or some other consensus mechanism, will become the accepted blockchain for the network. In embodiments, confirmation of a transaction may be attained with a high degree of accuracy following the addition of a fixed number of blocks to the blockchain (e.g., six blocks) after a transaction was performed and first recorded on the blockchain. As long as a majority of computing power (or other consensus mechanism) is controlled by nodes that are not cooperating to attack the network, they will generate the longest blockchain of records and outpace attackers.

There are a variety of consensus mechanisms (or protocols) that may be used to verify transactions recorded in a blockchain. A few non-limiting examples of these mechanisms are discussed below, however, other protocols may be used in accordance with exemplary embodiments of the present invention.

For example, the proof of control protocol is one example of a consensus mechanism and is used, for example, in the Bitcoin blockchain. A more detailed discussion of proof of control protocols can be found in co-pending U.S. patent application Ser. No. 15/920,042 filed Mar. 13, 2018 entitled SYSTEMS, METHODS, AND PROGRAM PRODUCTS FOR VERIFYING DIGITAL ASSETS HELD IN A CUSTODIAL DIGITAL ASSET WALLET, the entire content of which is hereby incorporated by reference herein.

The proof of stake protocol is another optional protocol that may be implemented by blockchains. In this type of protocol, the validator's stake is represented by the amount of digital assets held. Validators accept, reject or otherwise validate a block to be added to the blockchain based on the amount of digital assets held by the Validator on the blockchain. If the Validators are successful in validating and adding the block, such a protocol, in embodiments, will award successful Validators are a fee in proportion to their stake.

The delegated proof of stake protocol is another protocol that is available and is, for example, used by the EOS blockchain. In this protocol, blocks are produced in a fixed number in rounds (e.g., 21 for EOS). At the start of every such round, block producers are chosen. A number less than all of the producers (e.g., 20 in EOS) are automatically chosen while a corresponding number are chosen proportional to the number of their votes relative to other producers. In embodiments, the remaining producers may be shuffled using a pseudorandom number derived from the block time, for example. In embodiments, other forms of randomized selection may be used. To ensure that regular block production is maintained, in embodiments, block time is kept short (e.g., 3 seconds for EOS) and producers may be punished for not participating by being removed from consideration. In embodiments, a producer has to produce a minimal number of block, e.g., at least one block every 24 hours to be in consideration. All of the nodes will, by default, not switch to a fork which does not include any blocks not finalized by a sufficient majority (e.g., 15 of the 21 producers) regardless of chain length. Thus, in EOS, each block must gain 15 of 21 votes for approval to be considered a part of the chain.

In embodiments, a delegated byzantine fault tolerance protocol may be used as a consensus mechanism. For example, NEO uses this type of protocol. In this protocol, one of the bookkeeping nodes is randomly chosen as a "speaker." The speaker then looks at all the demands of the "citizens," (e.g., all of the holders of the digital asset), and creates a "law" (e.g., a rule governing the protocol). The speaker then calculates a "happiness factor" of these laws to see if the number is enough to satisfy the citizen's needs or not. The speaker then passes the happiness factor down to the delegates (e.g., the other bookkeeping nodes). The delegates may then individually check the speaker's calculations. If the speaker's number matches the delegate's number, then the delegates give their approval, and if not, then they give their disapproval. In embodiments, a sufficient majority (e.g., 66% in NEO) of the delegates need to give their approval for the law to pass, i.e, for the block to be added. If a sufficient majority is not obtained (e.g., less than 66% approval), then a new speaker is chosen and the process starts again.

Ripple uses an algorithm in which each server gathers all valid transactions that have not yet been applied and makes them public. Each server then amalgamates these transactions and votes on the veracity of each. Transactions that receive at least a minimum number of yes votes will move into another round of voting. A minimum of 80% approval is required before a transaction is applied.

These and other protocols may be used to generate a blockchain in accordance with exemplary embodiments of the present invention.

In embodiments, transaction messages can be broadcast on a best effort basis, and nodes can leave and rejoin the network at will. Upon reconnection, a node can download and verify new blocks from other nodes to complete its local copy of the blockchain.

In the exemplary Bitcoin system, a bitcoin is defined by a chain of digitally signed transactions that began with its creation as a block reward through bitcoin mining. Each owner transfers bitcoin to the next owner by digitally signing them over to the next owner in a bitcoin transaction which is published to and added on to a block on the blockchain. A payee can then verify each previous transaction, e.g., by analyzing the blockchain to verify the chain of ownership.

Other examples of different types of blockchains noted above that are consistent with embodiments of present invention pose unique problems. Certain currencies present unique challenges in that transactions and/or wallets or digital asset addresses associated therewith may be shielded (e.g., not viewable by the public on the ledger). For example, Monero is based on the CryptoNight proof-of-work hash algorithm and possesses significant algorithmic differences relating to blockchain obfuscation. Monero provides a high level of privacy and is fungible such that every unit of the currency can be substituted by another unit. Monero is therefore different from public-ledger cryptocurrencies such as Bitcoin, where addresses with coins previously associated with undesired activity can be blacklisted and have their coins refused by others.

In particular, in Monero, ring signatures mix spender's address with a group of others, making it more difficult to establish a link between each subsequent transaction. In addition, Monero provides "stealth addresses" generated for each transaction which make it difficult, if not impossible, to discover the actual destination address of a transaction by anyone else other than the sender and the receiver. Further, the "ring confidential transactions" protocol may hide the transferred amount as well. Monero is designed to be resistant to application-specific integrated circuit mining, which is commonly used to mine other cryptocurrencies such as Bitcoin. However, it can be mined somewhat efficiently on consumer grade hardware such as x86, x86-64, ARM and GPUs, to name a few.

Another example of a modified blockchain consistent with exemplary embodiments of the present invention discussed above is Darkcoin. Darkcoin adds an extra layer of privacy by automatically combining any transaction its users make with those of two other users—a feature it calls Darksend—so that it will be more difficult to analyze the blockchain to determine where a particular user's money ended up.

Yet another example of a modified blockchain consistent with exemplary embodiments of the present invention discussed above is Zcash. The Zcash network supports different types of transactions including: "transparent" transactions and "shielded" transactions. Transparent transactions use a transparent address (e.g., "t-address"). In embodiments, transactions between two t-addresses behave like Bitcoin transactions and the balance and amounts transferred are publicly visible on the Zcash blockchain. Unlike the Bitcoin Blockchain, the Zcash network may also support shielded transactions using a shield address (e.g., "z-address"). In embodiments, the "z-address" provides privacy via zero-knowledge succinct noninteractive arguments of knowledge (e.g., "zk-SNARKS" or "zero-knowledge proofs"). The balance of a z-address is not publicly visible on the Zcash blockchain—the amount transferred into and out of a z-address is private if between two z-addresses—but may be public if between a z-address and a t-address.

In embodiments, a digital asset based on a blockchain, may, in turn, include special programming, often referred to as "smart contracts", which allow for the creation of "tokens", which in turn are digital assets based on digital assets. In embodiments, tokens may be ERC-20 tokens, and used in conjunction with ERC-20 token standard as a programming language. In embodiments, other protocols may be used including but not limited to ERC-223 and ERC-721, to name a few. In embodiments, smart contracts may be written on other smart contracts to provide for increased functionality. One non-limiting example of this type of structure is the open source Cryptokittens game in which digital kittens are provided as ERC-721 tokens with a series of smart contracts provided to define how the kittens will interact with each other and with users. In embodiments, programming modules may be added to and/or transferred with programming modules associated with specific tokens. By way of illustration, a first token, e.g., a Cryptokitten Tiger, may purchase a second token, e.g., a digital "hat," that will then become associated with the first token to be a Tiger with a hat, and remain with the first token when transferred. Thus, by way of illustration, in the context of example embodiments of the present invention, the first token could be, e.g., a security token, and the second token could be, e.g., an account holding SVCoins, or a right to request SVCoins from another account as discussed below. If the first token is transferred, the second token would transfer with the ownership of the first token.

For example, digital assets can include tokens, which like other digital assets that can represent anything from loyalty points to vouchers and IOUs to actual objects in the physical world. Tokens can also be tools, such as in-game items, for interacting with other smart contracts. A token is a smart contract running on top of a blockchain network (such as the Ethereum Blockchain, the Bitcoin Blockchain, to name a few). As such, it is a set of code with an associated database. In embodiments, the database may be maintained by an issuer. In embodiments, the database may be included as part of the blockchain. In embodiments, the ledger may be maintained in the first instance as a database in a sidechain by the issuer or agent of the issuer and subsequently published and stored as part of a blockchain. The code describes the behavior of the token, and the database may be a table with rows and columns tracking who owns how many tokens.

If a user or another smart contract within the blockchain network (such as the Ethereum Network) sends a message to that token's contract in the form of a "transaction," the code updates its database.

So, for instance, as illustrated in FIG. 10, using a token based on the Ethereum Network for illustration purposes, when a wallet app sends a message to a token's contract address to transfer funds from Alice to Bob, the following process occurs.

In embodiments, an underlying blockchain, like the Bitcoin Block chain, may have limited or no smart contract capabilities.

In such embodiments, an overlying protocol, such as Omni Layer (https://www.omnilayer.org/) may also be used to create custom digital assets on such an underlying blockchain, like the Bitcoin blockchain, as described in https://github.com/OmniLayer/spec. In embodiments, a smart contract may be used for transactions involving Bitcoin through the use of a two way peg with side chain. The side chain can share miners with the Bitcoin blockchain and allows smart contracts to be run, such as contracts using the Ethereum virtual machine. When Bitcoin is to be used in the smart contract side chain, the Bitcoin is locked and an equal amount of side chain currency, an example of which is Super Bitcoin (SBTC), is assigned to the corresponding address. After the smart contract transaction is completed, the side chain currency is locked and the Bitcoin is unlocked. An example of such a side chain is Rootstock.

In embodiments, where the blockchain is the Bitcoin blockchain, and another protocol is used as a layer over the Bitcoin blockchain to provide for smart contract functionality. For example, the other protocol may be a two-way peg of stable value digital asset tokens to bitcoin and a sidechain that shares miners with the Bitcoin blockchain. In embodiments, the other protocol is an omni layer protocol.

For illustration purposes, FIG. 10 shall be described with respect to a token on a block chain with ERC20 smart chain capabilities, such as the Ethereum Block chain and the NEO Block chain, to name a few.

In step S1001, at the token issuer computer system, a token, such as a Stable Value Token by way of illustration, is created. In embodiments, the token can be other forms of tokens, such as a Security Token, or other form of tokens. In embodiments, each Token may have a "ERC20 Contract Wallet Address" ("Contract Address") which is an address on the blockchain at which the code for the smart contract is stored. In embodiments, the smart contract may include instructions to perform at least: (1) token creation, (2) token transfer, (3) token destruction; and (4) updating smart contract coding, to name a few. In addition, the smart contract may include additional instructions related to authority to conduct operations and/or transactions associated with the smart contract or token.

In embodiments of the present invention, the minimal specification for a Token, such as a Stable Value Token, may include instructions to perform at least: (1) a "totalSupply" function, which when called, will respond with a count of the number of tokens in existence; (2) a "balanceOf" function, which when called with a specific account (address) as a parameter, responds with the count of the number of tokens owned by that account; and (3) a "transfer" function, which is an example of a state modifying function, that, when called, given one or more target accounts and corresponding transferred amounts as parameters, the transfer function will decrease the balance of the caller account by the corresponding transfer amounts, and increase the target accounts by the target amounts (or fail if the caller account has insufficient amounts or if there are other errors in the parameters).

In embodiments, a Stable Value Token may be created with a fixed supply of tokens at the time of its creation. For example, a Stable Value Token may be created with a supply of 21 million tokens and set Address 1 (mathematically associated with a private key 1) as the owner of all 21 million tokens. Thereafter, private key 1 will be required to generate a call to the transfer function in order to assign some portion of the 21 million tokens with a second Address 2 (mathematically associated with a private key 2) or any other Address (also mathematically associated with a corresponding private key).

In embodiments, a Stable Value Token may be created with a variable supply of tokens which can be set to increase or decrease after original creation. In such embodiments, the minimum functions required will also include: (4) a "print" function, which is another example of a state modifying function, that when called allows for the creation of additional Stable Value Tokens into the totalSupply of Stable Value Tokens; and (5) a "burn" function, which is also another example of a state modifying function, that when called allows for the destruction of previously created Stable Value Token from the total Supply of the Stable Value Tokens. As discussed below in greater detail, in embodiments, the print and burn function may include limits on the Addresses that are allowed to call those functions.

Currently, due to the immutable nature of the Ethereum blockchain, once a smart contract is written to a specific Contract Address it cannot be changed. However, in embodiments, the various functions called for in the Contract Address may be associated with specific authorized key pairs of public keys (or "addresses") and corresponding private keys (which are mathematically associated with public keys). In embodiments, one or more private keys may be stored off-line in, what is sometimes referred to as, a designated cold storage wallet associated with the token issuer. In such embodiments, keys may be generated, stored, and managed onboard hardware security modules (HSMs). For example, HSMs, e.g., each a "signer," should have achieved a rating of FIPS PUB 140-2 Level 3 (or higher) In embodiments, one or more private keys may be stored on-line in, what is sometimes referred to as a designated hot storage wallet associated with the token issuer. In embodiments, the Contract Address may include instructions which are associated with authorizing one or more designated key pairs stored off-line in, e g., one or more cold storage wallets on one or more air-gapped computer systems associated with the token issuer, but may also give at least some permission to perform operations by one or more designated key pairs stored on-line, in, e.g., one or more hot wallets associated with the token issuer and/or a token administrator on behalf of the token issuer on one or more computer systems connected to the digital asset computer system. In embodiments, the on-line computer systems would be co-located with the digital asset computer systems. In embodiments, the Stable Value Tokens may be created in batches (for example, 100,000 SVCoins worth $100,000 U.S. dollars) by a designated key pair (such as an off-line designated key pair) authorized by smart contract and assigned by such a key pair to a designated address associated with on on-line public key for transactions as necessary.

In embodiments, a Stable Value Token database is maintained in a blockchain, such as the Ethereum blockchain, for example. In embodiments, the ledger may be maintained, in the first instance, as a database in a sidechain by the issuer or agent and subsequently published and stored as part of a blockchain.

In embodiments, Stable Value Tokens may be generated on the fly, however, in this case, the contract code, which is the executable code that is stored at the Contract Address location on the blockchain, may designate one or more public addresses corresponding to one or more on-line private keys held in, e.g., a hot wallet(s), or one or more public addresses corresponding on one or more off-line public keys held in, e.g., a cold wallet(s), or some combination thereof, as the authorized caller of some functionality. A more detailed discussion of exemplary structures for hot wallets and cold wallets is presented in U.S. Pat. No. 9,892,460 issued Feb. 13, 2018 entitled SYSTEMS, METHODS, AND PROGRAM PRODUCTS FOR OPERATING EXCHANGE TRADED PRODUCTS HOLDING DIGITAL MATH-BASED ASSETS, the entire content of which is incorporated by reference herein.

In embodiments, a subset of two or more corresponding key pairs from a larger collection of key pairs may be required to engage in certain transaction. For example, 2 of 3, 2 of 5, or 3 of 5, keys may be required to engage in certain transactions. In embodiments, such transactions may include sensitive or relatively high risk transactions.

In embodiments, the smart contract(s) and associated authorized private keys may be maintained by the SVCoin issuer and which would hold the authorized private key(s) associated with the token on an associated device.

By way of illustration, an ERC20 Contract can include the following representative type of functions as shown in Table 1 in its programming of a Smart Contract associated with a particular token, such as a security token or a stable value token:

TABLE 1

```
 1 // -------------------------------------------------------------------------
 2 // ERC Token Standard #20 Interface
 3 // https://github.com/ethereum/EIPs/blob/master/EIPS/eip-20-token-standard.md
 4 // -------------------------------------------------------------------------
 5 contract ERC20Interface {
 6    function totalSupply( ) public constant returns (uint);
 7    function balanceOf(address tokenOwner) public constant returns (uint balance);
 8    function allowance(address tokenOwner, address spender) public constant returns
(uint
remaining);
 9    function transfer(address to, uint tokens) public returns (bool success);
10    function approve(address spender, uint tokens) public returns (bool success);
11    function transferFrom(address from, address to, uint tokens) public returns (bool
success);
12
13    event Transfer(address indexed from, address indexed to, uint tokens);
14    event Approval(address indexed tokenOwner, address indexed spender, uint tokens);
```

Some of the tokens may include further information describing the token contract such as shown Table 2:

TABLE 2

```
1    string public constant name = "Token Name";
2    string public constant symbol = "SVCoin";
3    uint8 public constant decimals = 18; // 18 is the most common
number of decimal places
```

In embodiments, a more elaborate smart contract can be set up to allow token issuers to have hybrid control over which key pairs have authority to affect the token supply and distribution. In embodiments, a hybrid combination of on-line and off-line key pairs can be used to control the supply and distribution of tokens.

For example, in embodiments, a smart contract may include a state-changing function such as limitedPrint, where the authorized caller of such function would be authorized only to print (or issue) a specific limited amount of tokens. In embodiments, the limitedPrint function may authorize printing or issuing of tokens for a set period of time In embodiments, the limitedPrint function may authorize printing or issuing of only a certain number of tokens over a set period of time. In embodiments, the limitedPrint function may be used with an on-line key pair (e.g., hot wallet), to allow for fast and efficient token creation, but limit risk of unauthorized takeover of the on-line key pair to the set limit.

In conjunction with a limitedPrint command, a separate state-changing function of raiseCeiling can be used to increase the authority for the on-line key pair using a different key pair, such as an off-line key pair (e.g., cold wallet), which is considered to be more secure.

In embodiments, using a limitedPrint function with a set limit that can be implemented by one or more designated on-line key pairs (e.g., hot wallets), and a raiseCeiling function which may change that limit under the authority of a different set of one or more designated off-line key pairs (e.g., cold wallets), the automated increases in the token supply through on-line control will only continue up until the ceiling is reached, at which point further intervention through off-line control is required. In embodiments, a subset of two or more corresponding key pairs from a larger collection of key pairs may be required to engage in certain transaction. For example, 2 of 3, 2 of 5, or 3 of 5, to name a few, keys may be required to engage in certain transactions. In embodiments, as noted above, such transactions may include sensitive or relatively high risk transactions.

One should consider the difference between the current token supply and the supply ceiling as part of the tokens at risk. If the current token supply has decreased through the use of burn, then the effective funds at risk could have increased without a corresponding decrease in the supply ceiling. The ceiling can be lowered by on-line control, through a function called lowerCeiling. This allows for relinquishing some portion of what has been granted through off-line control to limit the effective funds at risk through compromise of on-line key management systems. In embodiments, a limit on number of tokens that can be burned may also be included.

Figures 13A, 13B:
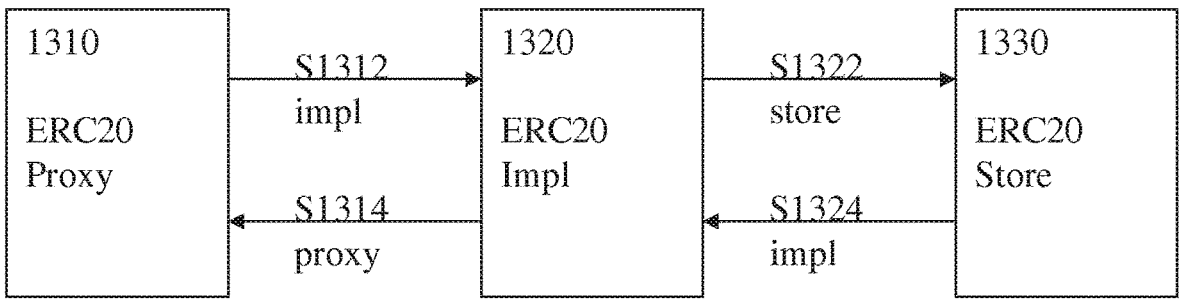
FIGS. 13A-H illustrate exemplary embodiments of a token that utilizes smart contracts in accordance with an embodiment of the present invention.

In embodiments, as illustrated in FIG. 13A, the token may be set up using at least three core smart contracts, e.g., ERC20Proxy 1310, ERC20Impl 1320, and ERC20Store 1330 that cooperatively implement an ERC20 compliant token.

In the context of a ERC20 compliant token on the Ethereum blockchain, there is one, and will only ever be one instance of ERC20Proxy 1310. This is the smart contract that users of the token treat as the token contract. Thus, ERC20Proxy 1310 can be considered the permanent face of interacting with the token on the Ethereum blockchain.

However, in embodiments, ERC20Proxy 1310 may have almost no code and does not keep any state information itself. Instead, in embodiments, ERC20Proxy 1310 has one or more implementations (e.g., ERC20 Impl 1320, ERC20 Impl (1) 1340, ERC20 Impl (2), to name a few) that executes the logic of the token. S1312 "impl" represents a delegation from ERC20 Proxy 1310 to ERC20Impl 1320. Thus, the instance of ERC20Impl 1320 executes the specific delegated functions. ERC20Impl 1320 may further limit the authority to implement to the specific delegated functions to only

US 12,651,249 B1

Figure 13C:
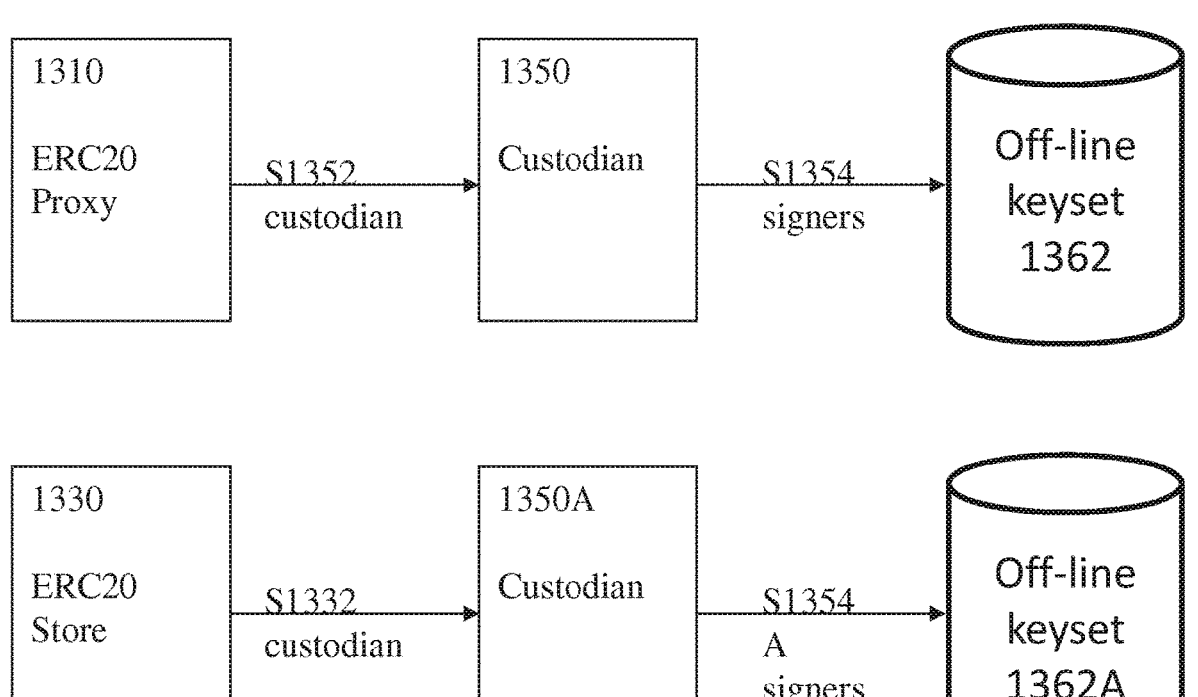
Figure 13D:
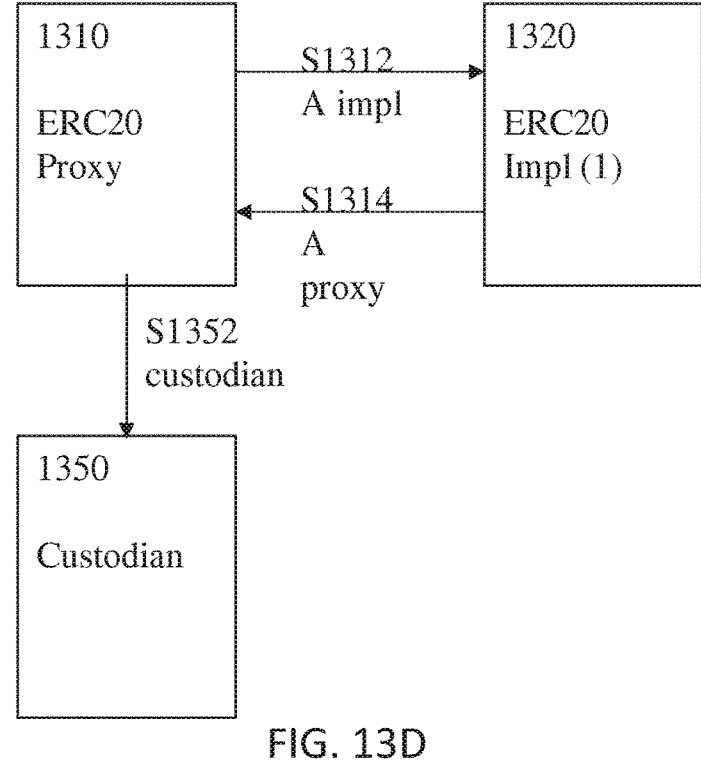
Figure 13E:
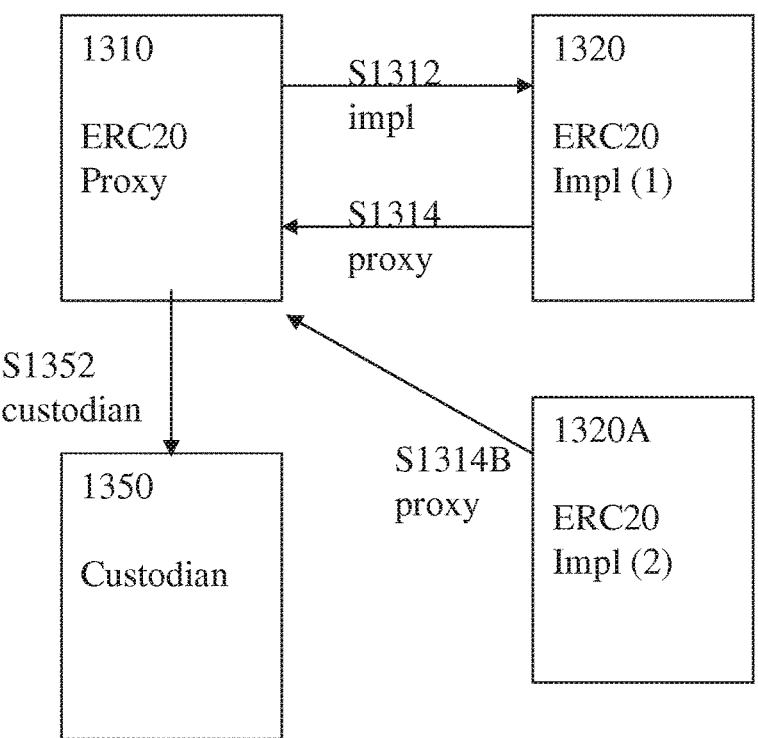
Figure 13F:
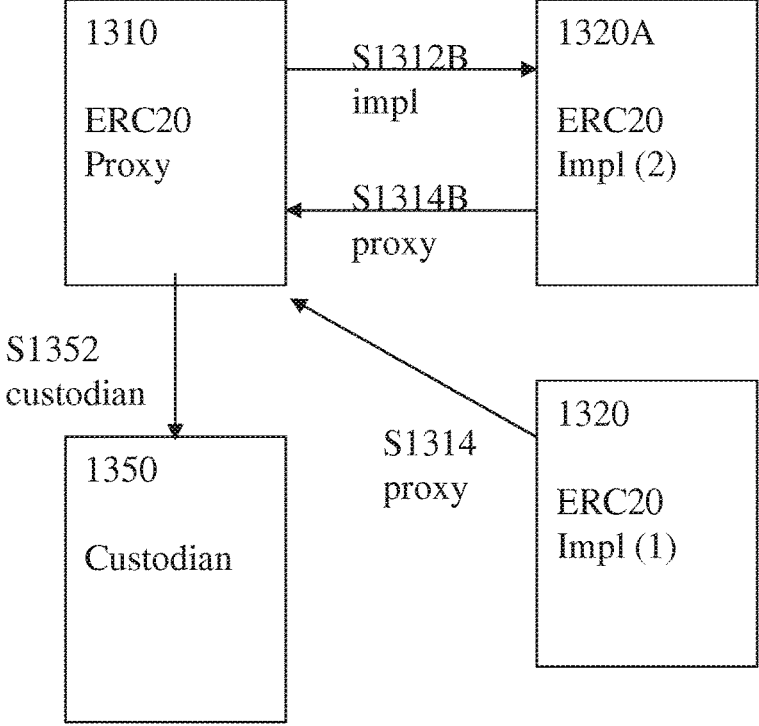
Figure 13G:
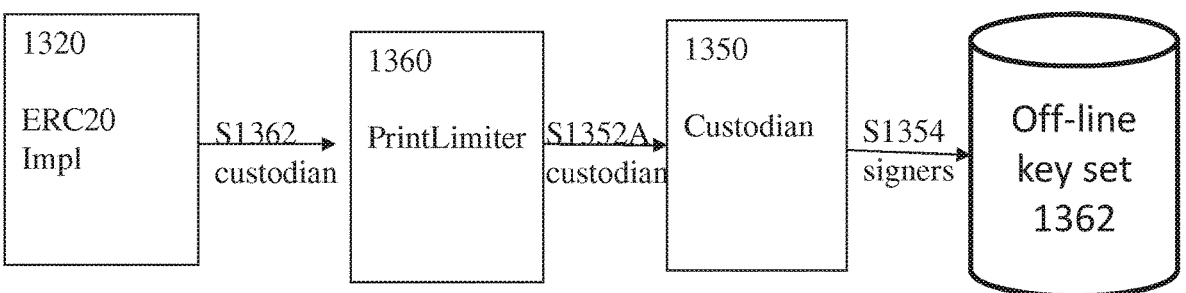
Figure 13H:
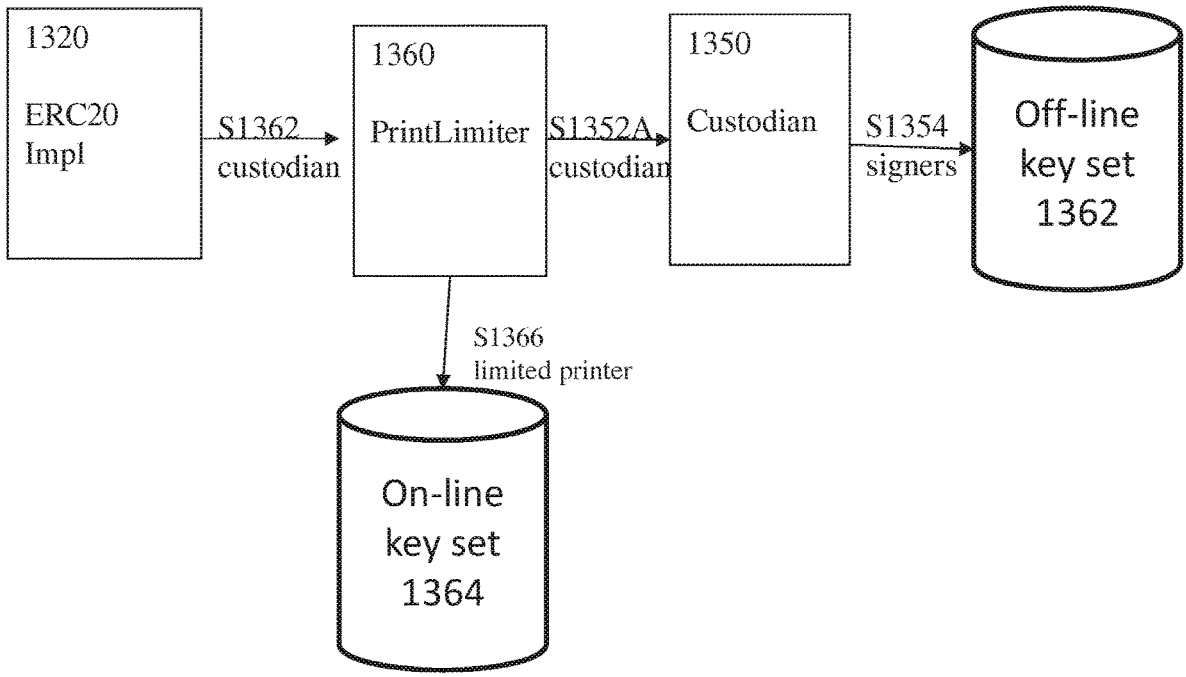

19 specified trusted callers (e.g., as shown in FIGS. 13C, 13G and 13H, one or more off-line key set 1362, one or more on-line key set 1364, to name a few). S1314 proxy illustrates the authorization of ERC20Impl 1320 executing logic on behalf of ERC20Proxy 1310, through call functions from one or more authorized addresses.

In embodiments, state information, such as token balances, may be maintained in a separate instance, e.g., ERC20Store 1330, a "backing store." In such embodiments, ERC20Store 1330 would own the delegated state of the token. S1322 "store" illustrates the delegation of state information from ERC20Impl 1320 to ERC20Store 1330. In embodiments, the instance of ERC20Store 1330 may execute updates to the state of the token, such as updates to token balances that occur during a token transfer to one or more designated key sets. S1324 "impl" represents the address that the ERC20Store 1330 will permit to invoke the update functions. In embodiments, that address is the "Contract Address" of the active version of ERC20Impl 1320.

This separation of duties-public face, logic, and storage, for ERC20Proxy 1310, ERC20Impl 1320, and ERC20Store 1330, respectively-provides the ability for token issuer to replace the logic of the system at a later date. In embodiments, the logic may be replaced by changing the impl arrows (e.g., S1312 "impl" and S1324 "impl").

FIG. 13B illustrates an embodiment where a token has been upgraded, by creating a new instance of ERC20Impl (ERC20Impl (2) 1320A) with a second version of the code previously implemented through ERC20Impl 1320. The instance of ERC20Proxy 1310 now delegates its implementation in S1312A "impl" to ERC20Impl (2) 1320A (version 2 of the code) instead of the previous ERC20Impl 1320 (version 1), and the instance of ERC20Store 1330 will now only accept calls from ERC20Impl 1320A (version 2). The original ERC20Impl 1320 (version 1) remains, but has become inert as it is unlinked from the system.

Turning to FIGS. 13C-13F, custodianship will be discussed.

In embodiments, a fourth type of contract, Custodian 1350, may also be implemented. A Custodian 1350 is logic which designates which key pair (e.g., an Off-Line Keyset 1362), is authorized to control other contracts in the system (e.g., ERC20Proxy 1310). Contracts cooperate with Custodian 1350 by awaiting an approval from Custodian 1350 before executing certain actions. In turn, such approval will require a message from an authorized key pair (e.g., Off-Line Keyset 1362) authorizing the action (e.g., print tokens, limit tokens, transfer tokens, to name a few).

In embodiments, Custodian 1350 may include a range of control coding. In embodiments, control coding may include the requirement that at least two designated keysets authorize a specific action (e.g., print token). In embodiments, at the least two keysets may be a subset of a larger group of keysets (e.g., two of three designated keysets, or two of six designated keysets, or three of five designated keysets, to name a few). In embodiments, when a higher degree of security is desired, the keysets may be maintained off-line. In embodiments, when a higher degree of automation or speed to access is required, the keysets may be maintained on-line, such as in a co-located, but separate computer system that is operatively connected to a customer facing digital asset system.

In embodiments, Custodian 1350 may also exercise control over various security operations of ERC20Proxy 1310 (e.g., time locking and revocation, to name a few).

In embodiments, Custodian 1350 may have custodianship of the proxy which grants exclusive power to replace the implementation for ERC20Proxy 1310 from its current implementation (e.g., ERC20Impl 1320 (version 1)) to a new implementation (e.g., ERC20Impl 1320A (version 2)), as illustrated in FIG. 13B, discussed above. As discussed, in embodiments, only authorized and designated key sets (e.g., off-line key set 1362) will have the authority in step S1354 signers to authorize the Custodian 1350 to modify an implementation of ERC20Proxy 1310.

In embodiments, Custodian contracts with their own respective authorized designated keysets can be set up for other contracts, such as ERC20Store 1330 as also shown in FIG. 13C. Thus, by way of example, ERC20Store 1330 may designate in S1332 Custodian 1350A as a custodian for certain operations of ERC20Store. Those operations will only be executed by ERC20Store 1330 when designated keyset (such as Off-Line keyset 1362A) sends a message through the blockchain to Custodian 1350A authorizing the Custodian 1350A to authorize the ERC20Store 1330 to perform the designated function. In embodiments, the off-line keyset 1362A may be the same as, overlap with, or be different from the Off-Line Key Set 1362A which may authorize Custodian 1350 with respect to ERC20Proxy 1310.

In embodiments, custodianship of the proxy and store also grants exclusive power to pass custodianship to a new instance of Custodian. Thus, one of the technical computer problems associated with the immutability of ERC20 smart contracts on the Ethereum blockchain has been solved, thus allowing for a self-upgrade of custodianship. In embodiments, since a set of signers for a given instance of a Custodian is fixed, a change to the off-line keyset may be implemented instead having a current Custodian authorize itself to be replaced by a new instance of Custodian with a new set of signers.

Referring now to FIGS. 13D-13F, an exemplary process of upgrading active implementation of the pointer relationship of ERCProxy 1310 from ERC20Impl 1320 (version 1) to ERC20Impl 1320A (version 2) will now be discussed.

FIG. 13D reflects the initial state in which ERC20Proxy 1310 has Custodian 1350 and in S1312A implemented ERC20 Impl 1320 (version 1) to act as a proxy in S1314A for certain functions of ERC20Proxy 1310.

To swap out the current ERC20Impl1320 (version 1) with an updated ERC20Impl 1320 (version 2), as shown in FIG. 13E, the coding for ERC20 Impl 1320 (version 2) needs to be deployed on the blockchain and set its proxy point (S1314B proxy) to the same ERC20Proxy 1310.

Next, the implementation pointer from ERC20Proxy 1310 which is currently set at S1312 (impl) to point to ERC20Impl 1320 (Version 1), needs to be reset to be S1312B "impl" to point to ERC20Impl 1320A (version 2) instead. This change requires the authorization of Custodian 1350, which in turn requires two signatures from keys in its designated keyset (e.g., Off-Line Keyset 1362) sent to it on the blockchain.

Table 3 represents an exemplary embodiment of the steps used to implement this process:

TABLE 3

1. lockID = proxy.requestImplChange(imp_2)
2. request= custodian.requestUnlock(lockId,proxy.confirmImpl.Change)
3. Off-line signing of request
4. custodian.completeUnlock (request, signature_1, signature 2)
    a. proxy.confirm ImplChange(lockID)

Referring to Table 3, in step 1, a request must be made to ERC20Proxy to change its instance of ERC20Impl. This request may come from any address, and when the request is made, the function returns a unique lockId that anyone can use to look up that request.

Next, in step 2, to confirm the pending request, the Custodian contract 1350 for ERC20 Proxy 1310 calls requestUnlock and passes as arguments the lockId generated for the change request, and the function in ERC20Proxy 1310 the Custodian 1350 needs to call to confirm the change request. This generates a request, which is a unique identifier for this unlock request.

In step 3, to complete the unlocking of Custodian and therefore propagate the change to ERC20Proxy 1310, the digital asset system operated by the token issuer uses its off-line key storage infrastructure to sign the request with the previously approved designated key sets. In this example, two signatures are required (signature 1 and signature 2), but other combinations of signatures may be used consistent with embodiments of the present invention.

In step 4, those signatures are passed into the Custodian's completeUnlock function along with the initial request. Once the request is validated against the signatures, completeUnlock parses the content of the request and issues the command. In this case, it calls ERC20Proxy's confirmImplChange using the lockId generated in the initial ERC20Impl change request.

As shown in FIG. 13F, ERC20Proxy 1310 now points with S1312B to the updated ERC20Impl 1320A (version 2) contract, thus delegating all future calls from ERC20Proxy 1310 to the updated contract ERC20 Impl (version 2) 1320A. This process can be repeated in the future to upgrade the ERC20 Impl (version 2) 1320A to new versions as authorized by the Custodian 1350.

In embodiments, a similar process may also be used to upgrade the active Custodian 1350. Instead of the pair of functions requestImplChange and confirmImplChange, the pair of functions requestCustodianChange and confirmCustodianChange are used instead.

Referring to FIGS. 13G and 13H, a PrinterLimiter 1360 contract may also be used as an upgradeable limit on the token supply available.

In the context of FIG. 13G, ERC20Impl 1320 allows printing an unbounded amount of tokens to any arbitrary address. This printing can only be done by PrintLimiter 1360 contract, which serves as ERC20Impl's custodian. However, PrintLimiter 1360 can only call this unbounded printing if it receives a call from its custodian, a separate contract named Custodian 1350, which is in turned controlled by signatures from designated keysets (e.g., Off-Line Key Set 1362).

Thus, to print an unbounded amount of tokens, signatures from keys in Off-Line Key Set 1362 need to be sent through the blockchain, to Custodian 1350, which, in turn, then calls through the blockchain, PrintLimiter 1360, which then, in turn, calls through the blockchain ERC20Impl 1320 to confirm the print request.

Referring to FIG. 13H, a limited printing option may also be implemented. Thus, in embodiments consistent with FIG. 13H, ERC20Impl 1320 allows either printing an unbounded amount (which originates from Off-Line Key Set 1362 as described earlier), or a limited amount which does not require the Off-Line Key Set 1362 to enact. Within Print-Limiter 1360 is a "total supply ceiling" variable: a maximum total supply of tokens that any "limited print" operation cannot exceed. This value is set by Off-Line Key Set 1362. PrintLimiter 1360 allows printing new tokens while remaining under that ceiling from a special hot wallet address. That hot wallet address can call PrintLimiter 1360 directly, which then calls ERC20Impl 1320 to confirm the "limited" print operation. In embodiments, limits may also be expressed in units of tokens to be issued, time periods or units of tokens per unit of time. In embodiments, for higher risk activities, a time delay may be implemented even where the activity is authorized. For example, where a large number of tokens are to be printed, a time delay of, e.g. 15 minutes, may be implemented even after authorization is confirmed.

The total supply ceiling can only be raised by Off-Line Key Set 1362. In embodiments, it can be lowered, however, by On-Line Key Set 1364 or Off-Line Key Set 1362.

Table 4 illustrates exemplary embodiments of code used in smart contracts on the Ethereum blockchain which implement a cooperative relationship with an external account or contract that exerts custodianship over the contract following the pattern.

A contract following this type of pattern is capable of carrying out some action-a portion of the desired operations; however, rather than executing the action directly, the action is first requested, with a unique 'lock identifier' returned as the result of the request. The pending action is stored in the contract state, storing the data necessary to execute the action in the future, and with the lock identifier as the lookup key to retrieve the pending action. If the contract is called by its custodian, receiving a lock identifier as an argument, then the associated pending action, if any, is retrieved and executed.

In embodiments, as illustrated in Table 4, the contracts may include multiple inheritances, so for the purposes of code reuse, a function for generating unique lock identifiers is implemented in the contract LockRequestable.

TABLE 4

```
contract LockRequestable {
    uint256 public lockRequestCount;
    function LockRequestable( ) public {
        lockRequestCount = 0;
    }
    function generateLockId( ) internal returns (bytes32 lockId) {
        return keccak256(block.blockhash(block.number - 1), address(this),
    ++lockRequestCount);
    }
}
```

In embodiments, the function generateLockId returns a 32-byte value to be used as a lock identifier, which is a hash of the following three components: (1) The blockhash of the Ethereum block prior to the block that included the Ethereum transaction that executed this function; (2) The deployed address of the instance of the contract that inherits from LockRequestable; and (3) The current value of the count of all invocations of generateLockId (within 'this' contract).

Component three plays the role of a nonce (in cryptography, a nonce is an arbitrary number that can be used just once) ensuring that a unique lock identifier is generating no matter how many invocations of generateLockId there are within a single Ethereum transaction or a single Ethereum block.

Component two ensures that the lock identifier is unique among the set of cooperating contracts that use this identifier generation scheme. A noncooperative contract authored by a third party may choose to generate identifiers that overlap, but that is expected not to impact operation.

Finally, component one uses the relative previous blockhash to make future lock identifiers unpredictable.

Table 5 illustrates embodiments of code which uses LockRequestable in a template consistent with embodiments of the present invention.

TABLE 5

```
contract C is ..., LockRequestable {
  struct PendingAction {
    t v;
    ...
  }
  address public custodian;
  mapping (bytes32 => PendingAction) public pendingActionMap;
  function C(address _custodian, ...) public {
    custodian = _custodian;
    ...
  }
  modifier onlyCustodian {
    require(msg.sender == custodian);
    _;
  }
  function requestAction(t_v, ...) public returns (bytes32 lockId) {
    require(_v != 0);
    lockId = generateLockId( );
    pendingActionMap[lockId] = PendingAction({
      v: _v,
    });
    emit ActionLocked(lockId, _v, ...);
  }
  function confirmAction(bytes32 _lockId) public onlyCustodian {
    PendingAction storage pendingAction = pendingActionMap[_lockId];
    tv = pendingAction.v;
    require(v != 0);
    ... // copy any other data from pendingAction
    delete pendingActionMap[_lockId];
    ... // execute the action
    emit ActionConfirmed(_lockId, v, ...);
  }
  event ActionLocked(bytes32_lockId, t _v, ...);
  event ActionConfirmed(bytes32 _lockId, t _v, ...);
}
```

The function requestAction generates a fresh lock identifier and captures the request parameters as a pending action, storing it in a mapping associated with the lock identifier.

The function confirmAction is callable only by the designated custodian. The given lock identifier is used to retrieve the associated pending action from the contract storage, if it exists, otherwise the function reverts. The pending action is deleted from storage, which ensures that the action will be executed at most once. Finally the logic of the action is executed.

In embodiments, there are two requirements to the confirmAction callback function: (1) The function does not have a return value; and (2) The function must only revert if there is no pending action associated with the lock identifier.

In these embodiments, the custodian receives a failure signal only when it called with an invalid lock identifier. Any failure cases that may occur in the execution of the action logic must be signaled by means other than return values or reversions (including abortive statements such as throw).

Programming consistent with Tables 4 and 5 may be used to implement a wide variety of functions in the context of a token including, by way of example:

Contracts that inherit from the ERC20ImplUpgradeable contract (e.g., ERC20Proxy and ERC20Store) control updates to the address that references an instance of the ERC20Impl contract;

The ERC20Impl contract to control increases to the token supply;

The ERC20Holder contract to control 'withdrawal' transfers out of its balance;

The PrintLimiter contract to control increases to its token supply ceiling state; and Contracts that inherit from the CustodianUpgradeable contract (e.g., ERC20Proxy, ERC20Impl, and ERC20Store) to control the passing of custodianship itself from the current custodian to a new custodian, to name a few.

In embodiments, other limits or controls may also be built into the smart contract functionality of the token. For example, in embodiments, it may be necessary for the token issuer to adjust the token ledger to account for regulatory activity. For example, there may be a court order seizure of funds, or a security issue that may require reversing transactions during a compromised period, to name a few In embodiments, the administrator may send instructions to modify the token supply for one or more particular accounts. For example, the smart contract may include instructions to pause a transfer. The pause function may be a permanent pause, e.g., for a compromised account, a time limited pause, e.g., for 24 hours or 2 days, or a temporary pause which requires another instruction to reactivate the account, to name a few. Such a function could be included as an upgrade feature in a new Impl contract, or built into the smart contract to be activated when an authorized account, e.g., one or more off-line keys call upon the smart contract to implement the pause functionality, with appropriate parameters.

In embodiments, the administrator may send instructions to rebalance the token supply of one or more particular accounts. For example, the smart contract may include instructions to adjust a token balance in a designated account, e.g., by raising the balance in the designated account, lowering the balance in the designated account, or transferring some or all of the tokens in one designated account to one or more other designated accounts. Such a function could be included as an upgrade feature in a new Impl contract, or built into the smart contract to be activated when an authorized account, e.g., one or more off-line keys, call upon the smart contract to implement the pause functionality, with appropriate parameters.

Figure 15A:
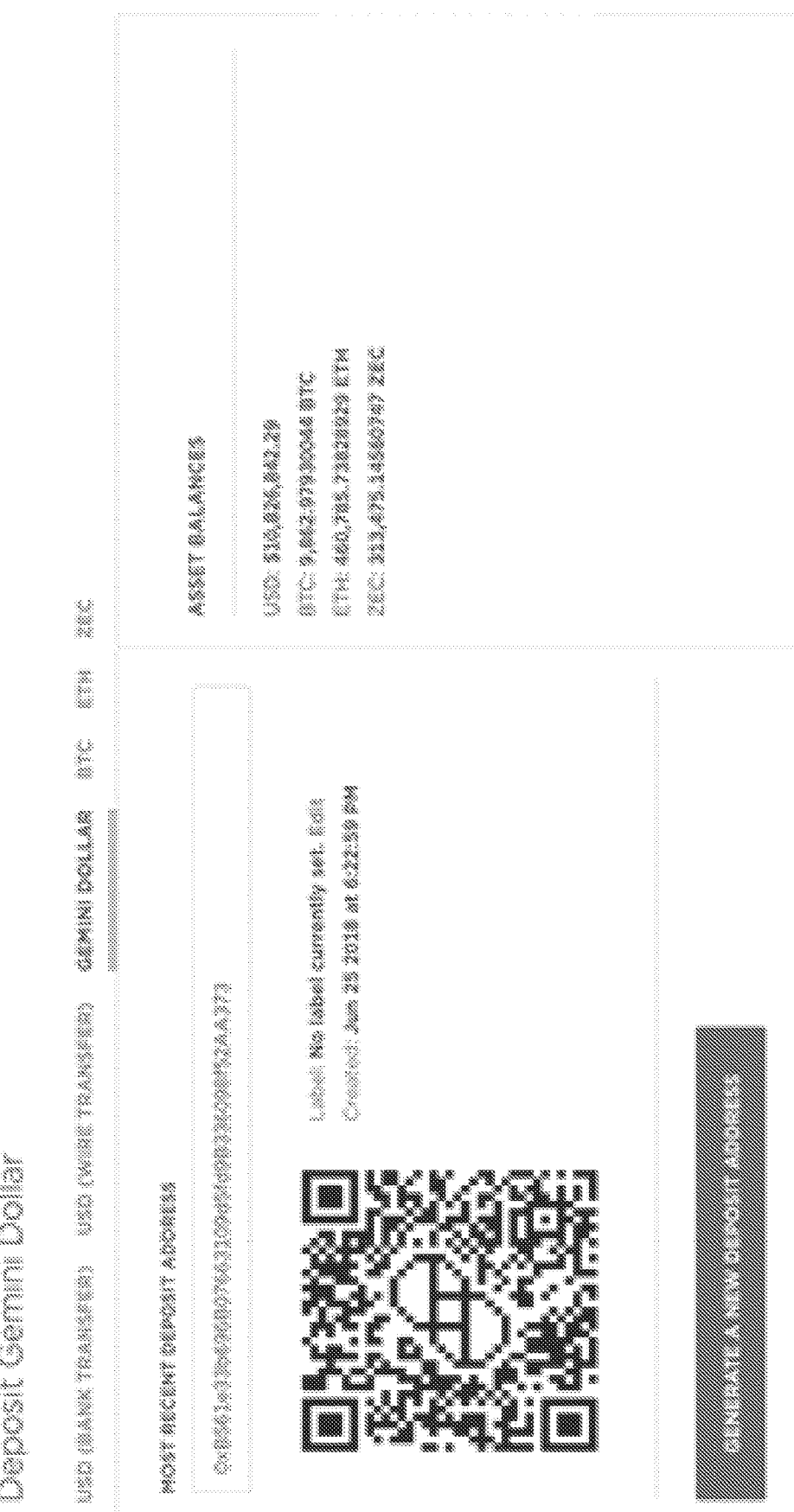
Figure 15B:
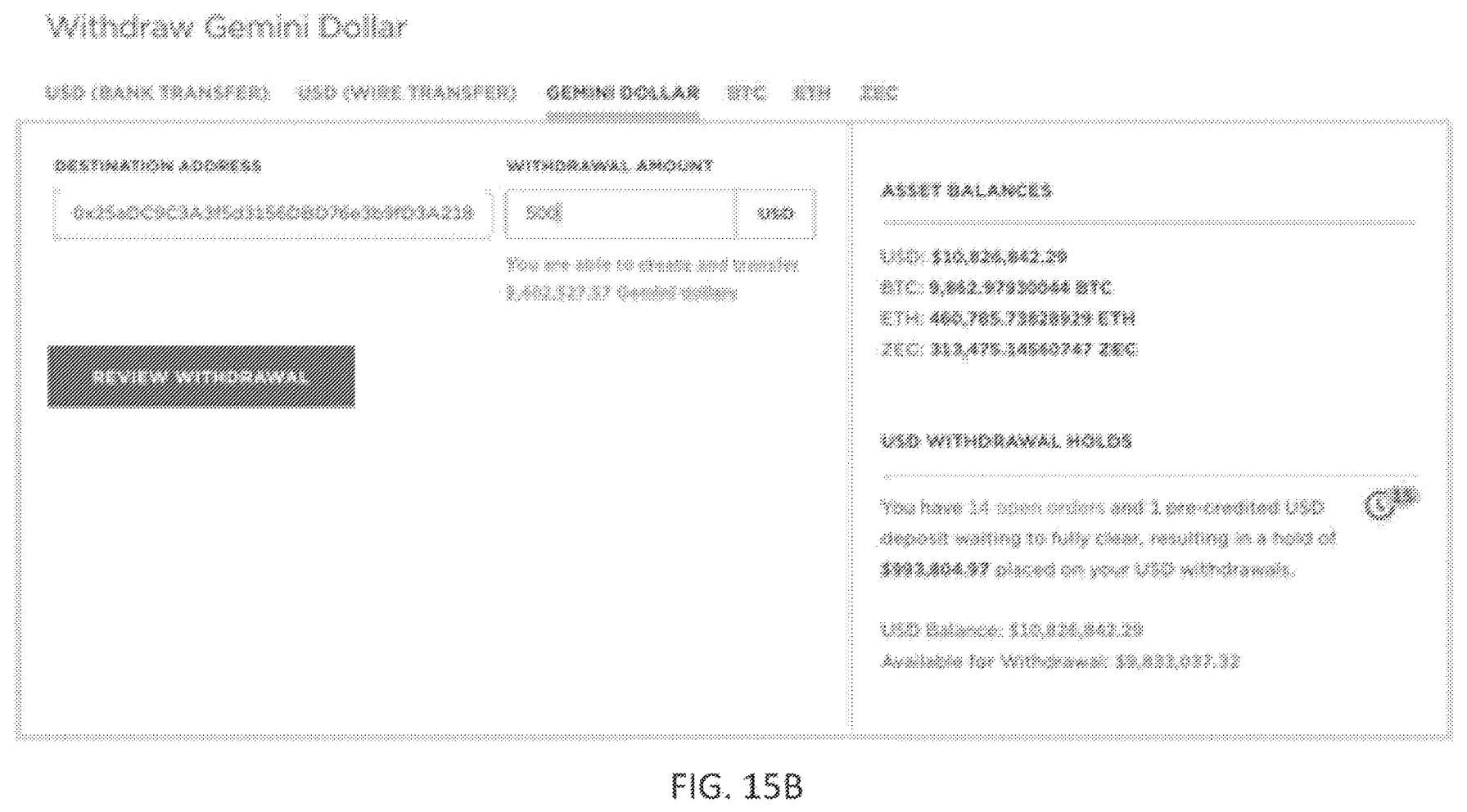
Figure 15C:
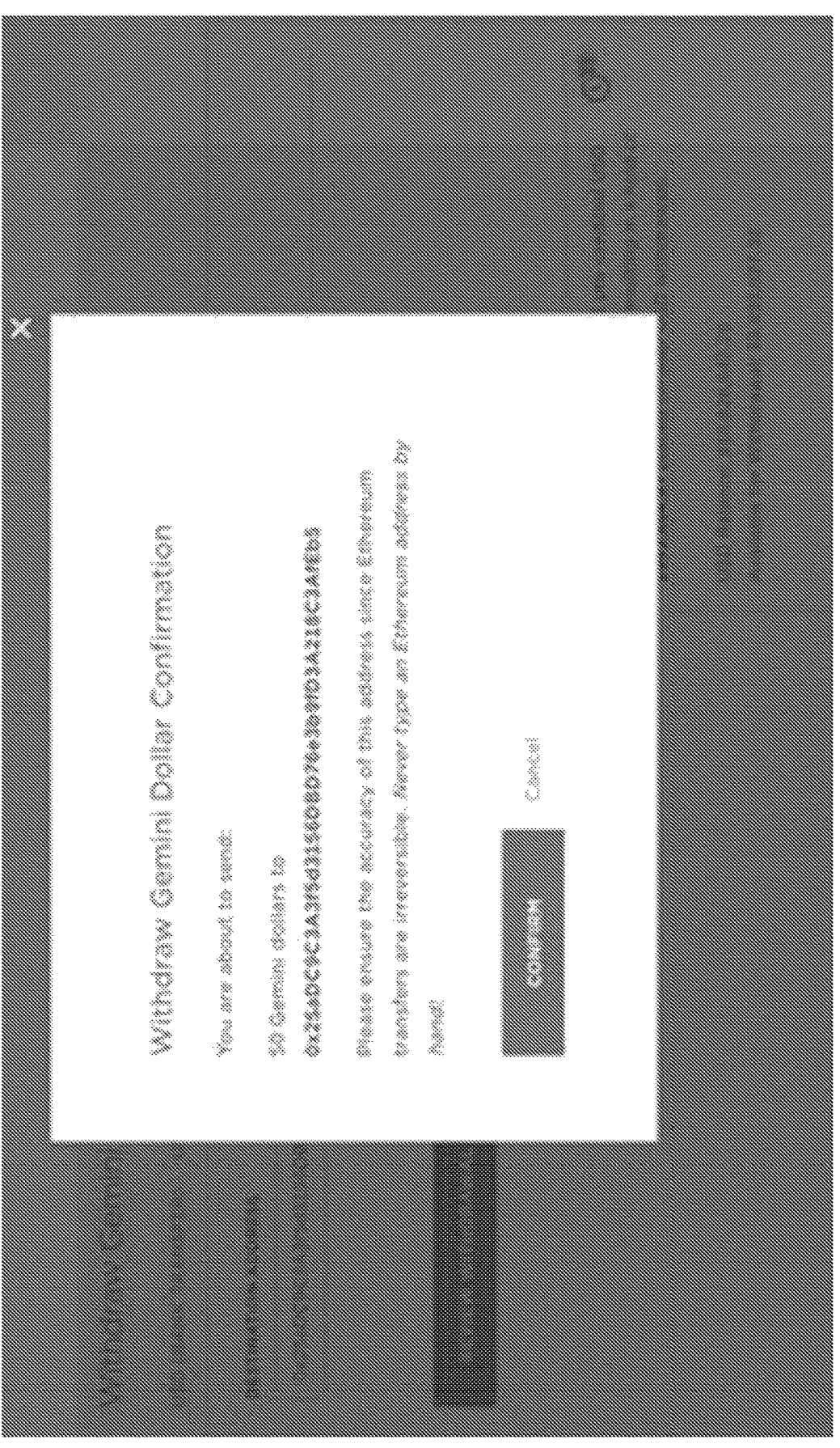

In embodiments, the Stable Value Token may be embodied in the form of a token on the Ethereum Blockchain, referred to as a Gemini Dollar token, as illustrated in the exemplary dashboard of FIGS. 15A-15C.

FIG. 15A illustrates an exemplary GUI for an interface with the digital asset exchange in which a user can deposit/redeem Gemini Dollar tokens into an public address associated with the digital asset exchange, in exchange for an corresponding amount of fiat in the user's account at the digital asset exchange. In embodiments, after the registered user of the exchange deposits the stable value token into the exchange's public address, the exchange will transfer from the bank account or other account associated with the stable value token, a corresponding amount of fiat, to the bank account associated with the fiat holdings of the user. In embodiments, the deposited token will then be burnt from circulation. In embodiments, the deposited token may instead of being burnt be redistributed to another customer, but in such case, an appropriate amount of fiat will need to be redeposited into the bank account or other stable investment vehicle associated with the stable value token.

In embodiments, creation and redemption of the Gemini Dollar tokens may be made simple to promote usability and encourage adoption. In embodiments, Gemini Dollar tokens are redeemed or "destroyed" at the time of deposit into a digital asset exchange. Exchange customers may exchange Gemini Dollar tokens for U.S. dollars at a 1:1 exchange rate by depositing Gemini Dollar tokens into their exchange account. The U.S. dollar amount of Gemini Dollar tokens will be credited to the customer's exchange account balance at the time of deposit.

The process described in FIGS. 17A-17E illustrates an embodiment of depositing/redeeming stable value digital asset tokens (i.e. Gemini Dollar tokens) in exchange for fiat.

Figure 17A:
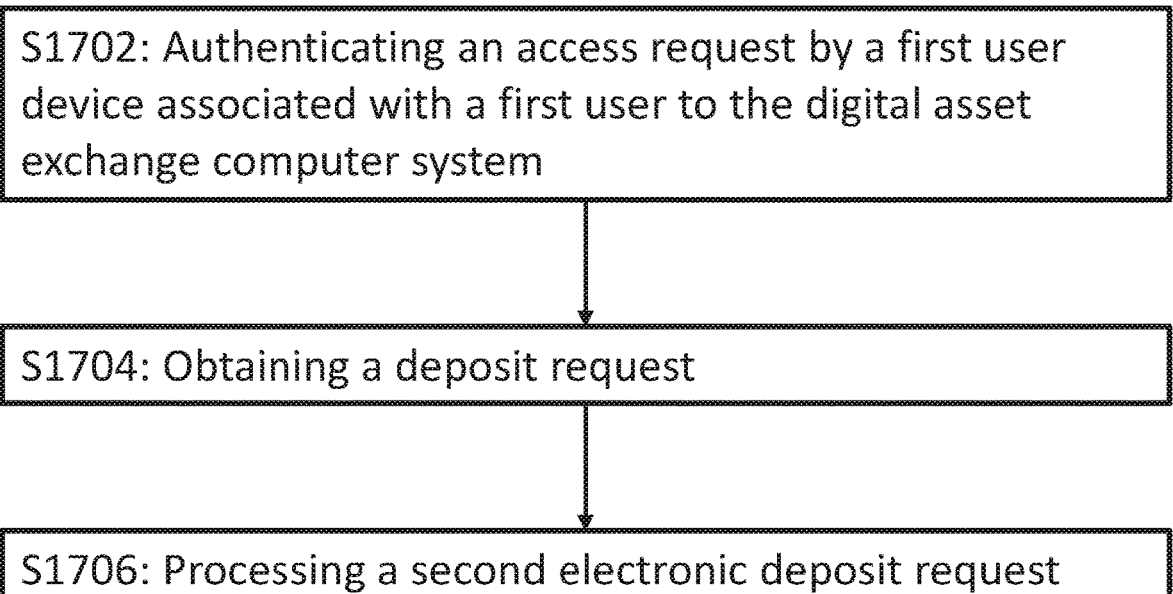
FIG. 17A is an exemplary flowchart of a process for depositing stable value digital asset tokens in accordance with exemplary embodiments in the present invention.

In a step S1702 of FIG. 17A, a digital asset exchange computer system associated with a digital asset exchange receives and authenticates an access request from a first user device associated with a first user. FIG. 17B provides a detailed illustration of an exemplary process for authenticating the first user that may be used in accordance with exemplary embodiments of step 1702. In embodiments, in a step S1702A, the digital asset exchange computer system receives an authentication request from the first user device. In embodiments, the authentication request includes first user credential information associated with the first user.

At step S1702B, the digital asset exchange computer system determines that the first user device is authorized to access the digital asset exchange computer system based at least on the first user credential information. In embodiments, the digital asset exchange computer system may further determine that the first user is a registered user of the digital asset exchange. In embodiments, the digital asset exchange may be licensed by a government regulatory authority.

At step S1702C, the digital asset exchange computer system generates first graphical user interface (GUI) information for displaying a first graphical user interface on the first user device. FIG. 15A illustrates an example of such a first graphical user interface. In a step S1702D, the digital asset exchange computer system transmits the first graphical user interface information to the first user device.

Referring back to FIG. 17A, in step S1704, the digital asset computer system obtains a deposit request from the first user device. FIG. 17C provides a detailed illustration of an exemplary embodiment of obtaining a deposit request that may be used in accordance with exemplary embodiments of step 1704. At step S1704A, the digital asset exchange computer system receives a first electronic request from the first user device. The first electronic request may be to deposit stable value digital asset tokens. In embodiments, each stable value digital asset token is tied to an underlying digital asset which is maintained on a distributed public transaction ledger in the form of a blockchain maintained by a plurality of geographically distributed computer systems in a peer-to-peer network in the form of the blockchain network. In embodiments, the underlying digital asset is ether, and the blockchain is the Ethereum Blockchain. In embodiments, the underlying digital asset is neo and the blockchain is the Neo Blockchain. In embodiments, the underlying digital asset may be based on other blockchains that provide smart contract functionality.

In step S1704B, in response to receiving the first electronic deposit request, the digital asset exchange computer system obtains first account balance information of the first user indicating a first amount of available fiat for the first user held by the digital asset exchange on behalf of the first user. In embodiments, the digital asset exchange computer system obtains the first amount of available fiat from a fiat account ledger database stored on a computer readable member accessible by the digital asset exchange computer system.

In step S1704C, the digital asset exchange computer system obtains a user specific destination address. The user specific destination address may be uniquely associated with the first user. In a step S1704D, the digital asset exchange computer system generates second graphical user interface information including at least the first account balance information and the user specific destination address. In embodiments, the graphical user interface described in step S1704C may be the graphical user interface shown in connection with FIG. 15A.

At step 1704E, the digital asset exchange computer system may transmit the second graphical user interface information to the first user device. In embodiments, this may cause the first user device to display the graphical user interface shown in connection with FIG. 15A.

In step 1704F, the digital asset exchange computer system may receive a second electronic deposit request form the first user device. In embodiments, the second electronic deposit request may comprise at least: (1) a first amount of stable value digital asset tokens to be deposited; (2) a designated public address of the first user on the underlying blockchain from which the first amount of stable value digital asset tokens will be transferred; and (3) a digital signature based on a designated private key of the first user. In embodiments, the designated private key of the first user is mathematically related to the designated public address of the first user.

Figure 17E:
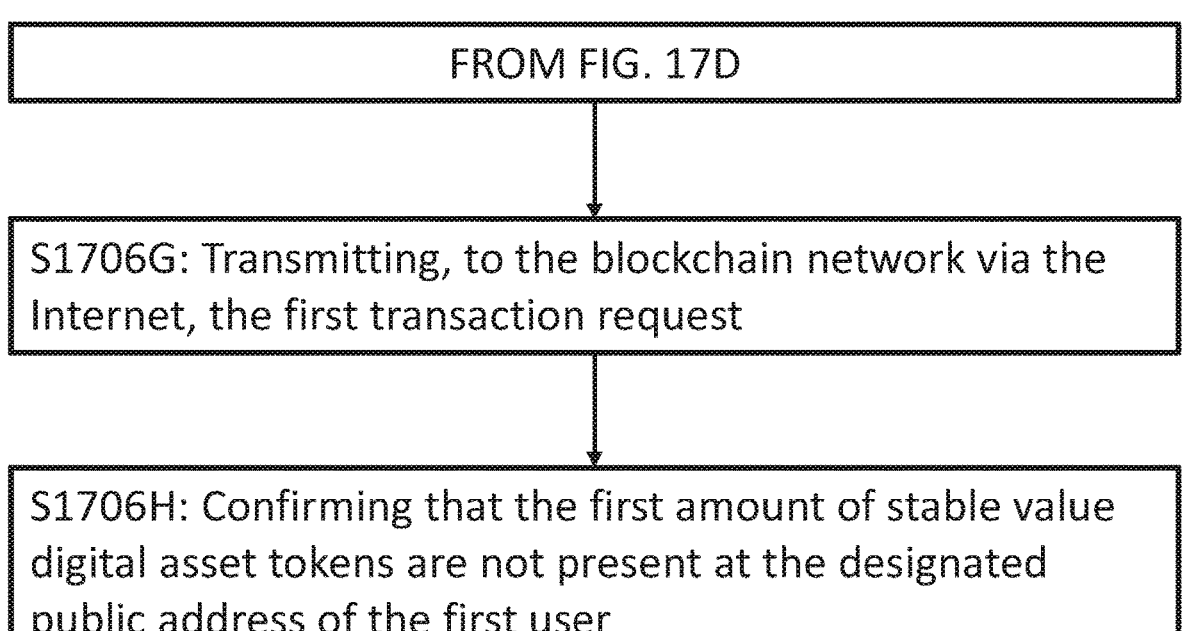

Referring back to FIG. 17A, in step S1706, the digital asset exchange computer system processes the second electronic deposit request. FIGS. 17D-17E provide a detailed illustration of an exemplary embodiment of processing the second electronic deposit request that may be used in accordance with exemplary embodiments of step 1706. Referring to FIG. 17D, in step S1706A, the digital asset exchange computer system calculates a second amount of fiat based on the first amount of stable value digital asset tokens. In embodiments, the second amount of fiat is determined using a fixed predetermined ratio of stable value digital asset tokens to fiat. In embodiments, the fiat is U.S. Dollars. In the embodiments where the fiat is U.S. Dollars, the fixed predetermined ratio may be one stable value digital asset token is equal to one U.S. Dollar. In embodiments, the fixed predetermined ratio may be one hundred stable value digital asset tokes is equal to one U.S. Dollar.

In step S1706B, the digital asset exchange computer system determines that the first amount of stable value digital asset tokens is present at the designated public address of the first user. In the case where the first amount of stable value digital asset tokens is present at the designated public address of the first user, as indicated in step S1706C, the digital asset exchange computer system determines a third amount of fiat associated with an updated amount of available fiat of the first user. In embodiments, the third amount of fiat equals the first amount of available fiat of the first user plus the second amount of fiat.

At step 1706D, the digital asset computer system updates the fiat account ledger to reflect that the updated amount of available fiat of the first user is the third amount of fiat. At a step 1706E, the digital asset exchange computer system generates a first transaction request for the blockchain from a first digital asset exchange public key address on the blockchain to a first contract address associated with a stable value token issuer. In embodiments, the first digital asset exchange public key address is mathematically related to a first digital asset exchange private key which is stored in the computer readable member accessible by the digital asset exchange computer system.

In embodiments, the first transaction request includes: (1) a request to obtain the first amount of stable value digital asset tokens from the designated public address of the first user; and (2) a request to destroy the first amount of stable value digital asset tokens. In alternative embodiments, the first transaction request may include: (1) a request to obtain the first amount of stable value digital asset tokens from the designated public address of the first user; and (2) a request to provide the first amount of stable value digital asset tokens to the a specific destination address. In embodiments, the first transaction request is signed with a generated digital signature based on the digital asset exchange private key of the digital asset exchange.

In step 1706F, the digital asset exchange computer system may update a stable value digital asset token issuer fiat ledger. The update may decrease the balance of fiat by the second amount of fiat. In embodiments, the digital asset exchange computer system may transfer the second amount of fiat from a stable value digital asset token issuer to a digital asset exchange fiat account. In embodiments, the digital asset exchange computer system may periodically transfer fiat between a stable value digital asset token issuer fiat account and a digital asset exchange fiat account based on net transactions over a predetermined period of time.

At step S1706G, the digital asset exchange computer system may transmit the first transaction request to the blockchain network via the Internet. In a step, S1706H, the digital asset exchange system confirms, via reference to the blockchain, that the first amount of stable value digital asset tokens are not present at the designated public address of the first user.

FIG. 15B illustrates an exemplary GUI for an interface with the digital asset exchange in which a user can withdraw/purchase stable value tokens in the form of Gemini Dollar tokens from their digital asset exchange account. In this exemplary embodiment, the amount of the withdrawal is expressed in U.S. Dollars, and a corresponding amount of U.S. Dollars is debited from the user's fiat account with the exchange. As part of the withdrawal process, the digital asset exchange may arrange to issue new stable value tokens to the customer at the specified digital asset exchange in accordance with embodiments elsewhere described. In embodiments, the digital asset exchange may instead transfer pre-existing stable value tokens instead. As noted above, since the stable value token is pegged to a predetermine ratio of fiat, (e.g., 1 Gemini Dollar=USD 1, or 100 Gemini Dollar=USD 1), expressing the withdrawal amount in dollars is sufficient to allow the user and the digital asset system to determine the amount of Gemini Dollars tokens being withdrawn/purchased.

FIGS. 16A-16E illustrate an embodiment of withdrawing/purchasing stable value digital asset tokens (i.e. Gemini Dollar tokens) in exchange for fiat.

Figure 16A:
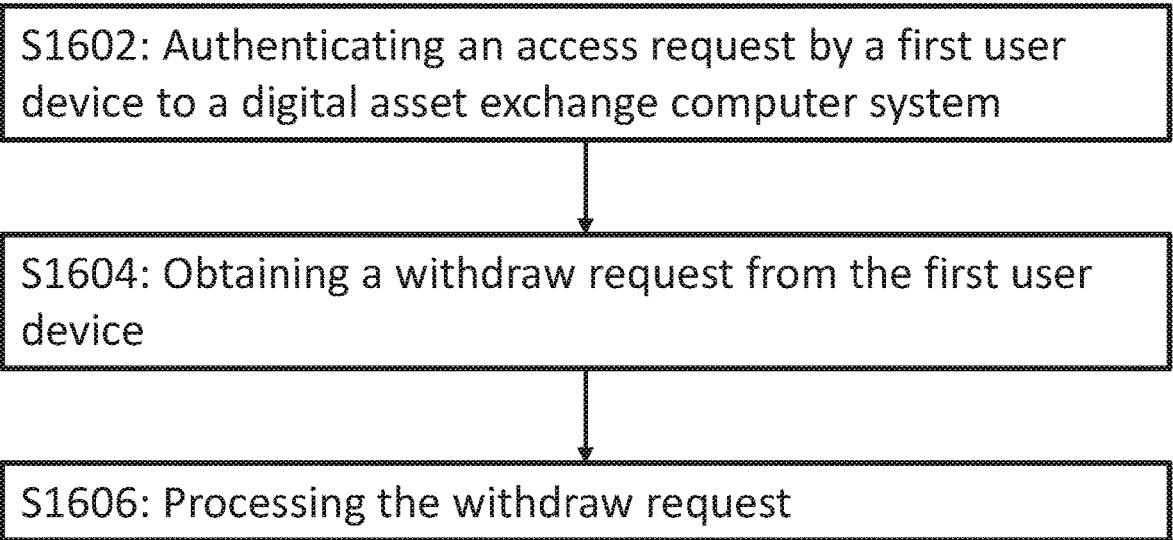
FIG. 16A is an exemplary flowchart of a process for withdrawing stable value digital asset tokens from a digital asset exchange computer system in accordance with exemplary embodiments in the present invention.

In a step S1602 of FIG. 16A, a digital asset exchange computer system associated with a digital asset exchange receives and authenticates an access request from a first user device associated with a first user. FIG. 16B provides a more detailed illustration of an exemplary embodiment of receiving and authenticating an access request from a first user device associated with a first user that may be used in accordance with exemplary embodiments of step 1602. At step S1602A, the digital asset exchange computer system receives an authentication request from the first user device. In embodiments, the authentication request includes first user credential information associated with the first user.

At step S1602B, the digital asset exchange computer system determines that the first user device is authorized to access the digital asset exchange computer system based at least on the first user credential information. In embodiments, the digital asset exchange computer system may further determine that the first user is a registered user of the digital asset exchange. In embodiments, the digital asset exchange may be licensed by a government regulatory authority.

At step S1602C, the digital asset exchange computer system generates first graphical user interface (GUI) information for displaying a first graphical user interface on the first user device. In a step S1602D, the digital asset exchange computer system transmits the first graphical user interface information to the first user device.

Referring back to FIG. 16A, in step S1604, the digital asset computer system obtains a withdraw request from the first user device. FIG. 16C provides a detailed illustration of an exemplary process of obtaining the withdraw request that may be used in accordance with exemplary embodiments of step 1604. In step S1604A, the digital asset exchange computer system receives a first electronic request to withdraw stable value digital asset tokens from the first user device. In embodiments, the stable value digital asset token is tied to an underlying digital asset which is maintained on a distributed public transaction ledger in the form of a blockchain maintained by a plurality of geographically distributed computer systems in a peer-to-peer network in the form of the blockchain network. In embodiments, the underlying digital asset is ether and the blockchain is the Ethereum Blockchain. In embodiments the underlying digital asset is neo and the blockchain is the Neo Blockchain.

In step S1604B, the digital asset exchange computer system obtains first account balance information of the first user indicating a first amount of available fiat for the first user held by the digital asset exchange on behalf of the user. The digital asset exchange computer system may obtain the first account balance from a fiat account ledger database stored on computer readable member accessible by the digital asset exchange computer system.

In step S1604C, the digital asset exchange computer system generates second graphical user interface information including at least the first account balance information. In embodiments, the second graphical user interface may be similar to the graphical user interface shown in connection with FIG. 15B. In a step S1604D, the digital asset exchange computer system transmits the second graphical user interface information to the first user device. In embodiments, the first user device may display the second graphical user interface in response to this transmission. For example, the first user device may display the graphical user interface shown in connection with FIG. 15B.

In step S1604E, the digital asset exchange computer system receives a second electronic withdrawal request from the first user device. The second electronic withdrawal request may comprise at least: (1) a first amount of stable value digital asset tokens to be withdrawn; and (2) a destination public address on the underlying blockchain to transfer the first amount of stable value digital asset tokens.

Figure 16E:
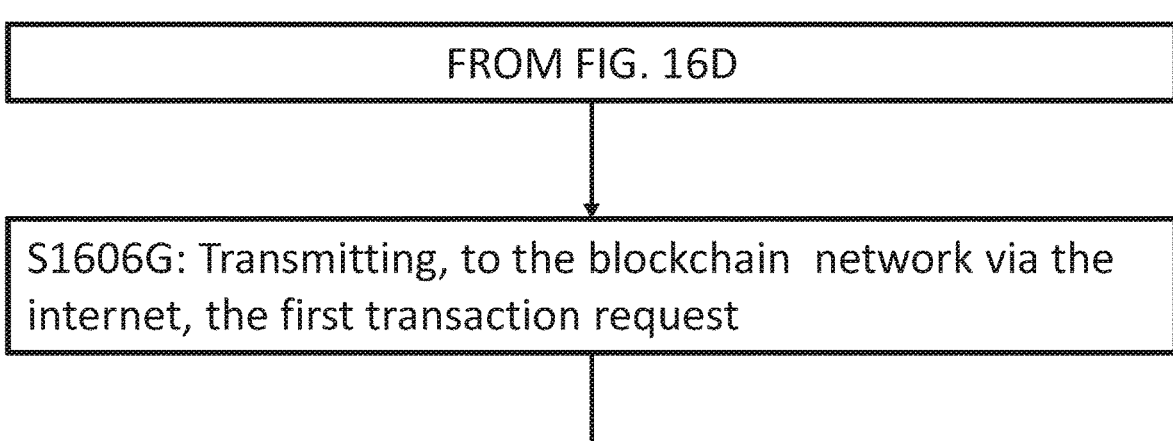

Referring back to FIG. 16A, in step S1606, the digital asset exchange computer system processes the second withdrawal request. FIGS. 16D-16E provide a detailed illustration of an exemplary process of processing the second withdrawal request that may be used in embodiments of step S1606. In step S1606A, the digital asset exchange computer system calculates a second amount of fiat based on the first amount of stable value digital asset tokens. The second amount of fiat may be determined using a fixed predetermined ratio of stable value digital asset tokens to fiat. In embodiments, the fiat is U.S. Dollars. In the embodiments where the fiat is U.S. Dollars, the fixed predetermined ratio may be one stable value digital asset token is equal to one U.S. Dollar. In embodiments, the ration may be one hundred stable value digital asset tokes is equal to one U.S. Dollar.

At step S1606B, the digital asset exchange computer system determines that the second amount of fiat is less than the first amount of available fiat of the first user. In step 1606C, where the second amount of fiat is less than the first amount of available fiat of the first user, the digital asset exchange computer system determines a third amount of fiat associated with an updated amount of available fiat of the first user. In embodiments, the third amount of fiat equals the first amount of available fiat of the first user less the second amount of fiat.

In step S1606D, the digital asset exchange computer system updates the fiat ledger database to reflect the updated amount of available fiat. In step S1606E, the digital asset exchange computer system updates a stable value digital asset token issuer fiat ledger, increasing the balance of fiat by the second amount of fiat. In embodiments, the digital asset exchange computer system may transfer the second amount of fiat from a digital asset exchange fiat account to a stable value digital asset token issuer fiat account. In embodiments, the digital asset exchange computer system may periodically transfer fiat between the digital asset exchange fiat account and the stable value digital asset token issuer fiat account.

In a step S1606F, the digital asset exchange computer system generates a first transaction request for the blockchain network from a first digital asset exchange public key address on the blockchain to a first contract address associated with a stable value digital asset token issuer. In embodiments, the first digital asset exchange public key is mathematically related to a first digital asset exchange private key which is stored in the computer readable member accessible by the digital asset exchange computer system. The first transaction request may comprise a first message including a request to obtain in the first designated public address the first amount of stable value digital asset tokens. In embodiments, the first transaction request is signed with a digital signature generated using at least the digital asset exchange private key. In embodiments, the request to obtain may further include a request to generate the first amount of stable value digital asset tokens at the first designated public address of the first user. In embodiments, the request to obtain may include a request to transfer the first amount of stable value digital asset tokens from a stable value digital asset token issuer public address to the first designated public address of the first user.

In step S1606G of FIG. 16E, the digital asset exchange computer system transmits the first transaction request to the blockchain network via the Internet. In step S1606H, the digital asset exchange computer system confirms, via reference to the blockchain, that the balance of stable value digital asset tokens in the first designated public address of the first user includes the first amount of stable value digital asset tokens.

In embodiments, as noted above, customers may exchange U.S. dollars for Gemini Dollar tokens at a 1:1 exchange rate, for example, by initiating a withdrawal of Gemini Dollar tokens from their digital asset exchange account to any Ethereum address they specify, as indicated in FIG. 15B. The U.S. dollar amount of Gemini Dollar tokens will be debited from the customer's exchange account balance at the time of withdrawal.

In embodiments, as illustrated in FIG. 15C, for example, the exemplary dashboard may also allow the user an opportunity to cancel a transaction before final execution by the blockchain network and inclusion on the underlying blockchain.

In Step S1002 of FIG. 10, for example, Alice's wallet, or associated digital asset address, may send a request message to the database maintained by the blockchain including: (a) Alice's ethereum digital asset address, which is typically associated with a digital wallet (Source Address); (b) token identification information; (c) amount of token to be transferred; and (d) Bob's ethereum digital asset address (Destination Address). In embodiments, if a fee is charged for the transaction, fee payment information may also be required and provided. For example, on the Ethereum network, an amount of Gas tokens may be required from the sender to pay for processing of the transaction into a block on the blockchain. In embodiments, the message may include a proposed fee amount and/or fee proposal including a limit in e.g., Gas. The request message will also be digitally signed by Alice's private key.

In Step S1004, when miners on the blockchain network receive the transaction request directed to the contract wallet or associated digital asset address, with the request message, miners on the blockchain network will confirm the transaction, including verifying that the message was properly signed by Alice. In Step S1004-$b$, the miners may verify that Alice has sufficient amount of tokens to perform the requested transaction, for example, by comparing Alice's balance against Alice's token balance as indicated on the blockchain. In Step S1004-$c$, the validity of Bob's digital asset address (the Destination Address) may also be confirmed by the miners. The miners may also compare the request with smart contract coding and instructions included in the Contract Address. The transaction fee discussed above is paid to the miners for confirming the transaction as noted above.

In Step S1006, if the request is verified the transaction is published in the Security Token database of the blockchain reflecting a debit against Alice's token holdings and a corresponding credit to Bob's token holdings (less any applicable fees).

In Step S1008, response messages to the digital asset addresses of both Alice and Bob may be sent to reflect that the transaction was successfully processed. In embodiments, such messages may include information including: (i) the source digital asset address; (ii) the destination digital asset address; (iii) the amount of tokens transferred; and/or (iv) the new balances for each digital asset address or associated digital wallet. In embodiments, the message may include a proposed fee amount and/or fee proposal including a limit in e.g., Gas. In embodiments, Alice, Bob, and/or third parties may view the balances and transaction information based on the information stored in the blockchain, by, e.g., viewing token balances at websites like etherscan.io, to name a few.

In contrast to tokens, a blockchain based digital asset (such as ether) is hard coded into the blockchain (e.g., the Ethereum Blockchain) itself. It is sold and traded as a cryptocurrency, and it also powers the network (e.g., the Ethereum Network) by allowing users to pay for smart contract transaction fees. In some networks, transactions fees may be paid for in digital assets, such as tokens (e.g., Gas) or blockchain based digital assets (e.g., bitcoin). In the Ethereum Network, all computations typically have a cost based on other digital assets, such as Gas.

In embodiments, when tokens are sent to or from a Contract Address, for example, a fee may be charged for that transaction (in this case, a request to the token's contract to update its database) in, e.g., some form of digital asset, such as ether, bitcoin, Gas, to name a few. In embodiments, the message may include a proposed fee amount and/or fee proposal including a limit in digital asset, e.g., ether, bitcoin or Gas. This payment is then collected by a miner who confirms the transaction in a block, which then gets added to the blockchain.

Figures 4, 11A:
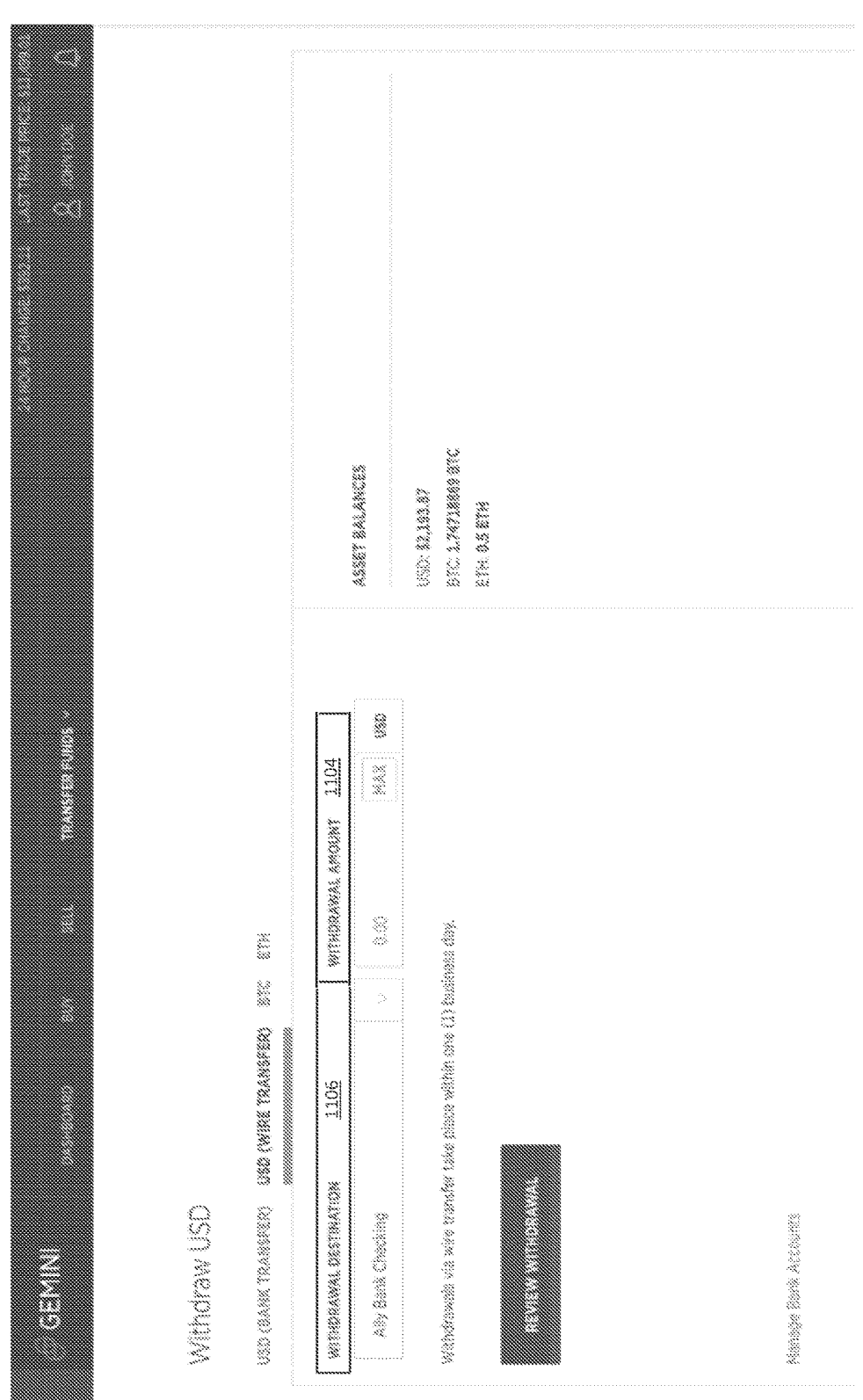
Figures 1, 11B:
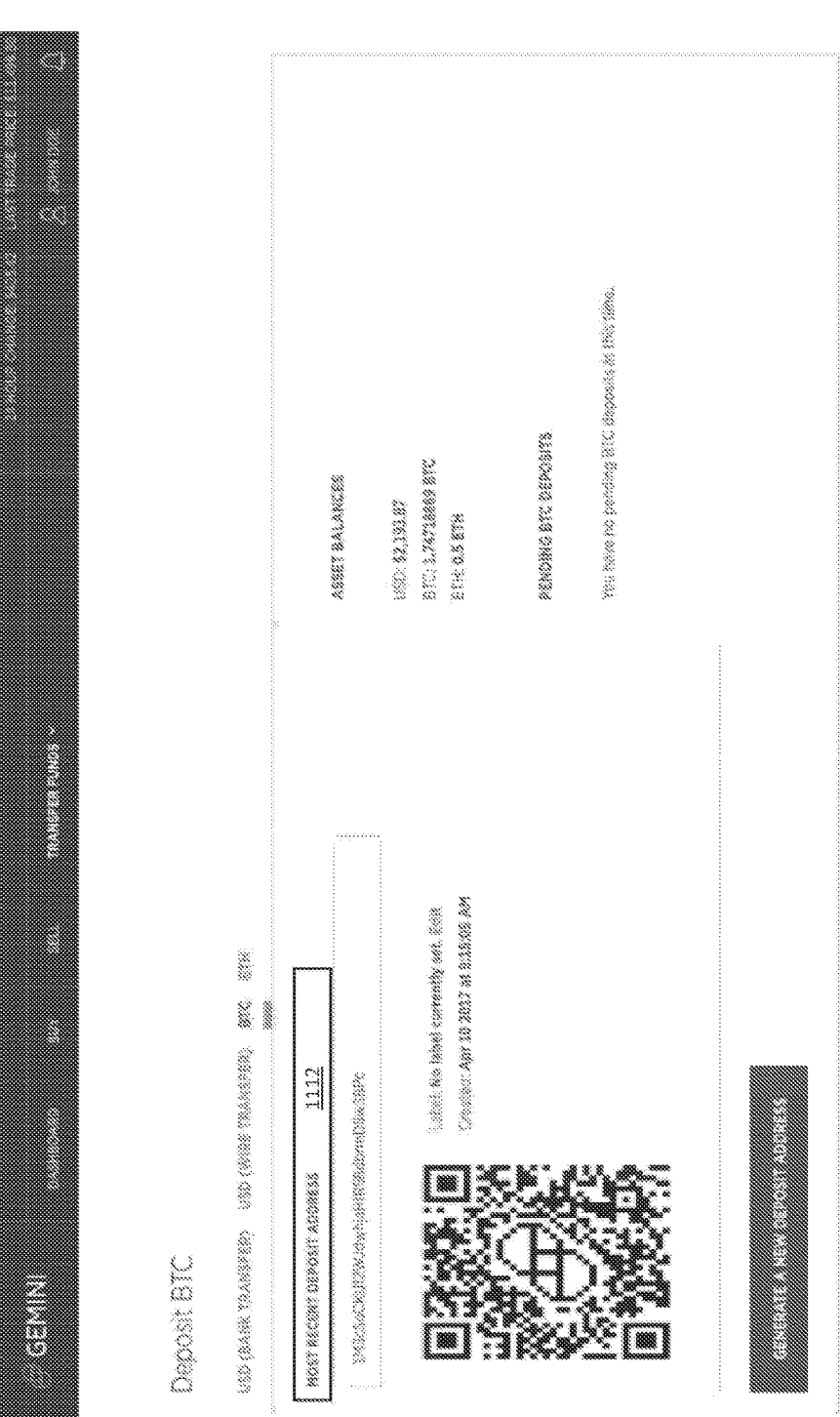
Figures 4, 11B:
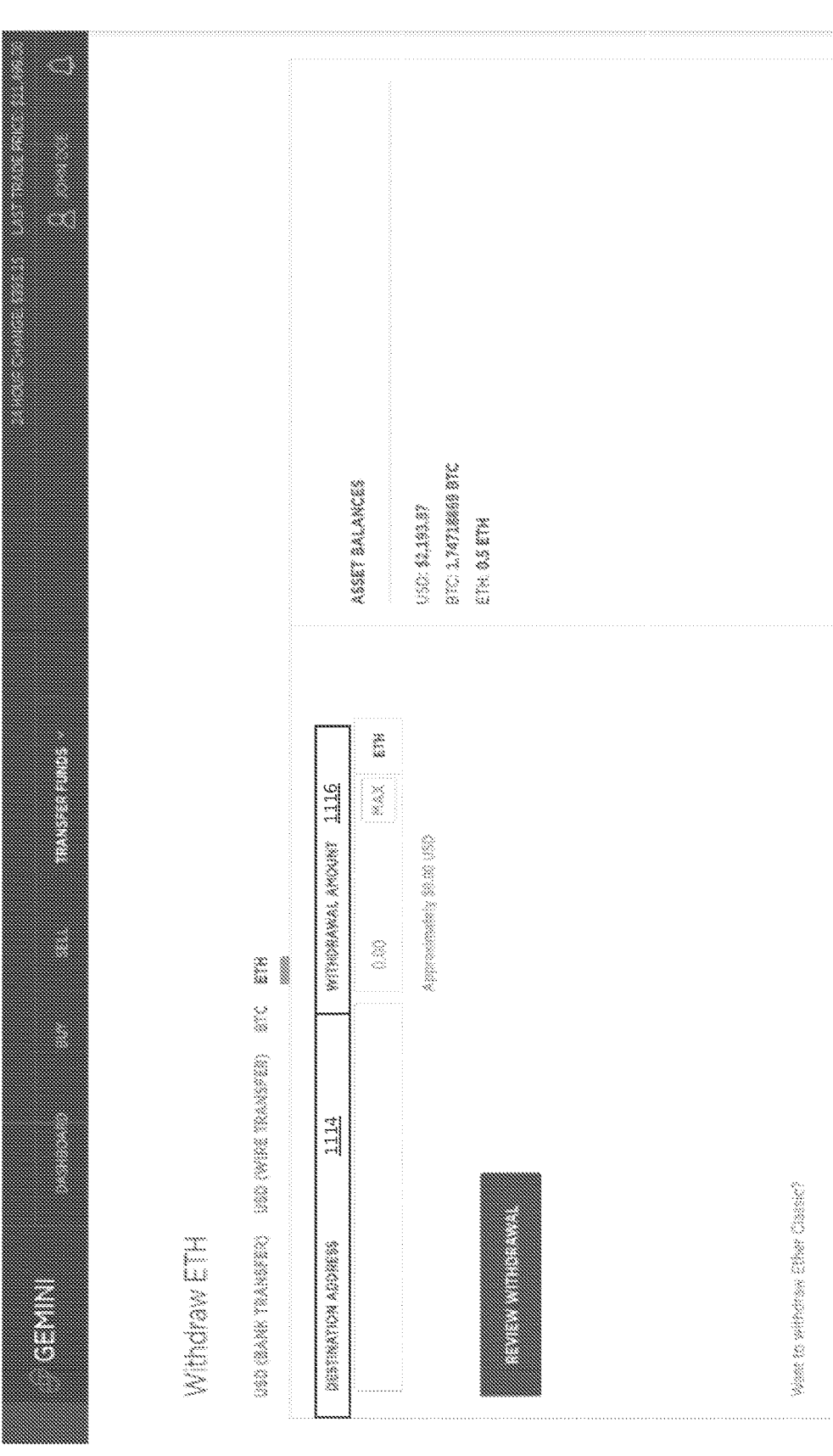
Figures 1, 11C:
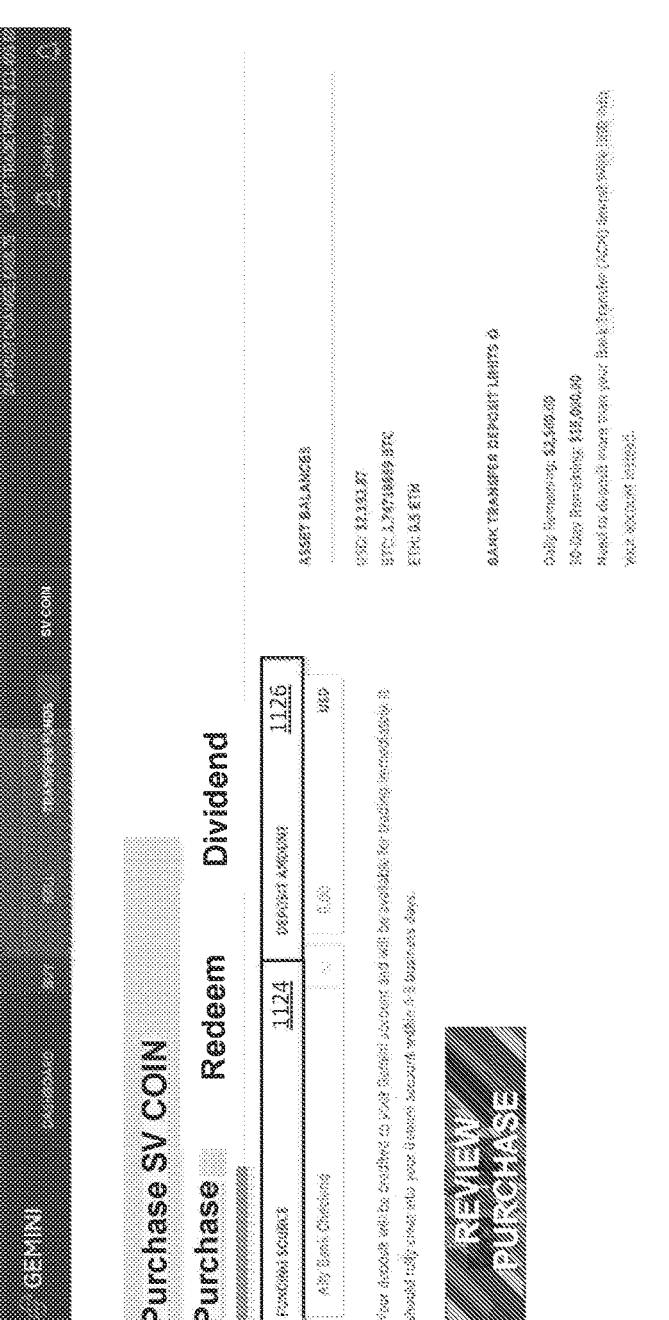
Figures 2, 11C:
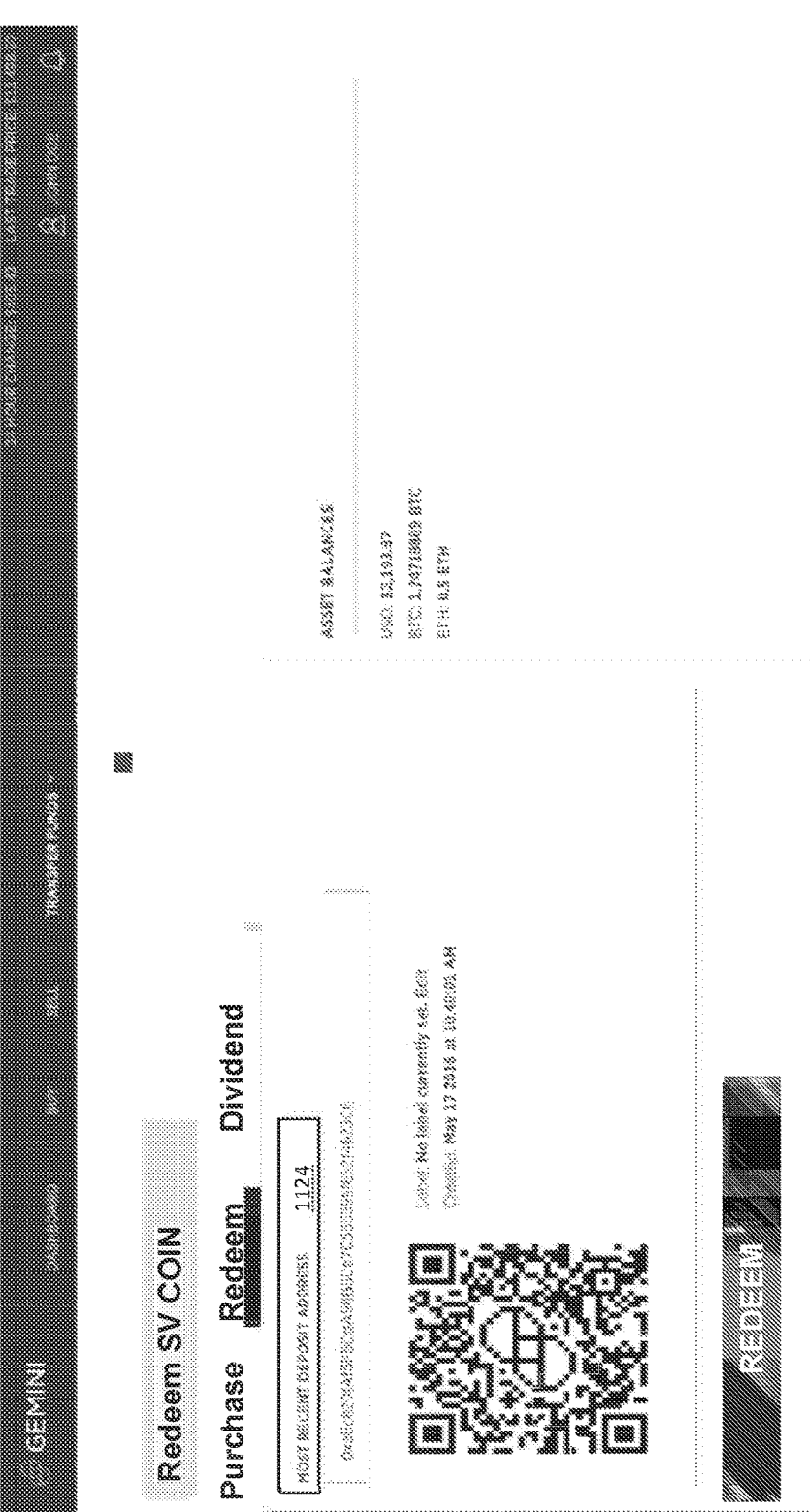

FIG. 2 is an exemplary screen shot of an excerpt of a bitcoin transaction log or transaction ledger 115 showing digital asset account identifiers (e.g., addresses) corresponding to origin and destination accounts for each transaction and amount information for each transaction in accordance with exemplary embodiments of the present invention. The exemplary log 115 includes transaction identifiers, date and/or time information, fee information, digital asset account identifiers for the origin accounts, digital asset account identifiers for the destination accounts, and amounts transferred to and from each account. Such a ledger may also include description information (such as notes describing a transaction, e.g. "rent payment") and/or balance information, to name a few. Other forms of transaction logs can be used consistent with exemplary embodiments of the present invention. In an exemplary embodiment, the description information may be included as a message in a request for a transaction. The description information discussed above thus may also be used to confirm control of over a particular account.

As can be seen in FIG. 2, currency transfers may begin from a single origin and be sent to a single destination or multiple destinations. Similarly, currency may be transferred from multiple origins to one or more destinations.

FIG. 2A illustrates a screenshot showing an exemplary embodiment of a token ledger for a Gas token. This particular screenshot shows a specific example the token ledger for the Gas token provided by etherscan.io. As illustrated the ledger illustrates, in chronological order, a series of transactions identifying the source address 2202 and destination address 2204 along with the quantity of tokens 2206 transferred in each transaction. In embodiments, the Security Token ledger of the present application may be similar to that illustrated in FIG. 2A. In embodiments, as illustrated in FIG. 2A, the Security Token ledger may also include the option to identify all Token holders 2208 as well as options to view token details 2210 and to view the contract details 2012. Similarly, in embodiments, an SVCoin Token ledger of the present application may be similar to that illustrated in FIG. 2A. Digital asset ledgers may be maintained in the form of a database. Such a database may be maintained on a blockchain or off a blockchain as a sidechain which may later be published to the blockchain.

An exemplary embodiment of a digital asset network is illustrated in FIG. 1. In embodiments, other digital math-based assets can be maintained and/or administered by other digital math-based asset networks. Without meaning to limit the invention, a digital math-based asset network will be discussed with reference to a Bitcoin network by example. Of course, other digital asset networks, such as the Ethereum network can be used with embodiments of the present invention. A digital math-based asset network, such as a Bitcoin network, may be an on-line, end-user to end-user network hosting a public transaction ledger 115 and governed by source code 120' comprising cryptologic and/or algorithmic protocols. A digital asset network can comprise a plurality of end users, a . . . N, each of which may access the network using one or more corresponding user device 105a, 105b, . . . 105N. In embodiments, user devices 105a, 105b, . . . 105N may be operatively connected to each other through a data network 125, such as the Internet, a wide area network, a local area network, a telephone network, dedicated access lines, a proprietary network, a satellite network, a wireless network, a mesh network, or through some other form of end-user to end-user interconnection, which may transmit data and/or other information. Any participants in a digital asset network may be connected directly or indirectly, as through the data network 125, through wired, wireless, or other connections.

In the exemplary embodiment, user devices 105a, 105b, . . . 105N can each run a digital asset client 110, e.g., a Bitcoin client, which can comprise digital asset source code 120 and an electronic transaction ledger 115. The source code 120 can be stored in processor readable memory, which may be accessed by and/or run on one or more processors. The electronic transaction ledger 115 can be stored on the same and/or different processor readable memory, which may be accessible by the one or more processors when running the source code 120. In embodiments, the electronic transaction leger 115a (contained on a user device 105a) should correspond with the electronic transaction ledgers 115b . . . 115N (contained on user devices 105b . . . 105N), to the extent that the corresponding user device has accessed the Internet and been updated (e.g., downloaded the latest transactions). Accordingly, the electronic transaction ledger may be a public ledger. Exemplary embodiments of digital asset clients 110 for the Bitcoin network (Bitcoin clients) include Bitcoin-Qt and Bitcoin Wallet, to name a few.

Stable Value Digital Asset Token

In embodiments, a stable value digital asset token, or Stable Value Token ("SVCoin") may operate on a block-chain based network, such as the Ethereum network, a decentralized virtual currency and blockchain network with a programming language that can automatically facilitate, verify, and enforce the terms of a digital contract entered into by human or computer counterparties. In embodiments, the SVCoin may conform with the ERC-223 token standard, making it available for a variety of uses within the Ethereum Network. In embodiments, the SVCoin may conform to the ERC-721 token standard. However, unlike other types of cryptocurrencies currently available on the Ethereum Network or the virtual currency ecosystem generally, the SVCoin will be strictly pegged to a fiat currency, such as the U.S. Dollar, and a custodian, such as a trusted entity like a digital asset exchange or bank, to name a few, will hold an equal value in fiat (e.g., one (1) SVCoin is pegged to be equal to one (1) USD or one hundred (100) SVCoin is pegged to equal one (1) USD, to name a few).

In embodiments, a digital asset exchange, such as a regulated digital asset exchange, like Gemini, may be the sole issuer of the SVCoin. In embodiments, especially in the context of a regulated digital asset exchange, in order to obtain freshly minted SVCoin, customers must first register with the digital asset exchange and create an exchange account to allow access to the digital asset exchange platform. Customers may deposit fiat (e.g., USD) with the digital asset exchange, via, e.g., Fedwire, ACH, Swift, to name a few, into the customers respective exchange account, or convert into fiat some or all of existing digital assets held at the digital asset exchange. SVCoin may be held in the customer's exchange account or may be transferred via the blockchain, such as via the Ethereum Network. In embodiments, the SVCoin issuer may be a digital asset exchange, a bank, a trust or some other trusted entity, to name a few.

In embodiments, regardless of whether the SVCoin is stored in the customer's exchange account or transferred via the blockchain such as the Ethereum Network, the digital exchange will continue to hold sufficient fiat to maintain the total value of SVCoin based on a notional pegged rate (e.g., one USD for every one SVCoin issued). In embodiments, the value of the SVCoin is pegged to the fiat in a fixed proportion, for example 1:1. In embodiments, fiat will be held in a segregated, omnibus bank account at one or more federally insured depository institution. In embodiments, the fiat may be held in other secure and non-volatile financial instruments, such as invested in treasury bills or other liquid, interest bearing financial instruments.

In embodiments, customers wishing to redeem their SVCoin for fiat may do so through the digital asset platform. Customers that have transferred their SVCoin to the blockchain will be able to transfer their SVCoin back to their exchange account, and subsequently redeem them for fiat through the digital exchange platform, such as via Fedwire, ACH or SWIFT to the customer's registered bank account, to name a few. For each fiat redeemed with the digital exchange, a corresponding SVCoin will be removed from circulation. As mentioned above, exemplary embodiments of such transactions are discussed below in connection with the description of FIGS. 11A-1-4, 11B-1-4, and 11C-1-2.

In embodiments, the Stable Value Token may be implemented as a token on the Ethereum blockchain, following the open standard known as ERC20 adopted by the Ethereum community. In embodiments, the Stable Value Token may be a system of smart contracts. In embodiments, the Stable Value Token may be a triplet of smart contracts on the Ethereum blockchain, which may be referred to as 'Proxy', 'Impl', and 'Store'.

In embodiments, the smart contract known as 'Proxy' is the permanent and public face of the Stable Value Token and provides the interface to interact with the token to allow token holders transfer their tokens and view token balances. In embodiments, however, this contract contains neither the code nor the data that comprises the behavior and state of the Stable Value Token.

In embodiments, the 'Proxy' contract delegates to the contract known as 'Impl' authority to execute the logic that governs token transfers, issuance, and other core features. In embodiments, 'Impl' does not directly own the data that is the ledger of the Stable Value Token, the mapping of token holders to their balances, but instead delegates this to the smart contract known as 'Store'.

In embodiments, the arrangement of 'Proxy', 'Impl', and 'Store' provides for future change and flexibility. While 'Proxy' may be the permanent address of the Stable Value Token on the Ethereum blockchain, and 'Store' is the external storage of the token ledger, the 'Impl' contract is designed to be replaced, if need be. Utilizing this architecture to implement the Stable Value Token provides for the following advantages:

1. allows for responding to security incidents and resolving vulnerabilities;
2. allows for extending the system with new features;
3. allows for adding later optimizations to improve the operational efficiency of the token; and
4. In extreme cases and when compelled to do so, allows for pause, block, or reverse token transfers.

In embodiments, each of these three contracts may be a custodian: an actor in the system that has the sole authority to authorize important actions. In embodiments, the custodianship role varies for each of 'Proxy', 'Impl', and 'Store'. In embodiments, the custodian of 'Proxy' can redirect the delegation to the active token implementation, the specific 'Impl' contract. In embodiments, matching this arrangement, the 'Store' contract may only accept updates to its ledger from a single trusted source, the active token implementation, the specific 'Impl' contract. In embodiments, these two custodial actions on 'Proxy' and 'Store' provide the upgrade feature where a new 'Impl' displaces the prior version by the custodian of 'Proxy' redirecting the delegation in 'Proxy'; and a new 'Impl' displaces the prior version by the custodian of 'Store' updating the trusted caller of 'Store'. In embodiments, the custodians of 'Proxy' and 'Store' can also pass custodianship to new custodians.

In embodiments, the primary custodial action on the 'Impl' contract is different. In embodiments, an important aspect of the Stable Value Tokens is governing the increase to the token supply since at all times the system must ensure that there are at least as many U.S. Dollars as there are Stable Value Tokens in circulation. In embodiments, the 'Impl' contract contains the logic to increase the token supply, and the custodian of 'Impl' has the sole authority to invoke it. In embodiments, custodianship can also be passed.

In embodiments, an auxiliary contract is a contract to fulfill the custodian role, which we will refer to here as 'Custodian'. In embodiments, this contract is designed around several security principles:

1. Dual Control: actions by the 'Custodian' contract are initially locked, and pending actions will only proceed once two out of a set of designated signers approve the action. (Approval is a digital signature linked to the action instructions, e.g. the amount and destination of new tokens.)
2. Offline Control: the 'Custodian' contract is designed with the expectation that the set of designated signers are keys managed by offline ("air gapped") computer systems.
3. Time Locks: actions by the 'Custodian' contract are locked not only pending approval from two signers, but also require the passage of a minimum period of time before they can be executed. This enables the effective use of intrusion detection systems and a window of opportunity to respond to security breaches.
4. Revocation: pending actions can be revoked, thus erroneous or malicious actions can be nullified while they are still pending.

This provides strong security control on custodianship, which is appropriate for the critical and infrequent system actions of replacing the 'Impl' contract ("the upgrade feature") and passing custodianship. In embodiments, however, for the action of increasing the token supply, an action expected to occur frequently, using 'Custodian' as the custodian of 'Impl' introduces an undue operational burden.

In embodiments, a second auxiliary contract, is referred to as 'PrintLimiter'. In embodiments, the purpose of the 'PrintLimiter' smart contract is to govern the increases to the supply of Stable Value Tokens, specifically by a hybrid of online and offline control. While 'Custodian' is the custodian of the contracts 'Proxy' and 'Store', the 'PrintLimiter' contract is the custodian of 'Impl', and in turn, 'Custodian' is the custodian of 'PrintLimiter'. In embodiments, this doubly-layered custodianship relationship still reserves ultimate control to 'Custodian', however, the 'PrintLimiter' contract grants limited permission to increase the token supply ("print" new tokens) to a key in online control (an automated, networked computer system), which we will refer to as 'printer'. In embodiments, the 'printer' key can increase the token supply in response to user demand to withdraw U.S. dollars as Stable Value Tokens, but only up until a ceiling. In embodiments, further expansion of the supply is disallowed by 'PrintLimiter' once the ceiling is reached. In embodiments, increasing the ceiling is an action reserved for the custodian, and the custodian of 'PrintLimiter' is 'Custodian.' In embodiments, the 'printer' can reduce the ceiling thus reducing its own grant. In embodiments, offline control can increase the grant to online control;

online control can decrease its own grant. In embodiments, the 'Print Limiter' smart contract may include instructions requiring authorization of multiple keys to increase the supply of Stable Value Tokens. In embodiments, the multiple keys may require at least two signers. This could include using a M of N model, where M is at least 2 and N is equal to or greater than M (e.g., 2 or more, when M is 2). Thus, in embodiments, multiple keys may include a set number of keys of a set number of possible keys, for example, two keys of a possible three keys. In embodiments, the multiple keys may require all keys of possible keys, for example, three keys of a possible three keys.

In embodiments, as noted above, multiple signatures may be required for certain transactions such as those requiring intervention of the Custodian 1350. In embodiments, as noted above, changing the implementation pointer from ERC20Proxy 1310 which is currently set at S1312 (impl) to point to ERC20Impl 1320 (Version 1), requires resetting S1312B "impl" to point to ERC20Impl 1320A (version 2). In embodiments, a request is made to ERC20Proxy to change its instance of ERC20Impl. When the request is made, a unique lockId is generated. In embodiments, the Custodian contract 1350 for ERC20 Proxy 1310 calls requestUnlock and passes as arguments the lockId generated for the change request, and the function in ERC20Proxy 1310 the Custodian 1350 needs to call to confirm the change request. This generates a request, which is a unique identifier for this unlock request.

In embodiments, to complete the unlocking of Custodian and therefore propagate the change to ERC20Proxy 1310, the digital asset system operated by the token issuer uses its off-line key storage infrastructure to sign the request with the previously approved designated key sets. This may require the use of two or more key sets.

In embodiments, those signatures are passed into the Custodian's completeUnlock function along with the initial request. Once the request is validated against the signatures, completeUnlock parses the content of the request and issues the command. In this exemplary case, it calls ERC20Proxy's confirmImplChange using the lockId generated in the initial ERC20Impl change request.

In embodiments, the arrangement discussed herein achieves a hybrid of online and offline control over the supply of Stable Value Tokens. In embodiments, tokens can be issued in an efficient and timely manner, while the risk of inflation of the supply of Stable Value Tokens without backing U.S. Dollars is bounded. In embodiments, pending actions may be revoked, allowing for the nullification of erroneous or malicious actions before being executed.

Blockchain Based Financial Instrument

In embodiments, a digital asset in the form of a token ("Security Token") may be issued to represent inventory, equity interests in a venture, real estate, rights in intellectual property such music, videos, pictures, to name a few. When used as a security, appropriate filings with a regulatory authority may be necessary to comply with local law. In the case of a security, investors may exchange fiat or other digital assets (such as bitcoin or ether, to name a few) in exchange for Security Tokens. Typically, Security Tokens may issue using a smart contract written on another digital asset (such as ether or bitcoin, to name a few), and tracked in a separate database stored in a distributed peer to peer network in the form of a blockchain. In an example, the blockchain is the Ethereum Blockchain and includes all Security Tokens, the respective address associated therewith, wherein maintenance of the blockchain is controlled by contract instructions stored in the form of a smart contract at the Contract Address. In embodiments, the Secure Token database maintained on the blockchain may be viewed via etherscan.io. In embodiments, the Security Token ledger may be maintained as a sidechain in a separate database off chain and published periodically or aperiodically to the blockchain. Each Security Token may also be associated with a specific digital asset address on the network associated with the underlying digital asset (e.g., the Ethereum Network when ether is the underlying digital asset, or the Bitcoin Network, when bitcoin is the digital asset, to name a few). Generally, the same blockchain will be used for the SVCoin and the Security Token.

Digital Asset Exchange

In embodiments, one form of trusted entity that may be an issuer of SVCoin or an agent of the issuer is a digital asset exchange or bank. In embodiments, the trusted entity may maintain an SVCoin database on a blockchain. In embodiments, the trusted entity may maintain the SVCoin database off chain as a sidechain which may be periodically or aperiodically published to a blockchain as discussed elsewhere.

In some embodiments, the trusted entity may be a digital asset exchange. A digital asset exchange, such as a digital math-based asset exchange, may allow users to sell digital assets in exchange for any other digital assets or fiat currency and/or may allow users to sell fiat currency in exchange for any digital assets. Accordingly, an exchange may allow users to buy digital assets in exchange for other digital assets or fiat currency and/or to buy fiat currency in exchange for digital assets. In embodiments, a digital asset exchange may integrate with a foreign exchange market or platform. A digital asset exchange may be configured as a centralized exchange or a decentralized exchange, as discussed herein.

In embodiments, the issuer of the SVCoin may be a digital asset exchange, a bank, a trust, or other trusted entity. In the context where a digital asset exchange may act as an issuer for SVCoin, or as an agent of the issuer, a digital asset exchange computer system may maintain a ledger as one or more databases associated with the SVCoin. Such a database may include an electronic log of all transactions, including the source wallet, the destination wallet, the timestamp of the transaction, the amount of the transaction (e.g., the number of SVCoin), and/or the balance in each wallet before and/or after the transaction. In embodiments, the database may include a list of wallet addresses and balances in each wallet of the SV Coin. In embodiments, the issuer may maintain the database by using a smart contract in association with a Contract Digital Address as part of a blockchain network, such as the Ethereum Network. In embodiments, the ledger may be maintained in a database as a sidechain which is periodically, or aperiodically, published to a blockchain such as the Ethereum blockchain. In embodiments, the ledger may be maintained directly on the blockchain.

Figure 3:
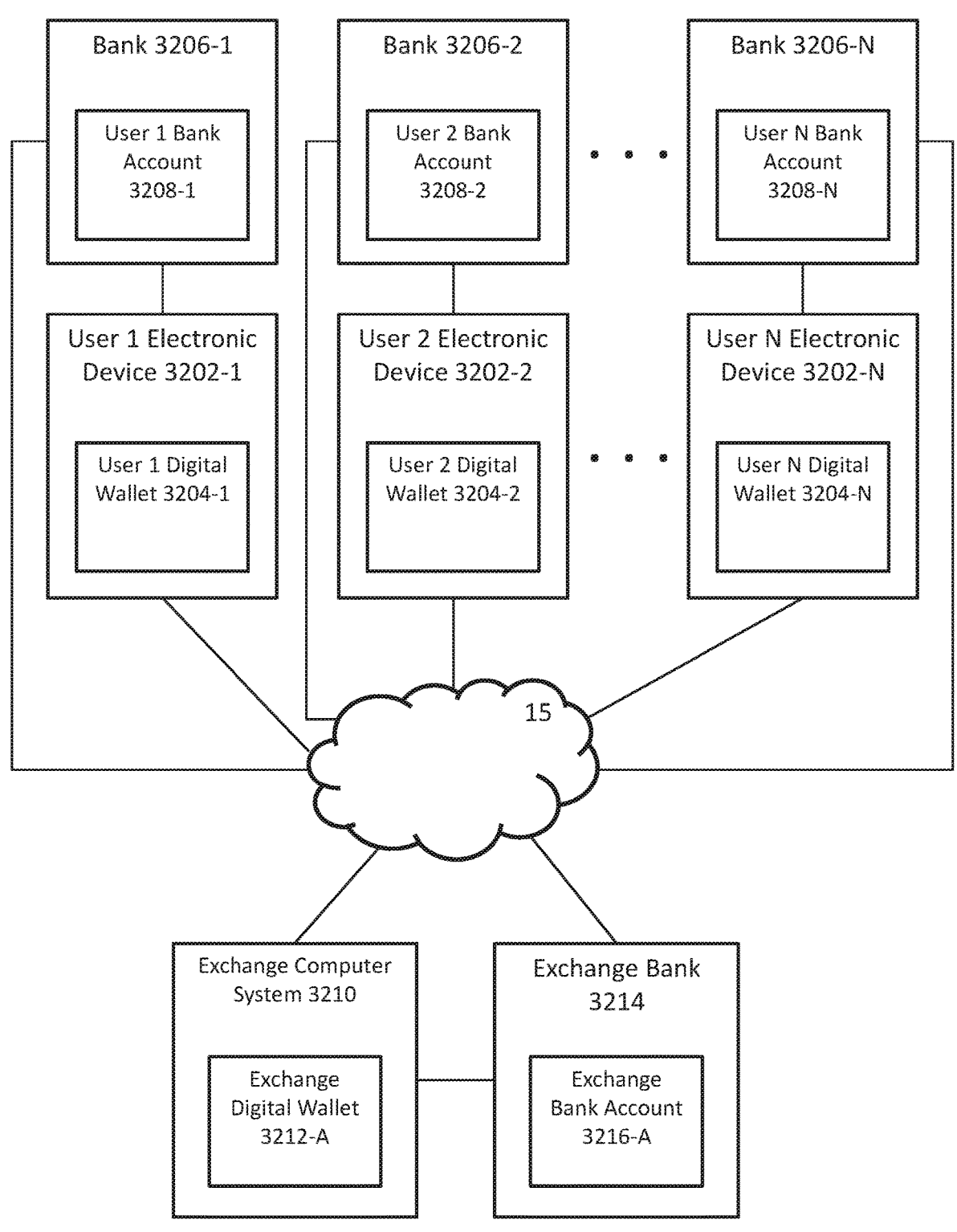
FIG. 3 is an exemplary exchange agent interface in accordance with exemplary embodiments of the present invention.

FIG. 3 is a schematic diagram illustrating various potential participants in a digital asset exchange, in exemplary embodiments. The participants may be connected directly and/or indirectly, such as through a data network 15, as discussed herein. Users of a digital asset exchange may be customers of the exchange, such as digital asset buyers and/or digital asset sellers. Digital asset buyers may pay fiat (e.g., USD, Euro, Yen, to name a few) in exchange for digital assets (e.g., bitcoin, ether, litecoin, dogecoin, to name a few). Digital asset sellers may exchange digital assets (e.g., bitcoin, ether, litecoin, dogecoin, to name a few) for fiat (e.g., USD, Euro, Yen, to name a few). In embodiments, instead of fiat, other forms of digital assets may also be used.

In embodiments, users may connect to the exchange through one or more user electronic devices 3202 (e.g., 3202-1, 3202-2, . . . , 3202-N), such as computers, laptops, tablet computers, televisions, mobile phones, smartphones, and/or PDAs, to name a few. A user electronic device 3202 may access, connect to, and/or otherwise run one or more user digital wallets 3204. In embodiments, buyers and/or sellers may access the exchange using their own electronic devices and/or through a digital asset kiosk. A digital asset enabled kiosk can receive cash, including notes, coins or other legal tender, (of one or more fiat currencies) from a buyer to use in buying a quantity of digital assets. A digital asset kiosk may dispense cash (of one or more fiat currencies) to a seller of digital assets. In embodiments, a digital asset kiosk may receive funds from and/or dispense funds to a card, such as a prepaid or reloadable card, digital asset address associated with a digital wallet, or electronic account. In embodiments, a digital wallet may be stored on a user electronic device, such as a mobile electronic device, or other computing device.

Users may also have user bank accounts 3208 held at one or more banks 3206. In embodiments, users may be able to access their bank accounts from a user electronic device 3202 and/or from a digital wallet 3204 or digital address associated therewith.

A digital asset exchange computer system 3210 can include software running on one or more processors, as discussed herein, as well as computer-readable memory comprising one or more database. A digital asset exchange can include one or more exchange digital wallets 3212, e.g., digital wallet 3212-A. Exchange digital wallets may be used to store digital assets in one or more denominations from one or more parties to a transaction. In embodiments, exchange digital wallets may store digital assets owned by the exchange, which may be used where an exchange is a counter-party to an exchange transaction, which can allow exchange transactions to occur even when a buyer and a seller are not otherwise both available and in agreement on transaction terms.

A digital asset exchange may have one or more bank accounts, e.g., bank account 3216-A, held at one or more banks 3214, such as exchange banks or exchange partner banks, which are banks associated with and/or in partnership with the exchange. In embodiments, exchanges may access other repositories for fiat currency. An exchange bank account may be a pass-through account that receives fiat currency deposits from a digital asset buyer and transfers the fiat currency to a digital asset seller. The exchange bank account may hold money in escrow while an exchange transaction is pending. For example, the exchange bank account may hold a digital asset buyer's fiat currency until a digital asset seller transfers digital assets to a buyer, to an exchange, or to an authorized third party. Upon receipt by the appropriate recipient of the requisite amount of digital assets, the exchange may authorize the release of the fiat currency to the digital asset seller. In embodiments, an exchange may hold, e.g., as custodian, fiat in bank accounts and digital assets in digital wallets at associated digital asset addresses. In embodiments, instead of using bank accounts, other stable investment instruments such as money market mutual funds, treasury bills, certificates of deposits, low risk bonds, to name a few, may be used.

Figure 4A:
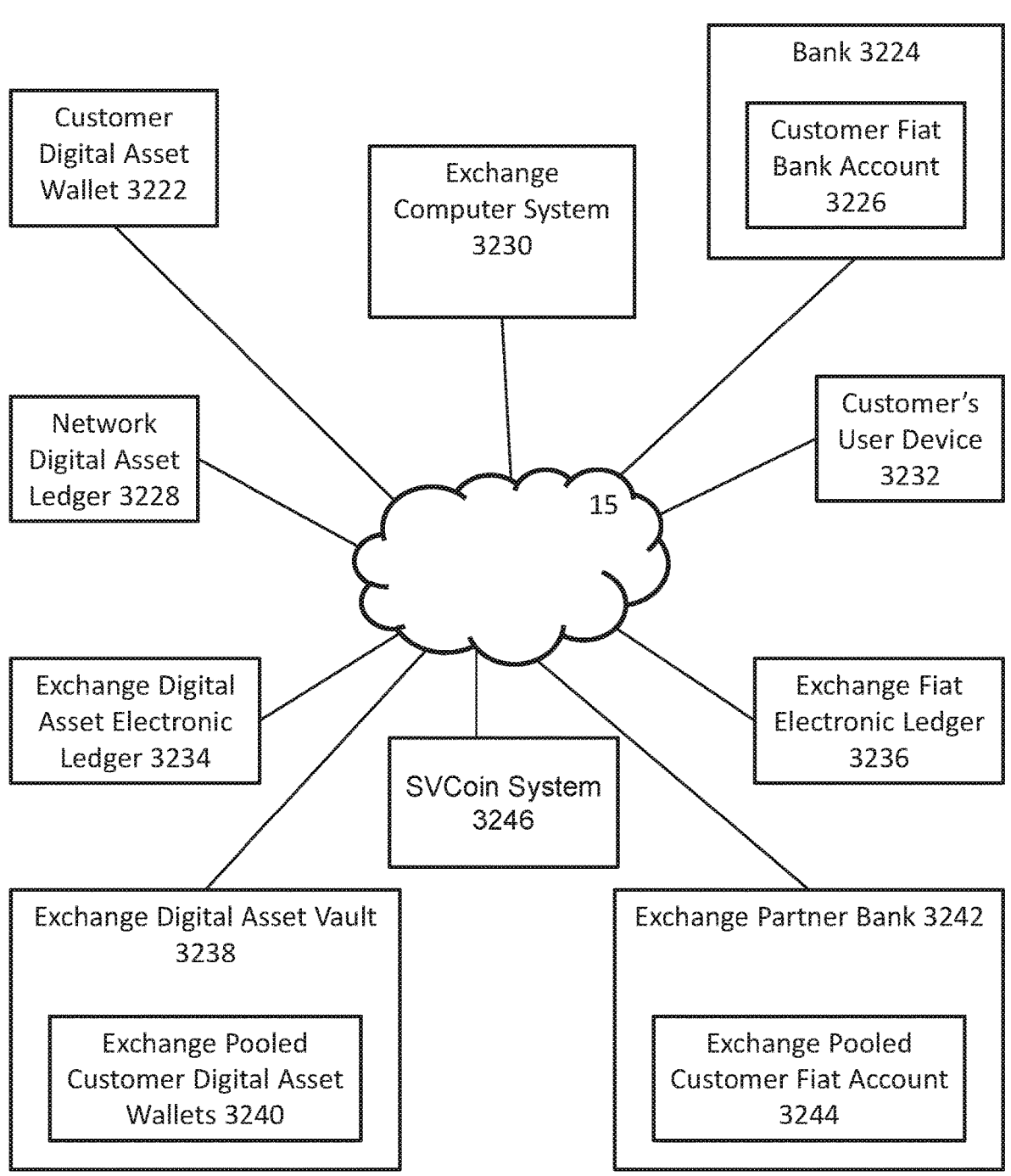
FIGS. 4A-B are exemplary schematic diagrams illustrating participants in a digital asset exchange in accordance with exemplary embodiments of the present invention.
Figure 4B:
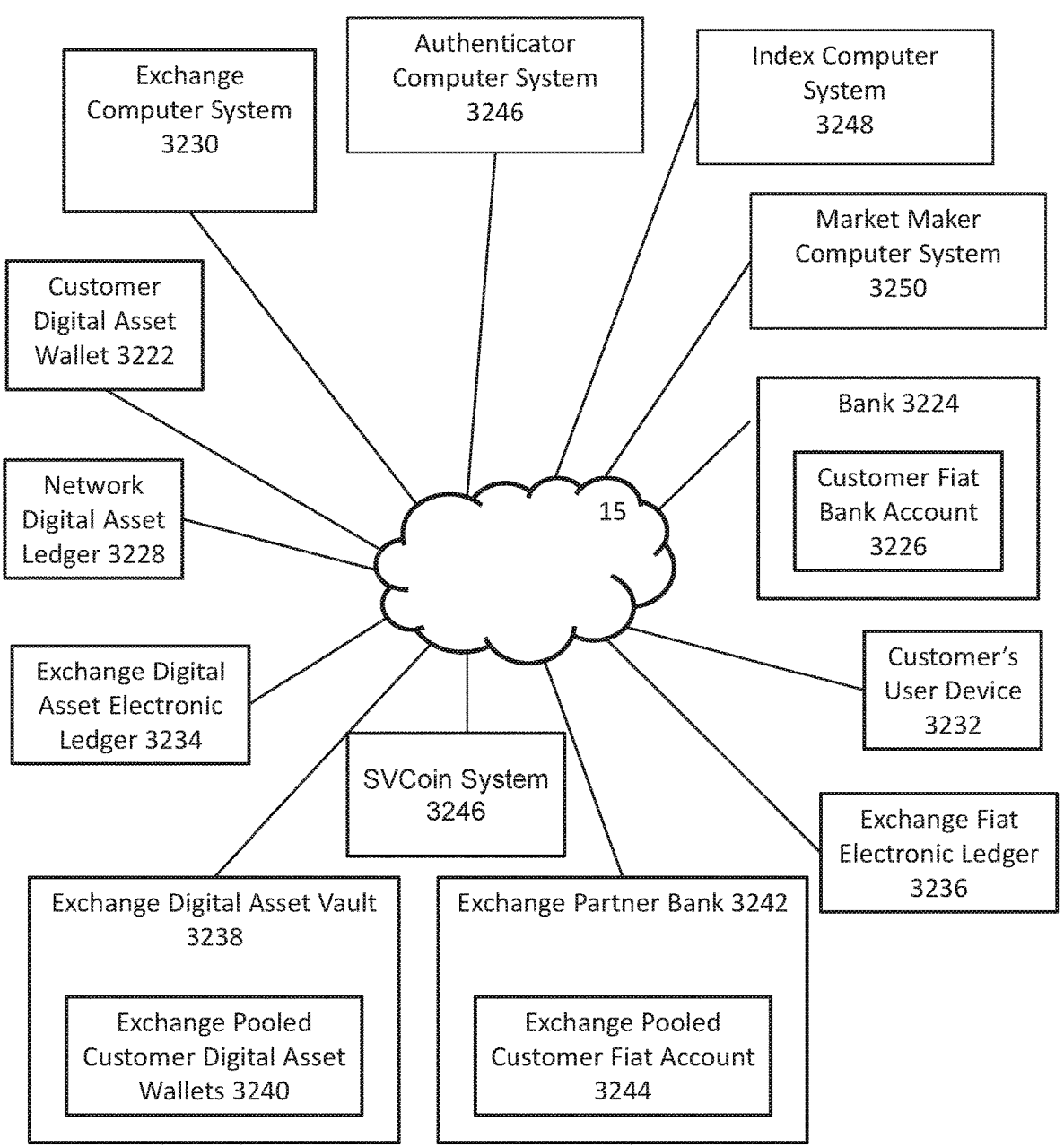

FIG. 4A is another schematic diagram illustrating entities associated with a digital asset exchange in an exemplary embodiment of the present invention. Each entity may operate one or more computer systems. Computer systems may be connected directly or indirectly, such as through a data network. Entities associated with a digital asset exchange can include the exchange, an exchange computer system 3230, customer digital asset wallets at associated digital asset addresses 3222 (e.g., bitcoin wallets, ether wallets, to name a few), customer bank(s) 3224 having a customer fiat bank account(s) 3226, a digital asset network ledger 3228 (e.g., the Bitcoin blockchain, the Ethereum blockchain, to name a few), a digital asset network (e.g., the Bitcoin Network, the Ethereum Network, to name a few), one or more exchange customers using one or more customer user devices 3232, an exchange digital asset electronic ledger 3234, one or more exchange digital asset vaults 3238, an exchange fiat electronic ledger 3236, and one or more exchange partner banks 3242, which can have exchange pooled customer fiat accounts 3244. The exchange digital asset vaults 3238 can store a plurality of digital asset wallets, which may be pooled exchange customer wallets 3240 with associated digital asset addresses. In embodiments, the exchange may have a single partner bank 3242 with a pooled exchange customer fiat account 3244. Such an account may be associated with insurance protection. In embodiments, the exchange may have a SVCoin system 3246. Such a system may allow users to purchase SVCoin tokens using fiat currency and/or digital assets and/or to redeem digital assets in the form of SVCoin tokens, and/or to redeem SVCoin tokens for fiat currency. SVCoin system 3246 may also be used to generate new SVCoin tokens, and cancel redeem SVCoin tokens. SVCoin system 3246 is operatively connected to an SVCoin database that maintains a log of SVCoin tokens. In embodiments, the SVCoin database may be maintained as part of the digital asset network (e.g., the Bitcoin Network, the Ethereum Network, to name a few).

The exchange may employ an electronic ledger system to track customer digital assets and/or customer fiat holdings. Such a system may allow rapid electronic transactions among exchange customers and/or between exchange customers and the exchange itself using its own digital asset and fiat holdings or those of its sponsor or owner. In embodiments, the electronic ledger system may facilitate rapid computer-based automated trading, which may comprise use by one or more computer systems of a trading API provided by the exchange. The electronic ledger system may also be used in conjunction with cold storage digital asset security systems by the exchange. Fiat (e.g., USD) and digital assets (e.g., bitcoin or ether) can be electronically credited and/or electronically debited from respective (e.g., fiat and digital asset) electronic ledgers. Clearing of transactions may be recorded nearly instantaneously on the electronic ledgers. Deposits of fiat with the exchange and withdrawals from the exchange may be recorded on the electronic fiat ledger, while deposits and withdrawals of digital assets may be recorded on the electronic digital asset ledger. Electronic ledgers may be maintained using one or more computers operated by the exchange, its sponsor and/or agent, and stored on non-transitory computer-readable memory operatively connected to such one or more computers. In embodiments, electronic ledgers can be in the form of a database.

A digital asset exchange computer system can include one or more software modules programmed with computer-readable electronic instructions to perform one or more operations associated with the exchange. Each module can be stored on non-transitory computer-readable memory operatively connected to such one or more computers. An exchange may have a user on-boarding module to register users with the exchange and/or create accounts for new and/or existing exchange users. The exchange may employ systems and methods to ensure that the identity of exchange customers is verified and/or the destination of fiat currency and/or digital assets is known.

Figure 5A:
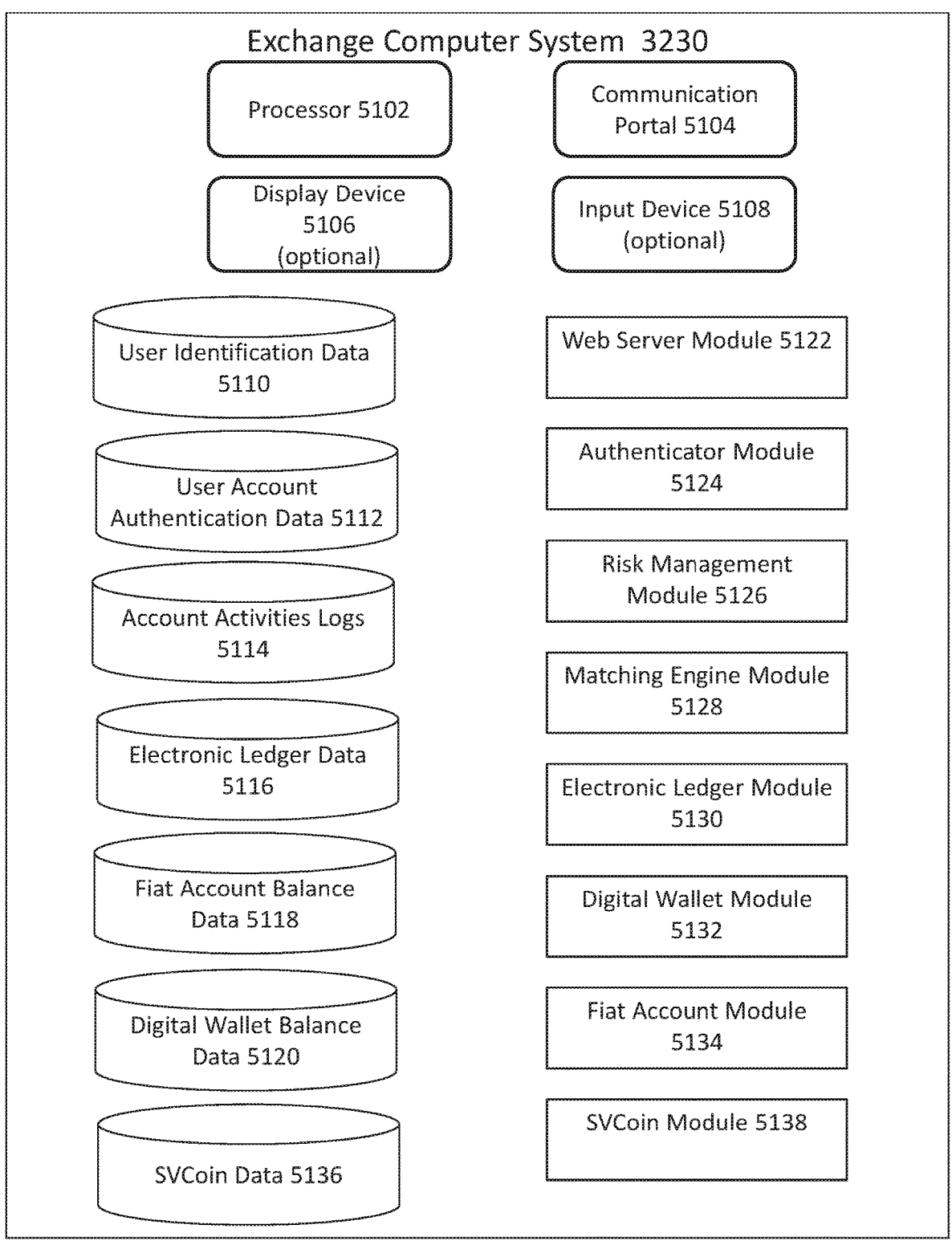
FIGS. 5A-B are schematic diagrams of exemplary exchange computer systems in accordance with exemplary embodiments of the present invention.
Figure 5B:
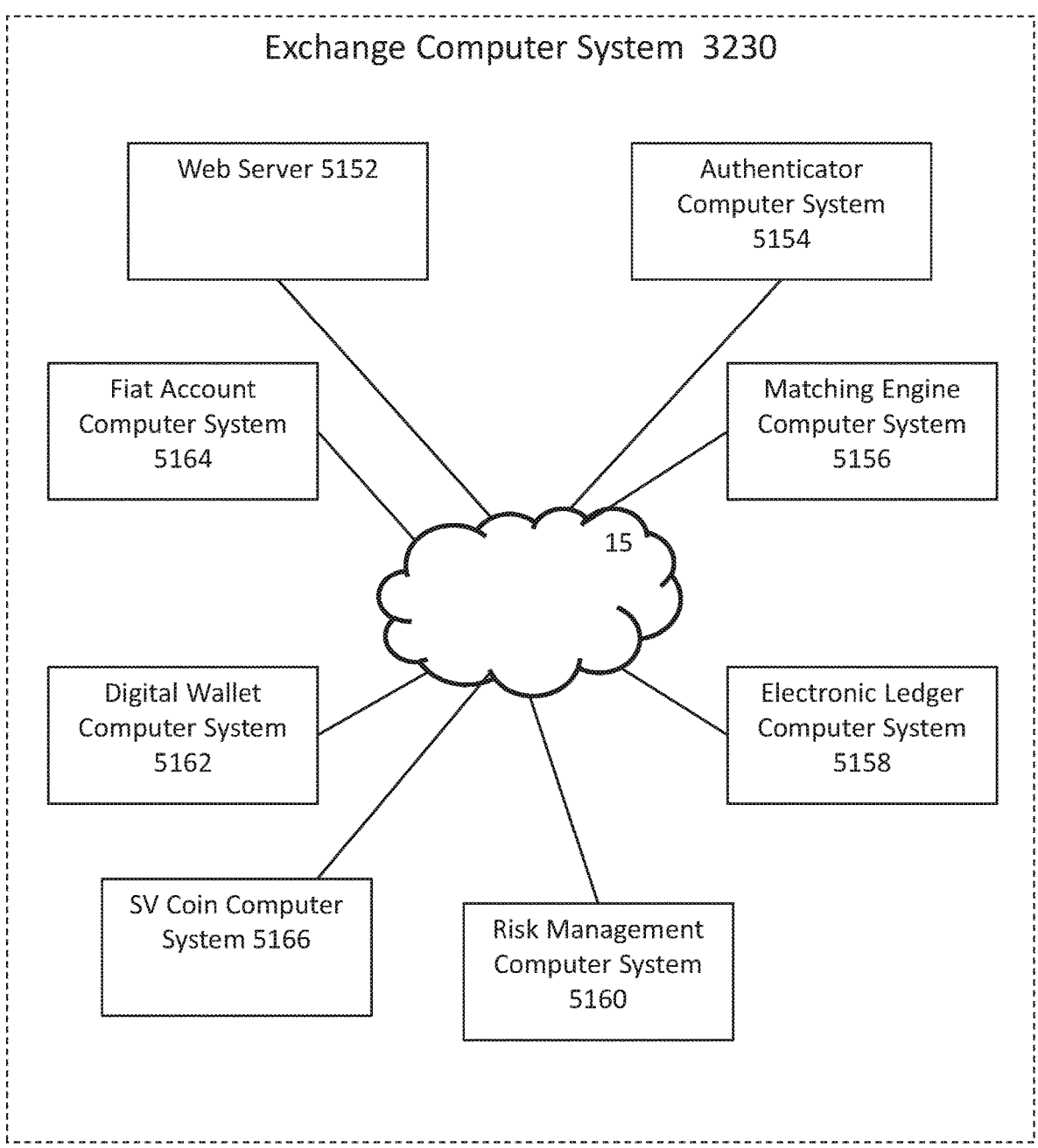

FIGS. 5A-B are schematic diagrams of exemplary exchange computer systems in accordance with exemplary embodiments of the present invention. FIG. 5A shows hardware, data, and software modules, which may run on one or more computers. FIG. 5B shows an exemplary distributed architecture for the exchange computer system.

As shown in FIG. 5A, an exchange computer system 3230 can include one or more processors 5102, a communication portal 5104 (e.g., for sending and/or receiving data), a display device 5106, and/or an input device 5108. The exchange computer system 3230 can also include non-transitory computer-readable memory with one or more database and data stored thereon. Data can include user identification data 5110 (e.g. know your customer data obtained during the user onboarding process), user account authentication data 5112 (e.g., login credentials, multi-factor authentication data, and/or anti-money laundering verifications), account activities logs 5114, electronic ledger data 5116, fiat account balance data 5118, digital wallet balance data 5120, and/or SVCoin data 5136, to name a few. One or more software modules may be stored in the memory and running or configured to run on the one or more processors. Such modules can include a web server module 5122, authenticator module 5124, risk management module 5126, matching engine module 5128, electronic ledger module 5130, digital wallet module 5132, fiat account module 5134 and/or SVCoin module 5138, to name a few. The processes performed by such modules, the data produced thereby and/or the data accessed thereby are described herein.

A matching engine 5128 may apply a continuous order book price time priority matching algorithm. In embodiments, matching engine 5128 may apply option points at low and/or high frequencies. In embodiments, other matching engines may be included, such as a block trade matching engine (not shown), an auction matching engine (not shown), to name a few.

As shown in FIG. 5B an exchange computer system can include a web server 5152, an authenticator computer system 5154, a matching engine computer system 5156, an electronic ledger computer system 5158, a risk management computer system 5160, a digital wallet computer system 5162, a fiat account computer system 5164, and/or a SV Coin Computer System 5166. The exchange computer system 3230 may communicate with one or more external computer systems, such as bank computer systems, index computer systems, user computer system (e.g., institutional or individual users), and/or user electronic devices, to name a few. Each computer system may comprise one or more computers and/or one or more processors, a communication portal, display devices, and/or input devices, to name a few.

A web server 5152 may provide display data to one or more user device 102, e.g., user device 102-1. Display data may comprise website content (e.g., HTML, JavaScript, and/or other data from which a user device can generate and/or render one or more webpages) and/or application content, such as mobile application content, to be used in generating or providing display content for one or more software application. In embodiments, the web server 5152 may authenticate a user account by verifying a received username and password combination. In embodiments, other authentication processes may also be used.

An authenticator computer system 5154 may perform authentication of user login credentials, multi-factor authentication, and/or compare users against databases, such as government databases, for compliance with anti-money laundering laws and/or regulations, to name a few.

A matching engine computer system 5156 may match buy (purchase) orders with sell orders, receive orders, and/or update an electronic order book, to name a few.

An electronic ledger computer system 5158 may track and/or store account balances, update account balances, compute account balances, report account balances, and/or place holds on account funds while transactions are in progress (e.g., set an account hold indicator), to name a few.

A risk management computer system 5160 may perform processes to detect fraudulent transactions and/or security breaches, to name a few. Such a sub-system may monitor access data describing access of the exchange (e.g., IP addresses, accounts, times of access, to name a few), monitor trading data, analyze trading data, determine patterns, determine anomalies, and/or determine violations of pre-programmed security rules, to name a few.

A digital wallet computer system 5162 may generate digital wallets with associated digital asset addresses, generate instructions for digital wallet key storage and/or retrieval, allocate digital assets among digital wallets, track digital assets, store digital asset, and/or transfer digital assets, to name a few.

The digital wallets may include both hot wallets and cold wallets. In embodiments, sufficient digital assets will be stored in one or more hot wallets to allow for liquidity. The amount of digital assets stored in the one or more hot wallets may be determined based on historical averages of trading on the exchange. In embodiments, remaining digital assets will preferably be held in cold wallets. A more detailed discussion of hot wallets and cold wallets is presented in U.S. Pat. No. 9,892,460 issued Feb. 13, 2018 entitled SYSTEMS, METHODS, AND PROGRAM PRODUCTS FOR OPERATING EXCHANGE TRADED PRODUCTS HOLDING DIGITAL MATH-BASED ASSETS, the entire content of which is incorporated herein.

A fiat account computer system 5164 may manage omnibus or pooled accounts for holding customer funds. The fiat account computer system may process receipts of funds, e.g., from a bank, via a wire transfer, via a credit card or ACH transfer, and/or via check, to name a few. Accordingly, the fiat account computer system may communicate with one or more external systems, such as a bank computer system. In embodiments, the fiat account computer system may process withdrawals. In embodiments, the omnibus or pooled accounts for holding fiat are maintained in a bank or other institution such that these accounts are eligible for insurance under the Federal Deposit Insurance Corporation (FDIC). In order to qualify for FDIC insurance, an account must typically be associated with specific user identification information, e.g., a user name, address and social security number, by way of example, to name a few. Accordingly, in embodiments, fiat accounts may be associated with individuals who are positively identified. In such embodiments, SVCoin holders may be required to provide the identification information discussed above prior to purchasing SVCoins. Further, the SVCoin issuer will maintain a database including this information for each SVCoin holder. In embodiments, the fiat may be invested in federally insured interest bearing bank accounts, treasure bills, bonds (such as high quality bonds), CD's, money market mutual funds, Repos or other financial instruments which offer a return and provide sufficient stability, to name a few.

A SVCoin computer system 5166 may manage purchases of SVCoin tokens using fiat currency and/or digital assets and/or redemption of digital assets in the form of SVCoin tokens, and/or redemption of SVCoin tokens for fiat currency. SVCoin computer system 5166 may also generate new SVCoin tokens, and cancel redeem SVCoin tokens. SVCoin computer system 5166 is operatively connected to an SVCoin database 5136 that maintains a log of SVCoin tokens. In embodiments, the SVCoin database 5136 is maintained by the use of smart contract code associated with a Contract Address on the digital asset blockchain though the digital asset network.

Figure 6:
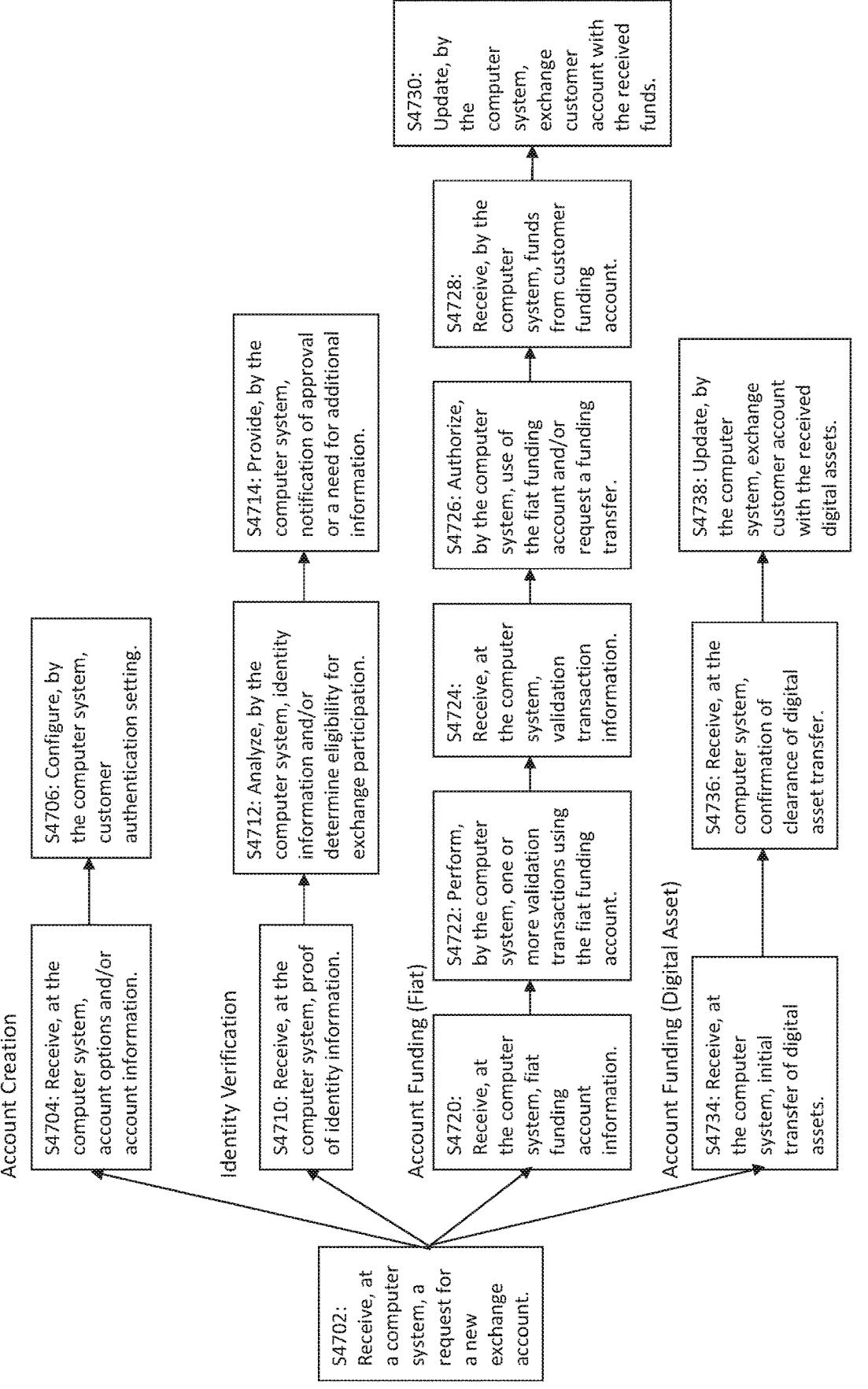
FIG. 6 is an exemplary flow chart for processes for digital asset exchange account creation and account funding in accordance with exemplary embodiments of the present invention.

Referring to the fiat account funding process shown in FIG. 6, in a step S4720 the exchange computer system may receive fiat funding account information. Such information can include a bank account number (e.g., a routing number), a bank name, an account type, and/or an account holder's name, to name a few. In a step S4722, the exchange computer system may perform one or more validation transactions using the fiat funding account. Such transactions may comprise small deposits into the fiat funding account. In a step S4724, the exchange computer system may receive validation transaction information, which may include a transaction amount, date, and/or time. In a step S4726, the exchange computer system may electronically authorize use of the fiat funding account and/or request a funding transfer. Accordingly, the exchange computer system may provide an electronic notification, e.g., via email, via a website, and/or via a mobile phone application (e.g., via a push notification), to name a few, that the fiat funding account is authorized for use with the exchange. A customer may electronically initiate a transaction, e.g., through an exchange-provided user interface or user electronic device operatively connected to the exchange or an application programming interface (API), to name a few, to transfer funds to the exchange. In a step S4728, the exchange computer system may receive an electronic notification indicating that funds were received, e.g., in an exchange bank account at a partner bank, from the customer fiat funding account. In a step S4730, the exchange computer system can update an exchange customer account with the received funds. Updating an exchange customer account can comprise electronically updating a fiat electronic ledger stored one or more computer readable media operatively connected to the exchange computer system to reflect the received funds and/or updating a display of the amount of funds in the account or a data ledger on a user computer device or on a printed and/or digitally transmitted receipt provided to the user and/or a user device.

Referring to the digital asset account funding process shown in FIG. 6, in a step S4734, the exchange computer system can receive an initial transfer of digital assets. In a step S4736, the exchange computer system can receive a confirmation of clearance of the digital asset transfer. In a step S4738, the exchange computer system can update an exchange customer account with the received digital assets. Updating an exchange customer account can include making an electronic entry in an exchange digital asset electronic ledger and/or providing a notification that the digital assets are received.

Figure 7A:
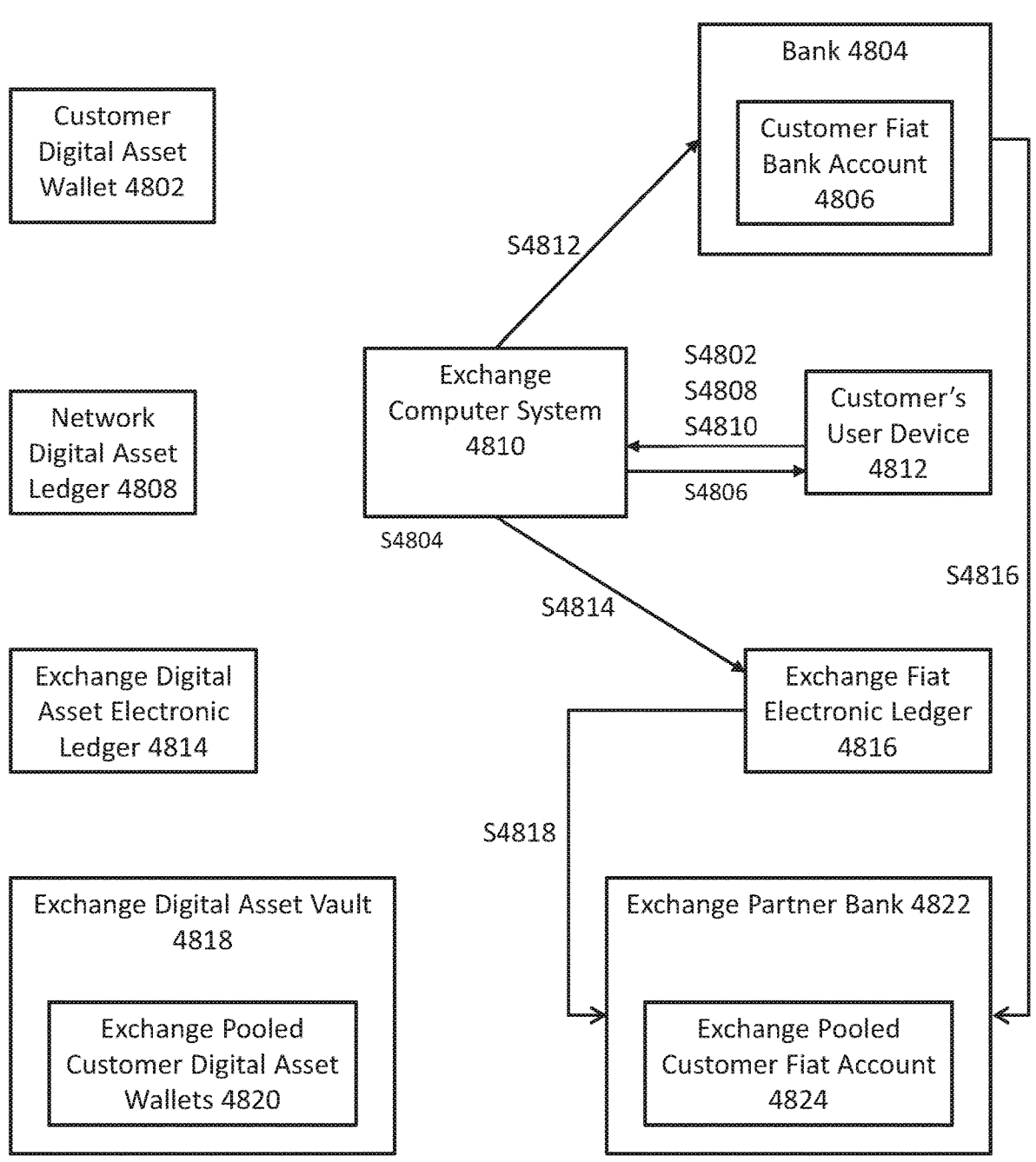

FIG. 7A is an exemplary schematic diagram of an exchange, and FIG. 7B is a corresponding flow chart of a process for digital asset exchange customer account fiat funding via an exchange-initiated request, such as ACH in accordance with exemplary embodiments of the present invention. An exchange computer system 4810 can interface with a customer digital asset wallet 4802, a bank 4804 with a customer fiat bank account 4806, an exchange partner bank 4822 with an exchange pooled customer fiat account 4824, a network digital asset ledger 4808, and/or a customer's user device 4812, to name a few. In addition to the exchange computer system 4810, the exchange can include an exchange digital asset electronic ledger 4814, an exchange fiat electronic ledger 4816, and an exchange digital asset vault 4818 with exchange pooled customer digital asset wallets 4820 with associated digital asset addresses. Any of these entities or components may communicate directly and/or indirectly, e.g., through a data network, such as the Internet. In embodiments, encryption and/or other security protocols may be used. These entities and components are further described with respect to FIG. 4A.

Referring to FIG. 7B, in a step S4802 the exchange computer system can receive, e.g., from a user device, user access credentials. In a step S4804, the exchange computer system can authenticate the user, such as by verifying the received access credentials. In a step S4806, the exchange computer system may provide to a customer user device a fiat funding interface. In a step S4808, the exchange computer system may receive from the user device user selections for a funding source and/or funding method. The funding source may identify a bank account or other fiat account. The funding method may identify ACH transfer or wire transfer, to name a few. In a step S4810, the exchange computer system can receive from the user device a funding amount value to transfer to an exchange account associated with the user. In embodiments, In some embodiments, step S4808 and step S4810 may be a single step or may occur substantially simultaneously. Accordingly, the exchange computer system may receive from a user electronic device a user electronic request comprising a funding amount and a funding method. In embodiments, the funding method may be an ACH transfer and the request further identifies a verified user bank account.

In a step S4812, the exchange computer system can transmit a fund transfer request to a bank where the customer has a fiat bank account. Accordingly, the exchange computer system may transmit to an exchange partner bank an electronic funding request comprising the funding amount and the user bank account identifier.

In a step S4814, the exchange computer system can update an exchange fiat electronic ledger with the funding transaction information. In a step S4816, the exchange computer system can receive an electronic indication that the funding amount was transferred from the customer's fiat bank account to an exchange fiat account, e.g., at a partner bank. In a step S4818, the exchange computer system can monitor the exchange fiat account to determine the availability of funds in an exchange account associated with the user. In embodiments, the exchange computer system may generate and/or provide an electronic notification to one or more user devices associated with a user account that funds are available for use on the exchange. In embodiments, the notification may indicate a current balance of a user account (e.g., in fiat currency and/or digital asset quantities).

Figure 7C:
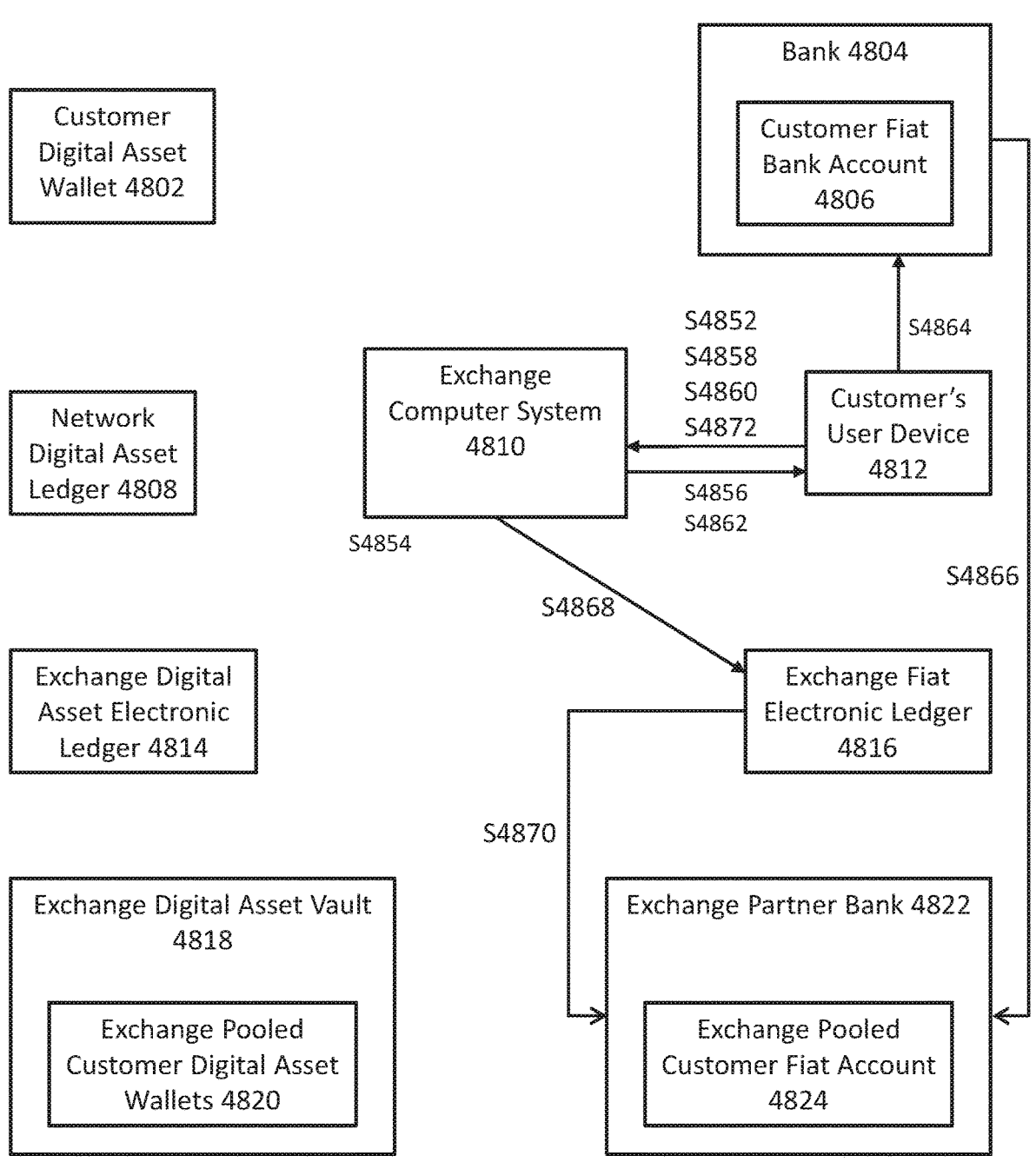

FIG. 7C is an exemplary schematic diagram of an exchange, and FIG. 7D is a corresponding flow chart of a process for digital asset exchange customer account fiat funding via a customer-initiated request, such as a wire transfer, in accordance with exemplary embodiments of the present invention. The components and entities associated with an exchange that are shown in FIG. 7C are described with respect to FIG. 4A.

FIG. 7D is a flow chart showing an exemplary process for digital asset exchange customer account fiat funding. In a step S4852, an exchange computer system can receive user access credentials. In a step S4854, the exchange computer system can authenticate the user by verifying the received access credentials. Verifying the access credentials can comprise comparing the credentials to a secure credentials database. In a step S4856, the exchange computer system can provide to a customer user device a fiat funding interface. In a step S4858, the exchange computer system can receive from the customer user device, user selections for a funding source and/or funding method. The funding method may be a customer-initiated method, such as a wire transfer. In a step S4860, the exchange computer system can receive a funding amount value to transfer to an exchange account associated with the user. In a step S4862, the exchange computer system can provide to the customer user device fund transfer instruction, e.g., wire instructions. In a step S4864, the exchange computer system may receive an electronic indication of a customer-initiated fund transfer from a customer fiat bank account a customer bank to an exchange fiat account at an exchange partner bank according to the fund transfer instructions. In embodiments, step S4864 may be skipped. In a step S4866, the exchange computer system may receive an indication that the funding amount was transferred from the customer's fiat bank account to the exchange fiat account. In a step S4868, the exchange computer system can update an exchange fiat electronic ledger with the funding transaction information, which may include an amount value, customer account ID, transaction date and/or time, to name a few. In a step S4870, the exchange computer system can monitor the exchange fiat account to determine the availability of funds in an exchange account associated with the user. In a step S4872, the exchange computer system can provide an electronic notification to one or more customer user devices that funds are available for use on the exchange.

FIG. 7E is a flow chart showing another exemplary process for digital asset exchange customer account fiat funding. In a step S4852', an exchange computer system can receive user access credentials. In a step S4854', the exchange computer system can authenticate the user by verifying the received access credentials. Verifying the access credentials can comprise comparing the credentials to a secure credentials database. In a step S4856', the exchange computer system can provide to a customer user device a fiat funding interface. In a step S4857, the exchange computer system can receive a user electronic request comprising a funding amount and a funding method (e.g., a wire transfer). In a step S4859, the exchange computer system can provide to the customer user device, an electronic message and/or display data comprising wire transfer instructions. In a step S4861, the exchange computer system can set a pending transfer indicator and/or initiate a funds receipt monitoring process. In a step S4863, the exchange computer system can receive an electronic indication that funds were received via wire transfer at an exchange fiat account at an exchange partner bank. In a step S4865, the exchange computer system can verify that the received funds were transferred from the authorized customer's fiat bank account to the exchange fiat account. In a step S4868', the exchange computer system can update an exchange fiat electronic ledger with the funding transaction information, which may include an amount value, customer account ID, transaction date and/or time, to name a few. In a step S4870', the exchange computer system can monitor the exchange fiat account to determine the availability of funds in an exchange account associated with the user. In a step S4872', the exchange computer system can provide an electronic notification to one or more customer user devices that funds are available for use on the exchange.

Figure 8A:
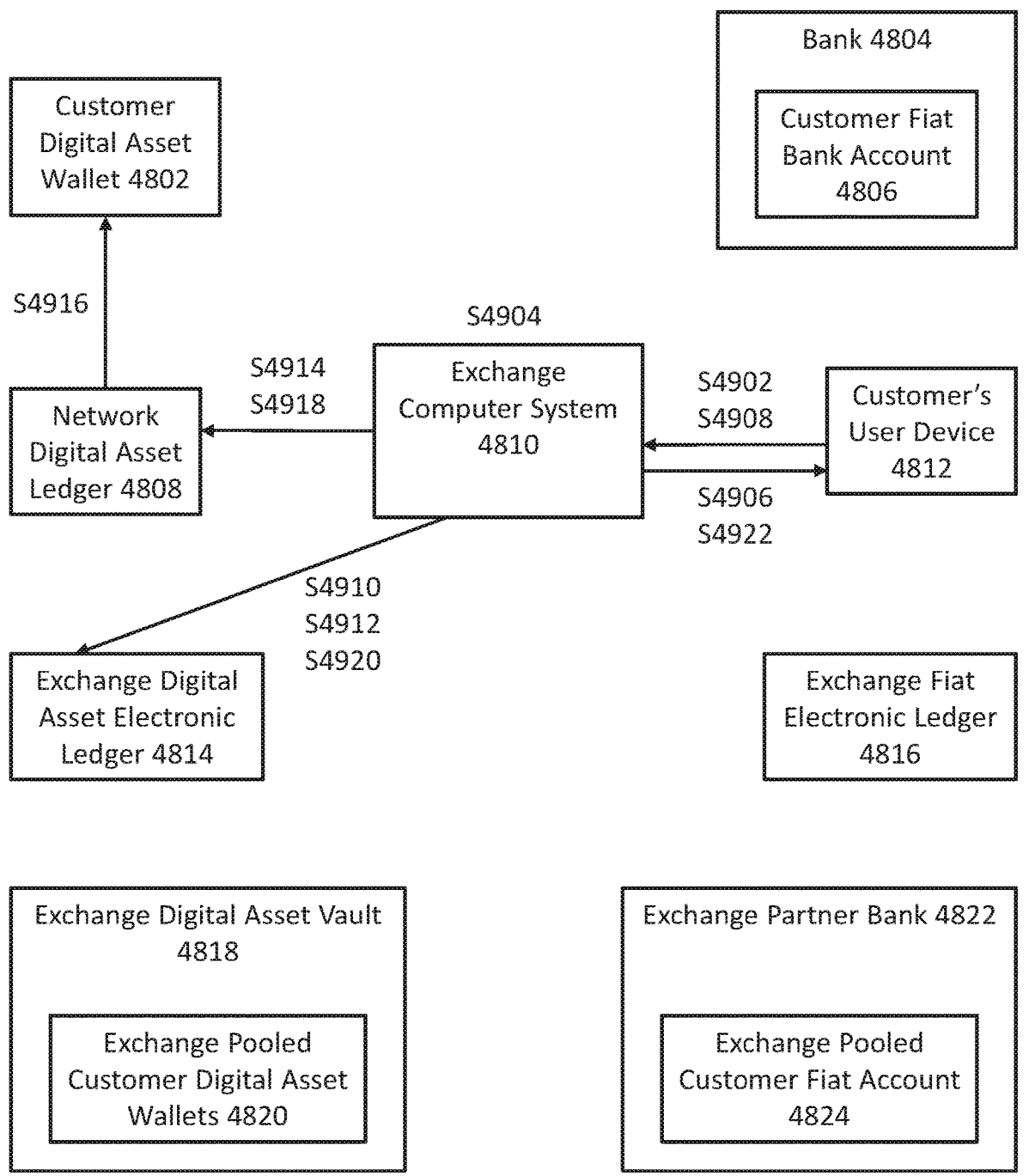

FIG. 8A is an exemplary schematic diagram of an exchange, and FIG. 8B is a corresponding flow chart of a process for digital asset exchange account digital asset withdrawal in accordance with exemplary embodiments of the present invention. The components and entities associated with an exchange that are shown in FIG. 8A are described herein with respect to FIG. 4A.

Referring to FIG. 8B, in a step S4902, an exchange computer system can receive user access credentials. User access credentials can include any of a username, password, fingerprints, access card scan (e.g., swipe of a card associated with the exchange and having a magnetic strip), and/or a pin (e.g., a number provided via SMS, other text message service, or email for multi-factor authentication), to name a few. In a step S4904, the exchange computer system can authenticate the user based upon the received user access credentials. In a step S4906, the exchange computer system may provide to a customer user device a withdrawal interface. In a step S4908, the exchange computer system may receive from the customer user device user inputs comprising at least a destination digital asset address, typically associated with a destination digital wallet and a requested digital asset withdrawal amount value. In a step S4910, the exchange computer system may verify that a digital asset account associated with the customer contains sufficient digital assets to cover the requested withdrawal amount. In embodiments, such verification can comprise reading a digital asset electronic ledger and/or determining a customer digital asset balance, e.g., based on summing transactions recorded on a digital asset electronic ledger. In a step S4912, the exchange computer system may update an exchange digital asset electronic ledger to reflect the pending withdrawal. In embodiments, recording an entry in the electronic ledger prior to the withdrawal may be performed to prevent double spending. In other embodiments, such a step may be skipped. In a step S4914, the exchange computer system may execute the withdrawal, e.g., by broadcasting the withdrawal to a digital asset network electronic ledger, e.g., the Bitcoin Blockchain, the Ethereum Blockchain, to name a few. In a step S4916, the destination wallet may receive an electronic notification of the receipt of digital assets from the exchange. In a step S4918, the exchange computer system may monitor the network digital asset ledger to determine whether and/or when the withdrawal transaction is confirmed. In a step S4920, the exchange computer system may update the digital asset electronic ledger, e.g., by debiting the withdrawal amount from the customer's exchange account, to reflect confirmation of the withdrawal transaction. In a step S4922, the exchange computer system may provide to one or more customer user devices an electronic notification of the withdrawal. Such a notification can include at least the customer's new digital asset balance.

A digital asset exchange can include additional systems, which may include software modules, for performing various functions of the exchange. For example, an exchange can include an account management system, which may comprise a user account registration system for new users and/or an existing user account management system. The exchange can include a trading system, which may comprise an interactive trading interface system, an automated trading interface system, a trade confirmation notification system, and/or a trade transaction fee processing system. A fund transfer system can include a fiat account funding and redemption system, a digital asset accounting funding and redemption system, and an account funding and redemption fee processing system. An exchange can also include a trade settlement system. A customer service system can include a trade dispute resolution interface system and a customer account management assistance system. A customer reporting system can include a gain an loss reporting system and a transaction history system. A fraud analysis system can monitor transactions to detect fraudulent and/or unauthorized transactions. The exchange can also include a SVCoin system, which may comprise a purchase system, redemption system, and a dividend payment system. In a preferred embodiment, a SVCoin system is included to allow users to purchase and redeem stable value coins using fiat currency and/or other digital assets.

Exchange Digital Asset Storage Structure

Deposited customer fiat may be held in a pooled fiat account maintained in a partner bank. Meanwhile, digital assets held by the exchange may be maintained in pooled digital addresses associated with pooled digital wallets. The exchange may store digital assets using any of the security and/or storage systems and methods discussed herein. The exchange can employ any combination of varying levels of secure storage for its wallets. For example, portions of digital assets held by the exchange may be maintained in cold storage with neither the wallet's private nor public keys ever having been exposed to a digital asset network or other external network, such as the Internet. Other digital assets may be stored in air-gapped hot wallets, which may be wallets generated off-line with transactions generated off-line, e.g., on an isolated computer, and transferred to a networked computer via a temporary physical connection or manual transfer. Other digital assets may be maintained in hot wallets, e.g., to satisfy withdrawals from the exchange. The exchange may determine the amount of assets to hold in hot wallets, which may be based on historical exchange activity and/or anticipated need. A hot wallet liquidity module may analyze and predict the amount of assets per wallet and/or during a time period required to meet anticipated need and may also initiate transfers of assets to or from hot wallets to maintain desired levels. For example, a hot wallet liquidity module could determine that it is desirable to maintain digital assets in certain defined amounts (e.g., 0.5 bitcoin), and/or certain defined fiat amounts (e.g., $100 worth of bitcoin) and/or of certain defined quantities sufficient to cover transactions anticipated during a defined period (e.g., the day's transaction). In embodiments, initiating an electronic transfer may comprise electronically generating and providing an electronic notification to devices associated with one or more exchange administrators of a need to transfer assets and/or an amount of assets to transfer. The exchange may designate one or more wallets for receiving incoming digital assets only. For example, the exchange may employ a single digital wallet for each receipt of digital assets, e.g., from exchange users. The receiving wallet may be destroyed after the received assets are transferred to one or more other wallets.

The exchange may employ any of a number of different exchange digital wallet systems. As discussed herein, the exchange may operate a pooled or omnibus digital wallet system, e.g., as part of a centralized exchange system. The pooled system may use an electronic ledger to track digital asset ownership for each exchange customer. Customers may transfer digital assets from their own digital wallets to an exchange address in order to fund their digital asset account on the exchange. The ledger can track (e.g., record) such funding events, as well as withdrawal events. Transfers of digital assets among customers can also be accounted for using the ledger. With a pooled wallet system, internal transactions on the exchange (e.g., transactions that do not entail transferring funds to or from the exchange or exchange wallets but rather transactions between exchange wallets) can be settled without delay, since the transfer can be logged through electronic ledger updates and does not have to otherwise be processed by a digital asset network.

In another embodiment, the exchange digital wallet system may comprise exchange operated wallets for each exchange customer. These exchange operated wallets may be maintained in trust by the exchange for each customer as associated digital asset addresses. Transactions may be processed by the digital asset network, e.g., the Bitcoin network, the Ethereum network, to name a few. The keys to each customer wallet may be held by the customer and/or by the exchange. Transactions may be settled via the digital asset network in real-time (with any corresponding confirmation period) as they occur, or transactions may be settled in a batch, which may entail broadcasting a plurality of transactions to the network at a particular time or periodically throughout a day.

In another embodiment of an exchange digital wallet system, the exchange customers may own and/or manage their own wallets, e.g., as part of a decentralized exchange system. The exchange would not hold any customer digital assets, and customers would hold the private keys to their wallets with associated digital asset addresses. The exchange may match customers, as described herein, so that a digital asset seller can transfer digital assets from the seller's digital wallet to a digital wallet corresponding to a digital asset buyer.

In embodiments, the digital wallet may be a custodial digital wallet. The custodial digital wallet may be segregated, that is, unique to a particular customer or commingled, including digital assets of multiple customers. In such an embodiment, the custodian holds digital assets in the custodial wallet for the benefit of its customers. The custodian would hold the private key or private keys/key segments to each custodial wallet whether it be segregated or commingled. Transactions may be made between different custodial wallets or between custodial wallets and exchange customer wallets in the manner described above.

Centralized Digital Asset Exchange

In embodiments, the exchange may hold customer fiat currency and/or digital assets in centralized, pooled accounts or wallets. The exchange may maintain an electronic ledger to record transactions among users of the exchange. Separate electronic fiat account ledgers and electronic digital asset ledgers may be maintained. Maintaining a ledger may involve electronically updating the ledger to reflect pending transactions and/or completed transactions, which may involve debiting assets from a user's account and/or crediting assets to a user's account. Broadcast to a digital asset network and confirmation from a digital asset network may not be performed for transactions within the exchange, e.g., transactions between a digital asset seller selling digital assets that are stored by the exchange and a buyer paying with fiat currency that is held in an exchange bank account, such as a pooled account.

In embodiments, for both a decentralized and a centralized exchange the exchange may provide the ability for customers to purchase digital assets from the exchange and/or sell digital assets to the exchange such that the exchange operator or owner is the counterparty to the transaction. Transaction amount limits may be placed on such transactions and/or additional fees may be charged. In addition, in embodiments, the exchange may provide a dashboard interface for users (such as registered users) to purchase SVCoins using fiat currency and/or digital assets and/or to redeem digital assets in the form of SVCoins. In embodiments, the dashboard interface for the exchange may also allow users to redeem SVCoins for fiat currency. Since SVCoins are pegged to a fixed notional value of fiat currency, when SVCoins are purchased an equal amount of fiat will be set aside by the exchange as a reserve for when the SVCoins are redeemed. Similarly, when SVCoins are redeemed, payment for such redemption shall come from reserves set aside for such redemption.

Exchange Operations Systems

In embodiments, a digital asset exchange may require users to open designated accounts associated with the user in order to participate in the exchange. Each user may have a digital math-based asset account to record and maintain such user's digital math-based assets and a fiat account to record and maintain such user's fiat assets. In embodiments, the fiat assets recorded in the fiat account may be U.S. Dollars ("USD") held in one or more omnibus bank accounts with one or more FDIC-insured depository institutions or banks. In embodiments, a digital math-based asset computer system of a digital asset exchange may record in an electronic ledger information associated with a user account, such as digital math-based asset purchase orders, digital math-based asset sell orders, digital math-based asset purchase offers, digital math-based asset sell offers. In embodiments, digital math-based asset purchase offers and digital math-based asset sell offers may be converted into digital math-based asset purchase orders and digital math-based asset sell orders, respectively, according to a user's instructions, if certain user-specified factors are met (e.g., digital math-based assets are within a given price, quantity, period of time, to name a few). In embodiments, when the digital math-based asset computer system matches an electronic digital math-based asset purchase order with an electronic digital math-based asset sell order, the digital math-based asset computer system may record the trade in an electronic ledger, effectively transferring ownership of the seller's traded digital math-based assets to the buyer, and ownership of the related purchase price in fiat currency from the buyer to the seller. In embodiments, the changes in a user's ownership of digital math-based assets and fiat currency recorded in the electronic ledger are reflected in a user's digital math-based asset account and fiat account.

In embodiments, a digital asset exchange may accept payment methods (e.g., credit card transactions; Automated Clearing House (ACH) debits, wire transfers, digital asset transactions, to name a few) for purchases of digital assets.

In embodiments, a digital asset exchange may hold digital math-based assets and/or fiat currency in trust for users. Fiat currency may be maintained in accounts with a state or federally chartered bank and may be eligible for FDIC insurance, subject to compliance with applicable federal regulation. In embodiments, a digital asset exchange may also operate a digital math-based asset storage system, in which users may deposit digital math-based assets. In embodiments, fiat currency may be transmitted to a digital asset exchange's omnibus account. In embodiments, the exchange may transmit fiat currency back to a user upon receiving a request from a user.

In embodiments, a digital asset exchange may comply with relevant laws and regulations whereby the exchange may operate in a highly regulated banking environment and permit necessary supervision by relevant legal authorities. In embodiments, a digital asset exchange may comply with rules and regulations promulgated by a self-regulatory organization.

In embodiments, when a user commences an electronic digital math-based asset purchase order to acquire digital math-based assets, the user may either have fiat currency in an associated user account or the buyer may send fiat currency to the digital asset exchange's omnibus account at the applicable bank. In embodiments, when a seller commences an electronic digital math-based asset sell order to sell digital math-based assets, the seller may either have digital math-based assets in an associated user account or may send digital math-based assets to a digital math-based asset account. In embodiments, the seller may send digital math-based assets to one or more of digital wallets held by the exchange. In embodiments, exchange transactions may only be completed after the digital math-based asset computer system verifies that the digital math-based asset accounts and fiat accounts associated with the users involved in the transaction at least equal the quantities required by the transaction.

In embodiments, the exchange may permit trading twenty-four hours a day, seven days a week. In embodiments, the exchange may shut down for scheduled and/or unscheduled maintenance periods. In embodiments, the exchange may prohibit users from transferring fiat currency outside of normal business hours, in order to comply with applicable laws and regulations. In embodiments, the exchange may allow users to deposit and withdraw digital math-based assets outside of normal business hours. In embodiments, the exchange may permit users to sell digital math-based assets for fiat currency or buy digital math-based assets with fiat currency if the user holds sufficient fiat currency in its associated account prior to initiating the transaction.

Exchange-Based Stable Value Coin to Fiat Portal

In embodiments, a digital asset exchange (such as a regulated exchange) can be used to exchange SVCoin for fiat and fiat for SVCoin. Since SVCoin is a stable value token, each token will be pegged to a stable value of fiat (e.g., 1 SVCoin=1 USD or 1 SVCoin=1 EUR, to name a few). In embodiments, when fiat is provided to a digital asset exchange to purchase SVCoin, a sufficient amount of fiat to cover the notional value of the SVCoin will be set aside and held until the SVCoin is redeemed. Similarly, when SVCoin is redeemed the corresponding amount of fiat associated with the notional value of the SVCoin will be taken from such reserves to cover the redemption. In embodiments, each time SVCoins are purchased, redeemed and/or traded, transaction fees may be charged by the SVCoin issuer, and/or others involved in the transaction, such as miners on the digital asset network. Such transaction fees may be charged in fiat, SVCoin and/or other digital assets (e.g., Gas, bitcoin, ether, to name a few).

In embodiments, when a user (such as a registered user of a regulated digital asset exchange) commences a purchase order to acquire SVCoin for fiat, the user may have fiat currency in an associated user account. Alternatively, the user may send fiat currency to the exchange's account, such as an omnibus account, at the applicable bank. In embodiments, when a seller sells SVCoin, the seller may have the SVCoin in an associated user account or may send SVCoin to a digital asset account. Specifically, the seller may send SVCoin to one or more of digital asset addressed, typically associated with digital wallets held by the exchange. In embodiments, exchange transactions may only be completed after the verification that the digital asset accounts and fiat accounts associated with the users involved in the transaction at least equal the quantities of each required by the transaction.

In embodiments, registered users of a digital asset exchange system, such as Gemini, may purchase and/or redeem SVCoins for fiat and/or other digital assets though one or more digital asset dashboard interfaces. In embodiments, the one or more digital asset dashboard interfaces may include: (i) a dashboard fiat interface which allows registered users to deposit and/or withdrawal fiat with the digital asset exchange; (ii) a dashboard digital asset interface which allows registered users to deposit and/or withdrawal digital assets with the digital asset exchange system; (iii) a dashboard SVCoin interface which allows registered users to purchase and/or redeem SVCoins with the digital asset exchange system; and (iv) a dashboard Security Token interface which allow Security Token issuers to provide instructions to transfer SVCoins to Security Token holders. Each of these dashboard interfaces will now be described in turn.

FIGS. 11A-1-4 illustrates an exemplary embodiment of a dashboard fiat interface which allows registered users to deposit and/or withdraw fiat with the digital asset exchange.

FIG. 11A-1 illustrates an exemplary embodiment of the dashboard fiat interface as used for deposit of fiat. As illustrated, the user has the option to make a transfer from a bank to the exchange by indicating an amount of fiat 1102 (e.g., US dollars) to be transferred from a funding source 1100 (e.g., a bank account).

FIG. 11A-2 illustrates an exemplary embodiment of the dashboard fiat interface providing an option of a wire transfer. As in FIG. 11A-1, the user indicates an amount of fiat 1102 to be transferred from a funding source 1100, such as a bank, to be wired to the exchange.

FIG. 11A-3 illustrates the dashboard fiat interface as used to withdraw fiat from the exchange and deposit it into a destination (e.g., a bank). In this case, the user provides a withdrawal amount of fiat 1104 and a destination 1106, such as a bank account, for the specific fiat.

Similarly, FIG. 11A-4 illustrates the dashboard fiat interface as used to withdraw fiat via a wire transfer where the user enters the withdrawal amount of fiat 1104 and a destination 1106, such as a bank account.

FIGS. 11B-1-4 illustrates an exemplary embodiment of a dashboard digital asset interface which allows registered users to deposit and/or withdrawal digital assets with the digital asset exchange system.

FIG. 11B-1 illustrates an exemplary embodiment of the dashboard fiat interface as used for deposit of digital assets, specifically bitcoin in this nonlimiting example. As illustrated, the user enters the current address 1112 of the digital asset (e.g., bitcoin, ether, etc.).

FIG. 11B-2 illustrates another exemplary embodiment of the dashboard fiat interface as used for deposit of digital assets, specifically ether this nonlimiting example. As illustrated, the user enters the current address 1112 of the digital asset (ether in this example).

FIG. 11B-3 illustrates an exemplary embodiment of the dashboard fiat interface as used for withdrawal of digital assets, specifically bitcoin in this nonlimiting example. As illustrated, the user enters the destination address 1114 for the digital asset (bitcoin) as well as amount of digital assets 1116 to be withdrawn.

FIG. 11B-4 illustrates an exemplary embodiment of the dashboard fiat interface as used for withdrawal of digital assets, specifically ether this example. As illustrated, the user enters the destination address 1114 of the digital asset (ether) as well as amount of digital assets 1116 to be withdrawn.

FIGS. 11C-1-2 illustrates an exemplary embodiment of a dashboard SVCoin interface which allows registered users to purchase and/or redeem SVCoins with the digital asset exchange system.

FIG. 11C-1 illustrates an exemplary embodiment of the dashboard fiat interface as used to purchase SVCoins using fiat. As illustrated, the user may enter an amount of fiat (U.S. dollars, in this example) 1122 to be provided from a source 1124 (e.g., a bank account) to purchase the SVCoins.

FIG. 11C-2 illustrates an exemplary embodiment of the dashboard fiat interface as used to purchase SVCoins using digital assets (bitcoin in this example). As illustrated, the user may enter the current address of the digital asset 1126.

In embodiments, a registered user may purchase SVCoins in exchange for fiat. Referring to FIG. 9A, in S9902, a registered user may log in to the dashboard SVCoin interface, such as illustrated in FIGS. 11C1-2.

In S9904, the user selects the purchase SVCoin option, and specifies the amount of SVCoins the user seeks to obtain. In embodiments, the user may be requested to provide a digital asset address, typically associated with a digital wallet, such as a digital asset address associated with a blockchain digital asset, like ether. In embodiments, the amount of SVCoins to be purchased may be specified by number of SVCoins, or by an amount of fiat. Since the SVCoins are pegged to the fiat in a stable amount (e.g., 1 SVCoin=1 USD), the system can automatically convert and display the requested amount of SVCoin into fiat, or requested amount of fiat into SVCoin.

In S9906, the digital asset exchange system will analyze and verify that the request can be properly processed. In step S9906-$a$, the digital asset exchange system, as the SVCoin issuer, may verify that the user has sufficient fiat currency maintained at the digital asset exchange to cover the transaction, including a sufficient amount of fiat to cover the amount of SVCoin being acquired, as well as any transaction fees that may be charged. If the user does not have sufficient fiat in the system, the transaction may be terminated for insufficient funds. In embodiments, the user may be provided an opportunity to obtain sufficient funds, by, e.g., selling digital assets maintained by the user on the digital asset exchange or by making a deposit of additional fiat. In step S9906-$b$, the digital asset exchange system, may also verify that the digital asset address provided is a valid digital asset address. In step S9908-$c$, the digital asset exchange system, may also publish transactions to blockchain.

In S9908, after the digital asset exchange system has confirmed that the user has sufficient fiat to cover the transaction, the digital asset exchange system may initiate the process of generating the requested SVCoin. In embodiments, where SVCoins were previously generated, then S9908 may be replaced with an alternative process S9908' as discussed below.

Returning to S9908, in S9908-$a$, the digital asset exchange system may debit the designated fiat funds from a fiat ledger associated with the user account, and credit a corresponding amount of fiat to the SVCoin fiat ledger to be held in trust by the Exchange.

In S9908-$b$, the digital asset exchange system shall generate the requested SVCoin tokens. As part of this step, or as an additional step, the digital asset exchange system will update the SVCoin ledger to reflect the creation of the newly generated SVCoins and to indicate the digital asset address associated with these newly generated SVCoins.

In S9908-$c$, the digital asset exchange system shall publish to the blockchain network (e.g., the Ethereum Network) the transaction to be recorded by the blockchain network. In embodiments, a transaction fee may be required by, e.g., a miner, to process and add the requested transaction on the blockchain.

As noted, when a reserve of SVCoin had been previously created but not yet distributed by the digital asset exchange system, S9908' may be implemented instead of S9908. At step S9908-a', digital asset exchange computer system may debit the designated fiat funds from a fiat ledger associated with the user account, and credit a corresponding amount of fiat to the SVCoin fiat ledger to be held in trust by the Exchange.

In step S9908-b', the digital asset exchange computer system may determines an appropriate amount of SVCoin from the reserve to satisfy the request.

In step S9908-c', the digital asset exchange computer system updates the SVCoin ledger to change the address associated with the portion of the reserve determined in step S9908b' to the address associated with the user.

In S9910, the digital asset exchange computer system may send a message to the registered user, and/or the designated digital asset address to reflect that the transaction was successfully processed. In embodiments, such messages may include information including: (i) digital asset address; (ii) the amount of tokens generated; and/or (iii) the new balances for the digital asset address.

In embodiments, a registered user may redeem SVCoins in exchange for fiat. Referring to FIG. 9B, in S9952, a registered user may log in to the dashboard SVCoin interface, such as illustrated in FIGS. 11C-1 and 11C-2.

In S9954, the user selects the redeem SVCoin option, and specifies the amount of SVCoins the user seeks to redeem. In embodiments, the user may be requested to provide a digital wallet address, such as a digital wallet address associated with a blockchain digital asset, like ether. In embodiments, the amount of SVCoins may be specified by number of SVCoins, or by an amount of fiat. Since the SVCoins are pegged to the fiat in a stable amount (e.g., 1 SVCoin=1 USD, or 100 SVCoin=1 USD, to name a few), the system can automatically convert the requested amount of SVCoin to fiat, or requested amount of fiat into SVCoin.

In S9956, the digital asset exchange system will analyze and verify that the request can be properly processed. In step S9956-a, the digital asset exchange system, as the SVCoin issuer, may verify that the user has sufficient SVCoin to cover the transaction as well as any transaction fees that may be charged. In embodiments, the digital asset exchange system may perform verification of the SVCoin balance by checking the token balance of the digital asset address against the SVCoin Token ledger as maintained by the digital asset blockchain. For example, a balance for a token issued based on the Ethereum Network may be checked at www.etherscan.io. If the user does not have sufficient SVCoin and/or an insufficient amount for transaction fees and/or provided an invalid digital asset address, to name a few, the transaction may be terminated.

In embodiments, SVCoin transactions may be published and recorded in a SVCoin token side ledger that is separate from an underlying blockchain (e.g., the Ethereum Blockchain). Such a side ledger may be provided using a sidechain, for example, a plasma chain, which is separate from the underlying digital asset blockchain that is maintained on the distributed network. In embodiments, this sidechain is used to record all transactions involving the SVCoin token and is maintained by the token issuer or another trusted entity on behalf of the token issuer. These transactions may then be subsequently published to the underlying digital asset blockchain periodically or aperiodically such that all transactions are publicly viewable and confirmable. In embodiments, with a blockchain supporting shielded transactions, the transactions in the SVCoin token may potentially be shielded and only viewable by authorized token holders. In embodiments, transactions on the sidechain may be consolidated prior to publication on the digital asset blockchain to increase speed of processing and reduce transaction costs.

The use of a sidechain in conjunction with a blockchain can provide certain technical advantages not otherwise available by either alone. For example, since all transactions on the sidechain are inevitably published to the digital asset blockchain, these transaction records enjoy the same benefit of immutability provided to all other transactions on the digital asset blockchain. However, use of a sidechain reduces both transaction costs and transaction times overall. Recording the transactions on the sidechain first can be accomplished more rapidly than transactions that are published directly to the digital asset blockchain, which must be confirmed prior to being added to the digital asset blockchain. In embodiments, the sidechain may simply be a database that records all transactions such that there is no need for miners to verify each transaction, and thus, no need to pay miners for this service. In this case, transaction costs are only incurred for the periodic or aperiodic publication of transfers from the sidechain to the underlying digital asset blockchain.

In embodiments, the database for the SVCoin tokens may be maintained as a separate side chain from the database for each Security token. In embodiments, one or more security tokens may be maintained in the same side chain as the SVCoin tokens, and/or by the same trusted entity system as used to maintain the SVCoin token database.

In S9958, after the digital asset exchange system may confirm that the user has sufficient SVCoin to cover the transaction, as well as any other designated criteria, the digital asset exchange system may initiate the process of redeeming the designated SVCoin.

In S9958-a, the digital asset exchange system redeems the designated SVCoin tokens, including updating the SVCoin token ledger database to reflect the debiting and cancelling of the designated tokens and debiting the corresponding digital wallet address associated with such redeemed SVCoin tokens. In embodiments, this process may be performed by generating a transaction on the digital asset exchange network from a contract digital wallet address or other authorized digital wallet address under the relevant SVCoin smart contract programming, to be sent in S9958-c, discussed below.

In S9958-b, the digital asset exchange system credits the designated fiat funds to a fiat ledger associated with the user account, and debit a corresponding amount of fiat from the SVCoin fiat ledger being held in trust by the exchange.

In S9958-c, the digital assert exchange system publishes to the blockchain network (e.g., the Ethereum Network) the transaction to be recorded by the blockchain network. In embodiments, a transaction fee (such as Gas) may be required by, e.g., a miner, to process and add the requested transaction on the blockchain. In embodiments, the transaction fee may be specified as an amount and/or an amount limit to facilitate the transaction being processed by a miner.

In S9960, the digital asset exchange computer system may send a message to the registered user, and/or the designated digital asset addresses to reflect that the transaction was successfully processed. In embodiments, such messages may include information including: (i) digital asset address; (ii) the amount of tokens redeemed; and/or (iii) the new balances for the digital asset address or digital wallet associated therewith.

Variable Permission Stable Value Tokens

FIGS. 14A-14H illustrate a method of issuing stable value digital asset tokens. In embodiments, this method can control the risk associated with loss of control of an on-line key pair by using variable permission custodians.

In Step S1402, a first designated key pair, including a first designated public key of an underlying digital asset and a corresponding first designated private key, which is mathematically related, is provided. The underlying digital asset may be maintained on a distributed public transaction ledger maintained by a plurality of geographically distributed computer systems in a peer-to-peer network in the form of the blockchain (such as the Ethereum blockchain or NEO blockchain). The first designated private key may be stored on a first computer system which is connected to the distributed public transaction ledger through the Internet (e.g., in a hot wallet).

In Step S1404, a second designated key pair, including a second designated public key of the underlying digital asset and a corresponding second designated private key, which is mathematically related, is provided. The second designated private key is stored on a second computer system which is physically separated from the first computer system and is not operatively or physically connected to the distributed public transaction ledger or the Internet (e.g., a cold wallet).

In embodiments additional off-line designated key pairs may also be provided.

In Step S1406, first smart contract instructions for a stable value digital asset token associated with a first contract address associated with the underlying digital asset are also provided. The smart contract instructions are saved in the blockchain for the underlying digital assets and include instructions for: (1) token creation; (2) token transfer; (3) token destruction; (4) authorization instructions for the first designated key pair; and (5) authorization instructions for the second designated key pair. In embodiments, these smart contract instructions may be contained in one or a plurality of contract addresses, as discussed above.

Referring to FIG. 14B, in Step S1408, a digital asset token issuer system receives a request from a first requesting user to obtain a first sum of stable value digital asset tokens in exchange for a second sum of fiat. The first sum corresponds to the second sum based on a fixed ratio of stable value digital asset token to fiat (e.g., 1 SVCoin Token=1 USD). The first requesting user is associated with an associated first requester key pair, including a first request public key of the underlying asset and a corresponding first request private key, which are mathematically related to each other.

In Step S1410, the digital asset token issuer system confirms receipt of the second sum of fiat.

In Step S1412, digital asset token issuer system determines whether the first designated key pair has authority to obtain the first sum of stable value digital asset tokens.

Referring to FIG. 14B, in the case where the digital asset token issuer system determines in Step S1412 that the first designated key pair has authority to obtain the first sum, in embodiments, in Step S1414, the system may perform the steps S1414 A(1)-A(5). In Step S1414A(1), the digital asset token issuer system, generates first instructions from the first designated address to the contract address to obtain the first sum of stable value digital asset tokens and transfer said first sum to the first request public key. In Step S1414A(2), the digital asset token issuer system sends to the first computer, the first instructions. In Step S1414A(3), the first computer digitally signs the first instructions using the first designated private key to generate first digitally signed instructions. In Step S1414A(4), the first computer sends to the digital asset token system, the first digitally signed instructions. In Step S1414A(5), the digital asset token system sends to the plurality of geographically distributed computer systems, the first digitally signed instructions.

Referring to FIG. 14C, in the case where the digital asset token issuer system determines in Step S1412 that the first designated key pair has authority to obtain the first sum, in other embodiments, in Step S1414' the system may perform the following steps S1414 B(1)-B(3). In Step S1414B(1), a request is sent from the digital asset token issuer system to the first computer, to obtain the first sum of stable value digital asset tokens and transfer said first sum to the first request public key. In Step S1414B(2), the first computer generates first instructions addressed from the first designated public key to the contract address including a message to obtain the first sum of stable value digital assets tokens and to assign the obtained first sum to the first request public key, the first instructions including a digital signature based on the first designated private key. In Step 1414B(3), the first computer system sends to the plurality of geographically distributed computer systems, the first instructions. In embodiments, the first computer may send the first instructions indirectly through another computer system.

Referring to FIG. 14D, in Step S1415, the digital asset token issuer system confirms that the first sum of stable value digital asset tokens has been obtained and transferred to the first request public key based on reference to the blockchain.

In embodiments, in Step S1416, the digital asset token issuer system may receive a second request to obtain a third sum of stable value digital asset tokens in exchange for a fourth sum of fiat. The third sum corresponds to the fourth sum based on the fixed ratio of stable value digital asset token to fiat (e.g., 1 SV Coin Token=1 USD). The second request may come from a second requesting user with an associated second requester key pair, including a second request public key of the underlying asset and a corresponding second request private key, which are mathematically related.

In Step S1418, the digital asset token issuer system confirms receipt of the fourth sum of fiat.

In Step S1420, the digital asset token issuer system, determines whether the first designated key pair has authority to obtain the third sum.

In the case where the digital asset token issuer system determines in Step S1420 that the first designated key pair does not have authority to obtain the third sum, in Step S1422, the digital asset token issuer system determines whether the second designated key pair has authority to obtain the third sum.

Referring to FIG. 14E, in the case where the digital asset token issuer system determines in Step S1422 that the second designated key pair has authority to obtain the third sum, in embodiments, the digital asset token issuer system perform the Steps S1422A(1)-A(6). In Step S1422A(1), the digital asset token issuer system generates second instructions from the second designated address to the contract address to obtain the third sum of stable value digital asset tokens and transfer said third sum to the second request public key. In Step S1422A(2), the digital asset token issuer system transfers to a portable memory device, the second instructions. In Step S1422A(3), the second instructions are transferred from the portable memory device to the second computer. In Step S1422A(4), the second computer, digitally signs the second instructions using the second designated private key to generate the second digitally signed instructions. In Step S1422A(5), the second computer transfers to a second portable memory device, the second digitally signed instructions. In Step S1422A(6), the second digitally signed instructions are sent from the second portable memory device to the plurality of geographically distributed computer systems. In embodiments, the second digitally signed instructions may be sent indirectly through another computer system.

Referring to FIG. 14F, in the case where the digital asset token issuer system determines in Step S1422' that the second designated key pair has authority to obtain the third sum, in other embodiments, in Step S1422', the system may perform the following steps S1422B(1)-B(3). In Step S1422B(1), a request is sent from the digital asset token issuer system to the second computer, to obtain the third sum of stable value digital asset tokens and transfer said third sum to the first request public key. In Step S1422B(2), the second computer generates second instructions addressed from the second designated public key to the contract address including a message to obtain the third sum of stable value digital assets tokens and to assign the obtained third sum to the second request public key, the second instructions including a digital signature based on the second designated private key. In Step 1422B(3), the second computer system sends to the plurality of geographically distributed computer systems, the second instructions. In embodiments, the second computer may send the second instructions indirectly through another computer system.

In Step S1424, the digital asset token issuer system confirms that the third sum of stable value digital asset tokens have been obtained and transferred to the second request public key based on reference to the blockchain.

In embodiments, the step of sending, from the second portable memory device to the plurality of geographically distributed computer systems, the second digitally signed instructions comprises the further steps of transferring, form the second portable memory device to the digital asset computer system, the second digitally signed instructions; and transferring, from the digital asset computer system to the plurality of geographically distributed computer systems, the second digitally signed instructions.

Referring to FIG. 14G, in embodiments, a third designated key pair, comprising a third designated public key of the underlying digital asset and a corresponding third designated private key that are mathematically related may be provided. The third designated private key may be stored on a third computer system which is physically separated from the first computer system and from the second computer system and is not operatively or physically connected to the distributed public transaction ledger or the Internet. In such embodiments, the first smart contract instructions further comprise authorization instructions for the third key pair. Further, in such embodiments, in the case where the digital asset token issuer system determines that the first designated key pair does not have authority to obtain the third sum, the method further comprises determining, by the digital asset token issuer system, whether the third designated key pair in addition to the second designated key pair have authority to obtain the third sum; and in the case where the digital asset token issuer system determines that the third designated key pair in addition to the second designated key pair have authority to obtain the third sum, perform the Steps S1422C(1)-C(6) as part of step S1422. In Step S1422C(1), the digital asset token issuer system may generate third instructions from the third designated address to the contract address to obtain the third sum of stable value digital asset tokens and transfer said third sum to the third request public key. In Step S1422 C(2), the digital asset token issuer system may transfer to a third portable memory device, the third instructions. In Step S1422C(3), the third instructions may be transferred from the third portable memory device to the third computer. In Step S1422C(4), the third computer may digitally sign the third instructions using the third designated private key to generate the third digitally signed instructions. In Step S1422C(5), the third computer may transfer to a fourth portable memory device, the third digitally signed instructions. In Step S1422C(6), the third digitally signed instructions may be sent from the fourth portable memory device to the plurality of geographically distributed computer systems.

In embodiments, the step of sending, from the fourth portable memory device to the plurality of geographically distributed computer systems, the third digitally signed instructions comprises the further steps of (i) transferring, form the fourth portable memory device to the digital asset computer system, the third digitally signed instructions; and (ii) transferring, from the digital asset computer system to the plurality of geographically distributed computer systems, the third digitally signed instructions.

In embodiments, the first portable memory device and second portable memory device are the same portable memory device.

In embodiments, the first portable memory device and second portable memory device are the different portable memory devices.

In embodiments, the third portable memory device and fourth portable memory device are the same portable memory device.

In embodiments, the third portable memory device and fourth portable memory device are the different portable memory devices.

Blockchain Based Dividend Using Stable Value Coin

FIG. 11D illustrates an exemplary embodiment of a dashboard Security Token interface which allow Security Token issuers to provide instructions to transfer SVCoins to Security Token holders.

Referring to FIG. 12, an exemplary process flow reflecting an exemplary embodiment is shown where a Security Token issuer initiates a transfer of SVCoins to Security Token holders. It will be appreciated by those skilled in the art that the order of this process may be modified consistent with embodiments of the present invention.

In Step S1202, the Security Token issuer (who will generally by a registered user with the digital asset exchange) will log into the digital asset exchange. In embodiments, the SVCoin issuer is any trusted entity, including a digital asset exchange, bank, trust or other trusted entity. In embodiments, the Security Token issuer will be an authorized user, or otherwise qualified with respect to the trusted entity. In embodiments, the trusted entity may act as agent of the Security Token issuer to generate, distribute and maintain a ledger of SVCoins on behalf of the Security Token issuer.

In Step S1204, the Security Token issuer system, or any trusted entity system acting as agent, will navigate to the dashboard Security Token interface (see, e.g., FIG. 11D) to initiate a request for transfer of SVCoins to Security Token holders. While for purposes of illustration, the request is made via the dashboard Security Token interface, those of skill in the art will appreciate that the request may be made via API calls, submitted by electronic mail, and/or other electronic interactions, consistent with embodiments of the invention. In embodiments, the request shall identify: (i) the Security Token 1130; (ii) the total amount of SVCoins to be distributed 1132; (iii) the Security Token holder's digital asset addresses 1134; (iii) the amount of SVCoins to be distributed to each digital asset address 1136; and/or (iv) other information sufficient to calculate or otherwise determine this information. In embodiments, this information may be provided by providing the digital asset exchange, or other trusted entity system acting on behalf of the SVCoin issuer, with the access to the Security Token database, which would include the list of all current Security Token holders and their respective digital asset address and Security Token balances. In embodiments, the Security Token database may include a list of all current Security Token holders and digital asset addresses associated with each. In such embodiments, the Security Token issuer, may still need to provide the digital asset exchange system, or other trusted entity system, with the amount of SVCoins to be distributed, either individually and/or in total and how to prorate the distribution among Security Token holders.

In Step S1206, the digital asset exchange system, or other trusted entity system, may analyze and verify that the request can be properly processed. In step S1206-*a*, the digital asset exchange system, as the SVCoin issuer or on behalf of the SVCoin issuer, may verify that the user has sufficient fiat currency maintained at the digital asset exchange to cover the transaction, including a sufficient amount of fiat to cover the amount of SVCoin being acquired, as well as any transaction fees that may be charged. If the user does not have sufficient fiat in the system, the transaction may be terminated for insufficient funds. In embodiments, the user may be provided an opportunity to obtain sufficient funds, by, e.g., selling digital assets maintained by the user on the digital asset exchange or by making a deposit of additional fiat. In step S1206-*b*, the digital asset exchange system, may also verify that the digital asset addresses, provided are each a valid digital asset addresses. To the extent any digital asset addresses are not verified, the transaction may be rejected, and/or the digital asset exchange system may enter into a reconciliation process with the Security Token issuer system or trusted entity system.

At step 1206-*c*, the digital asset exchange system, or other trusted entity system, may determine an amount of SVCoins to be distributed to each of the digital addresses of the Security Token holders. In embodiments, this determination may be made based on the total number of Security Token holders and the total amount of SVCoins requested by the Security Token issuer. In embodiments, the Security Token issuer may designate a specific sum of SVCoins per Security token. In embodiments a total amount of SVCoins to be purchased may be designated in the request of the Security Token issue with directions to equally or proportionally divide the total sum between the Security Token holders.

In S1208, after the digital asset exchange system, or other trusted entity system, has confirmed that the user has sufficient fiat to cover the transaction, the digital asset exchange system may initiate the process of generating the requested SVCoin.

In S1208-*a*, the digital asset exchange system, or other trusted entity system, may debit the designated fiat funds from a fiat ledger associated with the Security Token issuer user account, and credit a corresponding amount of fiat to the SVCoin fiat ledger to be held in trust by the exchange. In embodiments, this fiat is held in a custodial account of the exchange or an agent of the exchange.

In S1208-*b*, the digital asset exchange system, or other trusted entity system, shall generate instructions to generate the requested SVCoin tokens, including instructions to update the SVCoin token ledger database to reflect the addition of the new tokens and the corresponding digital asset addresses associated with such new SVCoin tokens.

In S1208-*c*, the digital asset exchange system, or other trusted entity system, shall publish to the blockchain network (e.g., the Ethereum Network) the transaction with instructions to be recorded by the blockchain network. In embodiments, a transaction fee may be required by, e.g., a miner, to process and add the requested transaction on the blockchain.

In embodiments, where SVCoin tokens have already been created and are maintained by the digital asset exchange system on reserve, S1208 may be replaced with S1208' as follows. In step 1208-*a'*, the digital asset exchange system, or other trusted entity system, may debit the designated fiat funds from a fiat ledger associated with the Security Token issuer user account, and credit a corresponding amount of fiat to the SVCoin fiat ledger to be held in trust by the exchange, or otherwise reserved by the trusted entity.

At step S1208-*b'*, the digital asset exchange computer system, or other trusted entity system may then determine a portion of the reserve for transfer based on the requested amount of SVCoin identified by the Security Token issuer for transfer to the Security Token holder(s).

At step 1208-*c'*, the digital asset exchange computer system, or other trusted entity system may update the SVCoin token ledger to change the address associated with the determined portion of the reserve SVCoin tokens to the address, or addresses, associated with the Security Token holder.

In S1210, the digital asset exchange computer system may send a message to the Security Token issuer registered user, and/or each of the designated digital asset addresses to reflect that the transaction was successfully processed. In embodiments, such messages may include information including: (i) digital asset address; (ii) the amount of tokens generated/or determined for transfer; and/or (iii) the new balances for the digital asset address or digital wallet associated therewith. In embodiments, the message may include additional information related to the Security Token, including: (iv) the amount of the Security Token held; (v) the dividend issued; and/or (vi) instructions on how to redeem the SVCoin.

EXAMPLES

The following examples illustrate embodiments of the present invention. They are not intended to be limiting. It will be appreciated by those of skill in the art that embodiments may be applied to other use cases not specifically called out herein without departing from the present invention.

Example 1: Real Estate Investment Trust (REIT) Token

In embodiments, shares in a real estate investment trust ("REIT Trust") may be issued using a digital asset, such as a token on the Ether Network ("REIT Token"). The REIT Trust may hold income generating property such as real estate which is leased. As the income generating property generates fiat profits which are intended to be distributed to shareholders, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the REIT Trust) to REIT Token holders at the respective REIT Token holder's digital asset addresses associated with the Ether Wallet holding the REIT Token.

REIT Token holders may then use the SVCoin as a digital asset to conduct other transactions. Eventually, the SVCoin can be exchanged for fiat at the exchange based on the notional value (e.g., 1 SVCoin=1 dollar).

Example 2: Energy Master Limited Partnership (Energy MLP) Tokens

In embodiments, shares in an Energy Master Limited Partnership ("Energy MLP") may be issued using a digital asset, such as a token on the Ether Network ("Energy MLP Token"). The Energy MLP may offer shares (otherwise known as "units") in the form of a digital asset, such as Energy MLP Tokens that are publicly traded and which generate dividends to the shareholders. As the dividends are distributed on a periodic basis in the form of fiat currency, a corresponding amount of fiat is deposited with a digital asset exchange, such as a regulated digital asset exchange like Gemini. The fiat is then converted into a SVCoin by the Exchange. The SVCoin may then be distributed on a pro-rata basis (or as otherwise instructed by the Energy MLP) to Energy MLP Token holders at the respective Energy MLP Token holder's digital asset addresses associated with the Ether Wallet holding the Energy MLP Token.

Energy MLP Token holders may then use the SVCoin as a digital asset to conduct other transactions. Eventually, the SVCoin can be exchanged for fiat at the exchange based on the notional value (e.g., 1 SVCoin=1 dollar).

Example 3: Equity Security Tokens

In embodiments, equity shares corresponding to a stock certificate in an entity may be issued using a digital asset, such as a token on the Ether Network ("Equity Token"). As dividends based on the Equity Token are generated for distribution to shareholders, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the entity distributing the shares) to Equity Token holders at the respective Equity Token holder's digital asset addresses associated with the Ether Wallet holding the Equity Token.

Equity Token holders may then use the SVCoin as a digital asset to conduct other transactions. Eventually, the SVCoin can be exchanged for fiat at the exchange based on the notional value (e.g., 1 SVCoin=1 dollar).

Example 4: Venture Capital (VC) Tokens

In embodiments, shares in a Venture Capital fund ("VC Fund") may be issued using a digital asset, such as a token on the Ether Network ("VC Token"). As the VC Fund generates returns to be distributed to investors in the VC Fund, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the VC Fund) to VC Token holders at the respective VC Token holder's digital asset addresses associated with the Ether Wallet holding the VC Token.

VC Token holders may then use the SVCoin as a digital asset to conduct other transactions. Eventually, the SVCoin can be exchanged for fiat at the exchange based on the notional value (e.g., 1 SVCoin=1 dollar).

Example 5: Private Equity (PE) Tokens

In embodiments, shares in a Private Equity fund ("PE Fund") may be issued using a digital asset, such as a token on the Ether Network ("PE Token"). As the PE Fund generates returns to be distributed to investors in the PE Fund, a corresponding amount of fiat is to be deposited with a digital asset exchange, such as a regulated digital asset exchange like Gemini. The fiat is then converted into SVCoin by the Exchange. The SVCoin may then be distributed on a pro-rata basis (or as otherwise instructed by the PE Fund) to PE Token holders at the respective PE Token holder's digital asset addresses associated with the Ether Wallet holding the PE Token.

PE Token holders may then use the SVCoin as a digital asset to conduct other transactions. Eventually, the SVCoin can be exchanged for fiat at the exchange based on the notional value (e.g., 1 SVCoin=1 dollar).

Example 6: Digital Certificate of Deposit (CD) Tokens

In embodiments, digital certificate of deposits ("Digital CD") may be issued using a digital asset, such as a token on the Ether Network ("CD Token"). As interest amounts are generated based on the terms of the certificate of deposits, a corresponding amount of fiat is to be deposited with a digital asset exchange, such as a regulated digital asset exchange like Gemini. The fiat is then converted into a SVCoin by the Exchange. Upon maturity of the Digital CD (or before maturity), the SVCoin may then be distributed on a pro-rata basis (or as otherwise instructed by the Digital CD issuer and/or less any premature withdrawal penalty) to CD Token holders at the respective CD Token holder's digital asset addresses associated with the Ether Wallet holding the CD Token.

CD Token holders may then use the SVCoin as a digital asset to conduct other transactions. Eventually, the SVCoin can be exchanged for fiat at the exchange based on the notional value (e.g., 1 SVCoin=1 dollar).

Example 7: Digital Bond Tokens

In embodiments, digital bonds may be issued using a digital asset, such as a token on the Ether Network ("Bond Token"). As interest amounts are generated based on the coupon rates of the digital bonds, a corresponding amount of fiat is to be deposited with a digital asset exchange, such as a regulated digital asset exchange like Gemini. The fiat is then converted into SVCoin by the Exchange. The SVCoin may then be distributed on a pro-rata basis (or as otherwise instructed by the digital bond issuer) to Bond Token holders at the respective Bond Token holder's digital asset addresses associated with the Ether Wallet holding the Bond Token.

Bond Token holders may then use the SVCoin as a digital asset to conduct other transactions. Eventually, the SVCoin can be exchanged for fiat at the exchange based on the notional value (e.g., 1 SVCoin=1 dollar).

Example 8: Peer-to-Peer Lending (P2P) Tokens

In embodiments, a peer-to-peer lending service ("P2P Service") may issue a digital asset, such as a token on the Ether Network ("P2P Loan Token"). As lending amounts and interest payments are distributed, corresponding amounts of fiat is deposited with a digital asset exchange, such as a regulated digital asset exchange like Gemini. The fiat is then converted into SVCoin by the Exchange. The SVCoin may then be distributed on a pro-rata basis (or as otherwise instructed by the lender/borrower) to P2P Loan Token holders at the respective P2P Loan Token holder's digital asset addresses associated with the Ether Wallet holding the P2P Loan Token.

P2P Loan Token holders may then use the SVCoin as a digital asset to conduct other transactions. Eventually, the SVCoin can be exchanged for fiat at the exchange based on the notional value (e.g., 1 SVCoin=1 dollar).

Example 9: Crowdfunding (CF) Tokens

In embodiments, a Crowdfunding service may issue a digital asset, such as a token on the Ether Network ("CF Token"). As funds are collected, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the Crowdfunding service) to CF Token holders at the respective CF Token holder's digital asset addresses associated with the Ether Wallet holding the CF Token.

CF Token holders may then use the SVCoin as a digital asset to conduct other transactions. Eventually, the SVCoin can be exchanged for fiat at the exchange based on the notional value (e.g., 1 SVCoin=1 dollar).

Example 10: Real Estate Crowdsourcing Tokens

In embodiments, a Real Estate Crowdsourcing services may issue a digital asset, such as a token on the Ether Network ("RE Token"). As funds are collected, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the Real Estate Crowdsourcing service) to RE Token holders at the respective RE Token holder's digital asset addresses associated with the Ether Wallet holding the RE Token. RE Token holders may then use the SVCoin as a digital asset to conduct other transactions. Eventually, the SVCoin can be exchanged for fiat at the exchange based on the notional value (e.g., 1 SVCoin=1 dollar).

Example 11: Artistic/Digital Rights Payment Tokens

In embodiments, tokens may be issued against an artistic work, such as a song or movie (DR Token), for example, as a token on the Ethereum network. As royalties are collected for use of the song or movie, a corresponding amount of fiat may be deposited with a digital asset exchange. The fiat may be converted into SVCoin and distributed on a pro-rata basis to the rights holders who are DR Token holders. More specifically, the SVCoin may be transferred the digital asset address associated with a wallet of a DR Token holder as a payment of royalties.

In embodiments of the examples discussed above, the token holders may instigate payment of SVCoin by sending a request for payment. In this case, any transaction fees will be the responsibility of the token holder. In embodiments, the token issuer, or an agent thereof, may implement or instruct distribution of payments in which case transaction fees are the responsibility of the token issuer.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed:

1. A digital asset exchange computer system associated with a digital asset exchange for withdrawing stable value digital asset tokens based on an underlying digital asset from a digital asset exchange computer system in exchange for fiat, wherein the digital asset exchange comprises:

one or more processors;

non-transitory computer-readable memory operatively connected to the one or more processors and having stored thereon computer-readable instructions to perform the steps of:

authenticating, by the digital asset exchange computer system associated with the digital asset exchange, an access request by a first user device associated with a first user to the digital asset exchange computer system;

receiving, by the digital asset exchange computer system from the first user device, a withdraw request including a first electronic request to withdraw stable value digital asset tokens, wherein each stable value digital asset token is tied to an underlying digital asset which is maintained on a distributed public transaction ledger in the form of a blockchain that is maintained by a blockchain network including a plurality of geographically distributed computer systems in a peer-to-peer network and each stable value digital asset token is issued based on first smart contract instructions provided at a first contract address on the blockchain;

in response to the first electronic request, obtaining, by the digital asset exchange computer system from a fiat account ledger database stored on computer readable member accessible by the digital asset exchange computer system, first account balance information of the first user indicating a first amount of available fiat for the first user held by the digital asset exchange on behalf of the first user;

determining, by the digital asset exchange computer system, a second amount of fiat based on the first amount of stable value digital asset tokens, where the second amount of fiat is determined using a fixed predetermined ratio of stable value digital asset tokens to fiat;

generating, by the digital asset exchange computer system, a first transaction request for the blockchain, from a first digital asset exchange public key address on the blockchain, which is mathematically related to a first digital asset exchange private key, which is stored in the computer readable member accessible by the digital asset exchange computer system, to the first contract address associated with a stable value digital asset token issuer; and confirming, by the digital asset exchange computer system based on reference to the blockchain, that the first transaction request has been processed by the blockchain network so that a balance of stable value digital asset tokens in a destination public address of the first user includes the first amount of stable value digital asset tokens.

2. The system of claim 1, wherein the first transaction request includes:

a request to generate and provide the first amount of stable value digital asset tokens to the destination public address of the first user; and a digital signature generated using a digital asset exchange private key.

3. The system of claim 1, further comprising:

receiving, by the digital asset exchange computer system from the first user device, an authentication request including first user credential information associated with the first user; and determining, by the digital asset exchange computer system, that the first user device is authorized to access the digital asset exchange computer system based at least in part on the first user credential information.

4. The system of claim 1, further comprising:

generating, by the digital asset exchange computer system, first graphical user interface information for displaying a first graphical user interface on the first user device; and transmitting, from the digital asset exchange computer system to the first user device, the first graphical user interface information.

5. The system of claim 1, further comprising receiving, by the digital asset exchange computer system from the first user device, a second electronic withdrawal request comprising at least:

a first amount of stable value digital asset tokens to be withdrawn; and a destination address on the blockchain to which the first amount of stable value digital asset tokens is provided.

6. The system of claim 1, further comprising:

determining, by the digital asset exchange computer system, that the second amount of fiat is less than the first amount of available fiat of the first user;

in cases where the second amount of fiat is less than the first amount of available fiat of the first user, determining a third amount of fiat associated with an updated amount of available fiat of the first user, wherein the third amount of fiat equals the first amount of available fiat of the first user less the second amount of fiat.

7. The system of claim 6, further comprising:

updating, by the digital asset exchange computer system, the fiat account ledger database to reflect that the updated amount of available fiat of the first user is the third amount of fiat; and updating, by the digital asset exchange computer system, a stable value digital asset token issuer fiat ledger, to increase a balance of fiat by the second amount of fiat.

8. The system of claim 1, further comprising:

transmitting, by the digital asset exchange computer system to the blockchain network via the Internet, the first transaction request, wherein, in response to the first transaction request, the blockchain network verifies a digital signature and executes a request to generate and provide the first amount of stable value tokens to the destination public address of the first user.

9. A computing device comprising:

one or more processors; and non-transitory computer-readable memory operatively connected to the one or more processors and having stored thereon computer-readable instructions to perform the steps of:

authenticating, by the computing device associated with a digital asset exchange, an access request by a first user device associated with a first user to the computing device;

receiving, by the computing device from the first user device, a withdraw request including a first electronic request to withdraw stable value digital asset tokens, wherein each stable value digital asset token is tied to an underlying digital asset which is maintained on a distributed public transaction ledger in the form of a blockchain that is maintained by a blockchain network including a plurality of geographically distributed computer systems in a peer-to-peer network and each stable value digital asset token is issued based on first smart contract instructions provided at a first contract address on the blockchain;

in response to the first electronic request, obtaining, by the computing device from a fiat account ledger database stored on computer readable member accessible by the computing device, first account balance information of the first user indicating a first amount of available fiat for the first user held by the computing device on behalf of the first user;

determining, by the computing device, a second amount of fiat based on the first amount of stable value digital asset tokens, where the second amount of fiat is determined using a fixed predetermined ratio of stable value digital asset tokens to fiat;

generating, by the computing device, a first transaction request for the blockchain, from a first digital asset exchange public key address on the blockchain, which is mathematically related to a first digital asset exchange private key, which is stored in the computer readable member accessible by the computing device, to the first contract address associated with a stable value digital asset token issuer; and confirming, by the computing device based on reference to the blockchain, that the first transaction request has been processed by the blockchain network so that a balance of stable value digital asset tokens in a destination public address of the first user includes the first amount of stable value digital asset tokens.

10. The computing device of claim 9, wherein the first transaction request includes:

a request to generate and provide the first amount of stable value digital asset tokens to the destination public address of the first user; and a digital signature generated using a digital asset exchange private key.

11. The computing device of claim 9, further comprising:

receiving, by the computing device from the first user device, an authentication request including first user credential information associated with the first user; and determining, by the computing device, that the first user device is authorized to access the computing device based at least in part on the first user credential information.

12. The computing device of claim 9, further comprising:

generating, by the computing device, first graphical user interface information for displaying a first graphical user interface on the first user device; and transmitting, from the computing device to the first user device, the first graphical user interface information.

13. The computing device of claim 9, further comprising receiving, by the computing device from the first user device, a second electronic withdrawal request comprising at least:

a first amount of stable value digital asset tokens to be withdrawn; and a destination address on the blockchain to which the first amount of stable value digital asset tokens is provided.

14. The computing device of claim 9, further comprising:

determining, by the computing device, that the second amount of fiat is less than the first amount of available fiat of the first user;

in cases where the second amount of fiat is less than the first amount of available fiat of the first user, determining a third amount of fiat associated with an updated amount of available fiat of the first user, wherein the third amount of fiat equals the first amount of available fiat of the first user less the second amount of fiat.

15. A computer implemented method comprising:

authenticating, by a digital asset exchange computer system associated with a digital asset exchange, an access request by a first user device associated with a first user to the digital asset exchange computer system;

receiving, by the digital asset exchange computer system from the first user device, a withdraw request including a first electronic request to withdraw stable value digital asset tokens, wherein each stable value digital asset token is tied to an underlying digital asset which is maintained on a distributed public transaction ledger in the form of a blockchain that is maintained by a blockchain network including a plurality of geographically distributed computer systems in a peer-to-peer network and each stable value digital asset token is issued based on first smart contract instructions provided at a first contract address on the blockchain;

in response to the first electronic request, obtaining, by the digital asset exchange computer system from a fiat account ledger database stored on computer readable member accessible by the digital asset exchange computer system, first account balance information of the first user indicating a first amount of available fiat for the first user held by the digital asset exchange computer system on behalf of the first user;

determining, by the digital asset exchange computer system, a second amount of fiat based on the first amount of stable value digital asset tokens, where the second amount of fiat is determined using a fixed predetermined ratio of stable value digital asset tokens to fiat;

generating, by the digital asset exchange computer system, a first transaction request for the blockchain, from a first digital asset exchange public key address on the blockchain, which is mathematically related to a first digital asset exchange private key, which is stored in the computer readable member accessible by the digital asset exchange computer system, to the first contract address associated with a stable value digital asset token issuer; and confirming, by the digital asset exchange computer system based on reference to the blockchain, that the first transaction request has been processed by the blockchain network so that a balance of stable value digital asset tokens in a destination public address of the first user includes the first amount of stable value digital asset tokens.

16. The method of claim 15, further comprising:

receiving, by the digital asset exchange computer system from the first user device, an authentication request including first user credential information associated with the first user; and determining, by the digital asset exchange computer system, that the first user device is authorized to access the digital asset exchange computer system based at least in part on the first user credential information.

17. The method of claim 15, further comprising:

generating, by the digital asset exchange computer system, first graphical user interface information for displaying a first graphical user interface on the first user device; and transmitting, from the digital asset exchange computer system to the first user device, the first graphical user interface information.

18. The method of claim 15, further comprising receiving, by the digital asset exchange computer system from the first user device, a second electronic withdrawal request comprising at least:

a first amount of stable value digital asset tokens to be withdrawn; and a destination address on the blockchain to which the first amount of stable value digital asset tokens is provided.

19. The method of claim 15, further comprising:

determining, by the digital asset exchange computer system, that the second amount of fiat is less than the first amount of available fiat of the first user;

in cases where the second amount of fiat is less than the first amount of available fiat of the first user, determining a third amount of fiat associated with an updated amount of available fiat of the first user, wherein the third amount of fiat equals the first amount of available fiat of the first user less the second amount of fiat.

20. The method of claim 19, further comprising:

updating, by the digital asset exchange computer system, the fiat account ledger database to reflect that the updated amount of available fiat of the first user is the third amount of fiat; and updating, by the digital asset exchange computer system, a stable value digital asset token issuer fiat ledger, to increase a balance of fiat by the second amount of fiat.

* * * * *